US007912856B2

(12) United States Patent
Hannel et al.

(10) Patent No.: US 7,912,856 B2
(45) Date of Patent: Mar. 22, 2011

(54) ADAPTIVE ENCRYPTION

(75) Inventors: Clifford Lee Hannel, Thousand Oaks, CA (US); Anthony May, Woodland Hills, CA (US)

(73) Assignee: SonicWALL, Inc., San Jose, CA (US)

(*) Notice: Subject to any disclaimer, the term of this patent is extended or adjusted under 35 U.S.C. 154(b) by 356 days.

(21) Appl. No.: 11/927,214

(22) Filed: Oct. 29, 2007

(65) Prior Publication Data

US 2008/0172366 A1  Jul. 17, 2008

Related U.S. Application Data

(63) Continuation of application No. 10/019,101, filed as application No. PCT/US00/17078 on Jun. 21, 2000, now Pat. No. 7,580,919, which is a continuation-in-part of application No. PCT/US99/14585, filed on Jun. 28, 1999.

(60) Provisional application No. 60/140,417, filed on Jun. 22, 1999, provisional application No. 60/091,130, filed on Jun. 29, 1998.

(51) Int. Cl.
*G06F 17/30* (2006.01)
(52) U.S. Cl. ........................................ 707/781
(58) Field of Classification Search ................ 707/2, 3, 707/101, 781
See application file for complete search history.

(56) References Cited

U.S. PATENT DOCUMENTS

| | | | |
|---|---|---|---|
| 4,919,545 A | 4/1990 | Yu | |
| 4,956,769 A | 9/1990 | Smith | |
| 4,961,224 A | 10/1990 | Yung | |
| 5,012,405 A | 4/1991 | Nishikado | |
| 5,115,501 A | 5/1992 | Kerr | |
| 5,117,349 A | 5/1992 | Tirfing | |
| 5,204,897 A | 4/1993 | Wyman | |
| 5,220,604 A | 6/1993 | Gasser | |
| 5,249,230 A | 9/1993 | Mihm | |
| 5,263,157 A | 11/1993 | Janis | |
| 5,263,158 A | 11/1993 | Janis | |
| 5,263,165 A | 11/1993 | Janis | |
| 5,276,735 A | 1/1994 | Boebert et al. | |
| 5,276,870 A | 1/1994 | Shan | |
| 5,276,901 A | 1/1994 | Howell | |
| 5,335,346 A | 8/1994 | Fabbio | |
| 5,423,034 A | 6/1995 | Cohen-Levy | |

(Continued)

FOREIGN PATENT DOCUMENTS

EP     0736827     10/1996

(Continued)

OTHER PUBLICATIONS

Chung, "Fast and Effective Multiple Moving Targets Tracking Method for Mobile Robots", vol. 3, Digital Object Identifier, May 1995.

(Continued)

*Primary Examiner* — Etienne P LeRoux
(74) *Attorney, Agent, or Firm* — Carr & Ferrell LLP

(57) ABSTRACT

A scalable access filter is used in a virtual private network to control access by users at clients in the network to information resources provided by servers in the network. Access is permitted or denied according to access policies which define access in terms of the user groups and information sets. The access filter in the path performs the access check, encrypts and authenticates the request.

17 Claims, 60 Drawing Sheets

U.S. PATENT DOCUMENTS

| | | | |
|---|---|---|---|
| 5,438,508 A | 8/1995 | Wyman | |
| 5,442,342 A | 8/1995 | Kung | |
| 5,446,903 A | 8/1995 | Abraham | |
| 5,455,945 A | 10/1995 | VanderDrift | |
| 5,455,953 A | 10/1995 | Russell | |
| 5,534,855 A | 7/1996 | Shockley | |
| 5,544,322 A | 8/1996 | Cheng | |
| 5,553,282 A | 9/1996 | Parrish et al. | |
| 5,568,613 A | 10/1996 | Futral | |
| 5,608,865 A | 3/1997 | Midgely | |
| 5,611,050 A | 3/1997 | Theimer | |
| 5,627,764 A | 5/1997 | Schutzman | |
| 5,627,886 A | 5/1997 | Bowman | |
| 5,634,053 A | 5/1997 | Noble | |
| 5,644,718 A | 7/1997 | Belove | |
| 5,652,787 A | 7/1997 | O'Kelly | |
| 5,675,782 A | 10/1997 | Montague | |
| 5,696,486 A | 12/1997 | Poliquin | |
| 5,696,898 A | 12/1997 | Baker | |
| 5,701,458 A | 12/1997 | Bsaibes | |
| 5,701,461 A | 12/1997 | Dalai | |
| 5,706,427 A | 1/1998 | Tabuki | |
| 5,720,023 A | 2/1998 | Putland | |
| 5,720,033 A | 2/1998 | Deo | |
| 5,721,908 A | 2/1998 | Lagarde | |
| 5,729,734 A | 3/1998 | Parker | |
| 5,752,245 A | 5/1998 | Parrish | |
| 5,758,083 A | 5/1998 | Singh | |
| 5,771,291 A | 6/1998 | Newton | |
| 5,774,650 A | 6/1998 | Chapman | |
| 5,777,549 A | 7/1998 | Arrowsmith | |
| 5,787,427 A | 7/1998 | Benantar | |
| 5,787,428 A | 7/1998 | Hart | |
| 5,793,964 A | 8/1998 | Rogers | |
| 5,796,951 A | 8/1998 | Hamner | |
| 5,797,128 A | 8/1998 | Birnbaum | |
| 5,826,010 A | 10/1998 | Joseph | |
| 5,838,918 A | 11/1998 | Prager | |
| 5,856,984 A | 1/1999 | Rushworth | |
| 5,864,683 A | 1/1999 | Boebert | |
| 5,872,928 A | 2/1999 | Lewis | |
| 5,873,096 A | 2/1999 | Lim | |
| 5,884,033 A | 3/1999 | Duvall | |
| 5,884,274 A | 3/1999 | Walker | |
| 5,889,958 A | 3/1999 | Willens | |
| 5,892,909 A | 4/1999 | Grasso | |
| 5,905,984 A | 5/1999 | Thorsen | |
| 5,924,094 A | 7/1999 | Sutter | |
| 5,970,464 A | 10/1999 | Apte | |
| 5,987,611 A | 11/1999 | Freund | |
| 6,038,563 A | 3/2000 | Bapat | |
| 6,070,244 A | 5/2000 | Orchier | |
| 6,085,233 A | 7/2000 | Jeffrey | |
| 6,105,132 A * | 8/2000 | Fritch et al. | 713/167 |
| 6,158,010 A | 12/2000 | Moriconi | |
| 6,178,425 B1 | 1/2001 | Brodersen | |
| 6,229,894 B1 * | 5/2001 | Van Oorschot et al. | 713/150 |
| 6,289,450 B1 | 9/2001 | Pensak | |
| 6,311,269 B2 | 10/2001 | Luckenbaugh | |
| 6,408,336 B1 | 6/2002 | Schneider | |
| 6,785,728 B1 | 8/2004 | Schneider | |
| 6,915,265 B1 | 7/2005 | Johnson | |
| 7,032,022 B1 | 4/2006 | Shanumgam | |
| 7,062,500 B1 | 6/2006 | Hall | |
| 7,158,986 B1 | 1/2007 | Oliver | |
| 7,213,262 B1 | 5/2007 | Elley | |
| 2005/0010820 A1 | 1/2005 | Jacobson | |
| 2008/0043728 A1 | 2/2008 | Miloslavsky | |
| 2008/0059543 A1 | 3/2008 | Engel | |

FOREIGN PATENT DOCUMENTS

| | | |
|---|---|---|
| GB | 2317539 | 3/1998 |
| WO | WO 96/05549 | 2/1996 |
| WO | WO 97/00471 | 1/1997 |
| WO | WO 0079434 | 12/2000 |

OTHER PUBLICATIONS

Hiraiwa, "Info-Plaza: A Social Information Filtering System for the World-Wide Web", 1996 Proc. on Parallel and Distributed Systems, Jun. 1996.
Yeung, "Selective Broadcast Data Distribution Systems", Proc. of the 15th Int'l Conf. on Distributed Computing Systems, 1995.
Aziz, "Simple Key-Management for Internet Protocols (SKIP)," Proc. of INET, 1995.
Ringey, "Remote Authentication Dial In User Service (RADIUS)," RFC 2138, Apr. 1997.
Marriott, "Management Policy Service for Distributed Systems," IEEE 1996.
Ford, "Administration in a Multiple Policy/Domain Environment: The Administration and Melding of Disparate Policies," IEEE 1995.
Sandhu, Access Control: Principles and Practice, IEEE Communications Magazine, Sep. 1994.
Herzog, "Local Policy Modules (LPM): Policy Enforcement for Resource Reservation Protocols," Internet Draft, Jun. 1996.
"Access Control List View for Objects," IBM Technical Disclosure Bulletin, vol. 35, Issue 5, Oct. 1992.
Marriott, "Implementation of a Management Agent for Interpreting Obligation Policy," IEEE/IFIP 7th Int'l Workshop on Distributed Operations and Management, 1996.
Edwards, "Policies and Roles in Collaborative Applications," Proc. of the ACM 1996 Conf. on Computer Supported Cooperative Work, Nov. 1996.
Lampson, "Authentication in Distributed Systems: Theory and Practice," Proc. of the 13th ACM Symp. on Operating Systems Principles, Oct. 1991.
Gladney, "Access Control for Large Collections," ACM Trans. on Information Systems, vol. 15, No. 2, Apr. 1997.
Shen, "Access Control for Collaborative Environments," Conf. Proc. on Computer-Supported Collaborative Work, ACM, Nov. 1992.
Reiter, "Integrating Security in a Group Oriented Distributed System," Proc. of Research in Security & Privacy, 1992, IEEE, May 1992.
"CheckPoint FireWall-1," White Paper, Version 2.0, Jun. 1995.
Yu, "Access Control and Authorization Plan for Customer Control of Network Services," IEEE Global Telecommunications Conference and Exhibition, vol. 2, Nov. 1989.
Toy, "AT&T's Electronic Mail Service for Government Users—FTS2000MAIL," Globecom '92, IEEE, vol. 2, Dec. 1992.
"Commercial Firewalls and Related FW Products," Mar. 1996.
"Five Domains of Network Security: Technical Overview of the Eagle," Jan. 1997.
"Checkpoint FireWall-1," Metadigm Ltd., 1996.
Computer Dictionary, 2d ed., Microsoft Press, Redmond, Washington, p. 215, Oct. 1993.
Zaniolo, "A Simple Model for Active Rules and their Behavior in Deductive . . . " 1994, www.cs.ucla.edu/~zaniolo/papers/w9.pdf.
Keromytis, "Transparent Network Security Policy Enforcement" 2000; www.cis.upenn.edu/~angelos/Papers/bridgepaper.ps.gz.
Lutfiyya, "A Policy-Driven Approach to Availability and . . . " 1997; chan.csd.uwo.ca/research/cords/Papers/policy.ps.
Cengiz, "The Viewserver Hierarchy for Inter-Domain Routing . . . " 1995; ftp.cs.umd.edu/pub/papers/ncstrl.umcp/CS-TR-3.
Spencer, "The Flask Security Architecture: System Support . . . " 1998; mancos.cs.utah.edu/papers/flask-usenixsec99.ps.gz.
Govidan, "Route Servers for Inter-Domain Routing" 1998; ftp.isi.edu/pub/cengiz/publictaions/RA:RS.ps.gz.
Forta, et al., "ColdFusion 4.0 Web Application Construction Kit 3d Edition, Chapter 8: Introduction to SQl," Que. 1998.

* cited by examiner

| Trust / Data Sensitivity Level | Minimum Encryption | Minimum Authentication |
|---|---|---|
| Top secret | 3DES | Certificate via SKIP |
| Secret | DES | Certificate via SKIP |
| Private | RC4-40 | Windows ID |
| Public | None | None |

Fig. 6

| MMF File Name | Contents |
|---|---|
| | Servers, Services, and Information Resources 2313 |
| DBResourcesByServerIDFile | Relates servers to resources. Maps from ServerIDs to ResourceIDs for resources held on the server identified by the ServerID. |
| DBResourcesByServiceIDFile | Relates services to resources. Maps from ServiceIDs to ResourceIDs for resources belonging to the service identified by the ServiceID. |
| DBResourceIDByServiceIDFile | Relates services to their information resources. Maps from ServiceID to ResourceID. |
| DBResourceIDByNameFile 2315 | Relates the IP names (URLs) of resources to resource IDs. Maps from URL to resource ID. |
| DBResourcesByResourceIDFile 2317 | Relates resources to information sets. Maps ResourceID to Resource GroupIds. |
| | Servers, Services, IP Information, and Proxies 2319 |
| DBServerIDByIPFile | Relates IP addresses to servers. Maps IP addresses to ServerIDs. |
| DBServerIDByNameFile | Relates IP names to servers. Maps the IP FQDN (fully qualified domain name) for each server to its ServerID. |
| DBIPAndTypeByServerIDFile | Relates servers to their locations inside or outside to the VPN. Maps ServerID to the server's IP address and a flag indicating whether the address is inside or outside the VPN. |
| DBServiceIDByPortFile | Relates services to their port numbers. Maps from ServiceID to port number. |
| DBServiceIDByServerIDFile | Relates servers to ports for services. Maps from ServerID to a list of port numbers. |
| DBServicePortToProxyPortFile | Relates service ports to the ports for their proxies. Maps from service port number to proxy port number. |
| DBProxyIDByServerIDFile | Relates servers to service proxies. Maps from ServerID to ProxyDefID. |
| DBProxyParametersFile | Relates proxies to configuration data for the proxies. Maps from ProxyDefID to options data |

| MMF File Name | Contents |
|---|---|
| | Access Filter Information 2321 |
| DBAttachedNetworksByIPFile | Relates network interfaces in the access filters to information for the interfaces. Maps from the interface's IP address to interface information. |
| DBAttachedNetworksByServerIDFile | Relates access filters to their network interfaces. Maps from ServerID for the access filter to interface information. |
| DBRoutingTableFile | Describes the IP routing information for all of the access filters. One block of information. |
| DBRoutingTableByServerIDFile | Relates access filters to their IP routing information. Maps from ServerID for the access filter to IP routing information. |
| DBPointToPointFile | Relates a point-to-point description of a network path to data for the path. Maps from PointToPointID for the path to the associated data. |
| | SEND Information 2323 |
| DBTrustTableFile 2325 | Implements the SEND table. Maps from TrustDefID, indicating a trust level, to AuthenticationIDs for user identification techniques and EncryptionIDs for encryption techniques. |
| DBCertificateAuthoritiesFile | Relates identifiers for cerfiticate authorities to their data. Maps from CertificateAuthorityID to associated data. |
| DBTrustAuthenticationsFile | Relates AuthenticationIDs to information about identification techniques. Maps from AuthenticationID to identification technique information. |
| DBTrustEncryptionsFile | Relates EncryptionIDs to information about encryption techniques. Maps from EncryptionID to encryption type and strength information. |
| | IntraMap Information 2422 |
| DBJavaSiteTable | Maps from names of locations to LocationIDs. |
| DBJavaResourceTable | Maps from URLs of resources to their ResourceIDs, LocationIDs, and *hidden* flags. |
| DBJavaResourcesSetTable | Maps from names of information sets to ResourceGroupIDs, a list of ResourceIDs for all resources contained in the information set, and a list of ResourceGroupsIDs for all of the information set's parents. |

*Entity* [is | are] [allowed to | denied] *Action* [to | to the] *Resource*

[ from | on| during] *TimeInterval(s)* [with | when] *ActionAttribute(s)*

Schedule Rule

- Schedule Valid:
  - ○ All Day        *3203*
  - ⦿ Starts: [5:00 PM]   E_n_ds: [9:00 PM]

- On selected days of week:
  - ☑ Mo  ☑ Tu  ☑ We  ☑ Th  ☑ Fr  ☐ Sa  ☐ Su
  - ☑ Weekdays              ☐ Weekends
  - ☐ Exclude Holidays      ☐ Holidays
  - *3205*

- ⦿ Every week        *3207*
- ○ Every [2] Weeks starting on [6/23/99]
- ○ On selected week of month:
  - ☐ 1st  ☐ 2nd  ☐ 3rd  ☐ 4th  ☐ Last

- ⦿ All year        *3209*
- ○ On selected months
  - ☐ Jan  ☐ Feb  ☐ Mar  ☐ Apr  ☐ May  ☐ Jun
  - ☐ Jul  ☐ Aug  ☐ Sep  ☐ Oct  ☐ Nov  ☐ Dec Description [                    ]   *3211*

Buttons: OK, Cancel, Holidays, Help, Advanced <<

```
<!DOCTYPE HTML PUBLIC "-//W3C//DTD W3 HTML//EN">
<html>

<head>
<meta content="text/html; charset=unicode" http-equiv="Content-Type">
<!-- #include file="psquery.inc" -->
<title>Policy Query Example</title>
</head>

<body>

<h1>Conclave Policy Enabled Page</h1>        3903
<%
        if ConclavePolicyAllowed() = "Yes" then
                'Put the allowed action here
                Response.Write "<p>You've been allowed to this page.</p>"
        else                                    3905
                'Put denied action here
                Response.Write "<p>You've been <b>denied</b> to this page.</p>"
        end if
%>
                                                3907
<p> </p>
</body>
</html>
```

```
<%
'%%%%%%%%%%%%%%%%%%%%%%%%%%%%%%%%%%%%%%%%%%%
'% File:    psquery.inc
'%          Perform Policy Server
'%          Query against the current page
'%%%%%%%%%%%%%%%%%%%%%%%%%%%%%%%%%%%%%%%%%%%
Function ConclavePolicyAllowed()
        dsn    = "ConclavePolicyServer"
        dbuser = "anyone"                       } 4003
        dbpass = "anything"

'default to not allowed
        ConclavePolicyAllowed = "No"            } 4005

'Get the session variables for the query
        sourceIP = Request.ServerVariables("REMOTE_ADDR")
        destIP   = Request.ServerVariables("LOCAL_ADDR")
        destPort = Request.ServerVariables("SERVER_PORT")    } 4007
        resource = Request.ServerVariables("URL")

'remove any prepended slash on the URL
        if left(resource,1) = "/" then
                if resource <> "/" then
                        resource = mid(resource, 2)
                end if
        end if 'Construct the SQL query
        dbsql = "SELECT IsAllowed FROM PolicyEval WHERE" _
             & " SourceIP = '" & sourceIP & "'" _
             & " AND DestinationIP = '" & destIP & "'" _
             & " AND SourcePort = 0" _                              } 4009
             & " AND DestinationPort = " & destPort _
             & " AND Resource = '" & resource & "'" _
             & " AND IncludeIdentityStore='Y'" _
             & " AND AskClientForIdentities ='Y'"

Set Conn = Server.CreateObject("ADODB.Connection")
        Set rs   = Server.CreateObject("ADODB.RecordSet")    } 4011
        Conn.Open dsn, dbuser, dbpass RS.Open dbsql, Conn    ———— 4013 if Conn.Errors.Count = 0 then      ———— 4015
                if Not RS.EOF then
                        ConclavePolicyAllowed = RS(0)
                end if
        end if RS.Close
        Set RS = Nothing       } 4017
        Conn.Close
        Set Conn = Nothing
End Function
%>
```

| POLICYEVAL : Table | |
|---|---|
| Field Name | Data Type |
| IsAllowed | Text |
| PolicySet | Number |
| HasExpireTime | Text |
| ExpireTime | Binary |
| ExpireSeconds | Number |
| ReasonCode | Number |
| Reason | Text |
| Identity | Text |
| SourceIP | Text |
| DestinationIP | Text |
| SourcePort | Number |
| DestinationPort | Number |
| EncryptionAlg | Number |
| AuthenticationAlg | Number |
| IPProtocol | Number |
| EvalTimeStamp | Binary |
| Resource | Text |
| Application | Text |
| IncludeQos | Text |
| IncludeSchedules | Text |
| IncludeIdentityStore | Text |
| IncludeVPNManager | Text |
| AskClientForIdentities | Text |
| AuthCode | Text |
| MaybeList | Text |
| AttributeName | Text |
| AttributeValue | Text |
| Cookie | Text |
| IdentityNumber | Number |
| IdentityType | Text |
| IdentityIsValid | Text |
| IdentityAuthStatus | Number |
| IdentityAuthStatusDesc | Text |

Fig. 41

```
SELECT IsAllowed, PolicySet, HasExpireTime, ExpireTime, Reason from
PolicyEval
WHERE SourceIP = '172.31.1.31'
AND SourcePort = 0
AND DestinationIP = '172.31.1.32'
AND DestinationPort = 80                                              4203
AND EncryptionAlg = 64
AND AuthenticationAlg = 2
AND IPProtocol = 6
AND EvalTimeStamp = '07-JUL-1999 13:39:34'
AND Resource = 'Conclave/ConclaveEval.html'
```

| IsAllowed | PolicySet | HasExpireTime | ExpireTime | Reason |
|---|---|---|---|---|
| Y | 56 | N | 1969-12-31 16:00:00 | None |

4205

4201

```
SELECT IsAllowed, Reason from PolicyEval
WHERE SourceIP = '172.31.1.31'
AND SourcePort = 0
AND DestinationIP = '172.31.1.32'
AND DestinationPort = 80
AND EncryptionAlg = 64
AND AuthenticationAlg = 2
AND IPProtocol = 6                                                    4209
AND EvalTimeStamp = '07-JUL-1999 13:39:34'
AND Resource = 'Conclave/ConclaveEval.html'
```

| IsAllowed | Reason |
|---|---|
| Y | None |

4211

4207

```
SELECT * from PolicyEval
WHERE SourceIP = '172.31.1.31'
AND SourcePort = 0
AND DestinationIP = '172.31.1.32'
AND DestinationPort = 80
AND EncryptionAlg = 64                                                4213
AND AuthenticationAlg = 2
AND IPProtocol = 6
AND EvalTimeStamp = '07-JUL-1999 13:39:34'
AND Resource = 'Conclave/ConclaveEval.html'
```

```
SELECT IsAllowed, PolicySet, HasExpireTime, ExpireTime, Reason from PolicyEval
WHERE SourceIP = '172.31.1.31'
AND DestinationIP = '172.31.1.32'                                     4217
AND Resource = 'Conclave/ConclaveEval.html'
```

| IsAllowed | PolicySet | HasExpireTime | ExpireTime | Reason |
|---|---|---|---|---|
| Y | 56 | N | 1969-12-31 16:00:00 | None |

```
SELECT IsAllowed, Reason, IdentType, IdentGroup, IdentValue from
PolicyEval
WHERE SourceIP = '172.31.1.31'
AND DestinationIP = '172.31.1.32'                                    4303
AND Resource = 'Conclave/ConclaveEval.html'
```

| IsAllowed | Reason | IdentType | IdentGroup | IdentValue |
|---|---|---|---|---|
| Y | Allowed by Certificate | CERTIFICATEDN | 1 | /O=XYZ |
| Y | Allowed by Certificate | CERTIFICATEDN | 1 | /OU=Engineering |
| Y | Allowed by Certificate | CERTIFICATEDN | 1 | /CN=JoeUser |

4305

4301

```
SELECT IsAllowed, Reason, IdentType, IdentGroup, IdentValue from
PolicyEval
WHERE SourceIP = '172.31.1.31'
AND DestinationIP = '172.31.1.32'                                    4309
AND Resource = 'Conclave/ConclaveEval.html'
AND IdentType = 'CertificateDN'
AND IdentValue = '/O=XYZ/OU=Engineering/CN=JoeUser'
```

| IsAllowed | Reason | IdentType | IdentGroup | IdentValue |
|---|---|---|---|---|
| Y | Allowed by Certificate | CERTIFICATEDN | 1 | /O=XYZ |
| Y | Allowed by Certificate | CERTIFICATEDN | 1 | /OU=Engineering |
| Y | Allowed by Certificate | CERTIFICATEDN | 1 | /CN=JoeUser |

4311

4307

```
SELECT IsAllowed, Reason, IdentType, IdentGroup, IdentValue from
PolicyEval
WHERE SourceIP = '172.31.1.31'
AND DestinationIP = '172.31.1.32'                                    4315
AND Resource = 'Conclave/ConclaveEval.html'
AND IncludeIdentityStore = 'Y'
```

| IsAllowed | Reason | IdentType | IdentGroup | IdentValue |
|---|---|---|---|---|
| Y | Allowed by Certificate | CERTIFICATEDN | 1 | /O=XYZ |
| Y | Allowed by Certificate | CERTIFICATEDN | 1 | /OU=Engineering |
| Y | Allowed by Certificate | CERTIFICATEDN | 1 | /CN=JoeUser |

4317

4313

```
SELECT IsAllowed, Reason, IdentType, IdentGroup, IdentValue from
PolicyEval
WHERE SourceIP = '172.31.1.31'
AND DestinationIP = '172.31.1.32'
AND Resource = 'Conclave/ConclaveEval.html'                          4321
AND IncludeIdentityStore = 'Y'
AND IdentType NOT IN ( 'WindowsID','Radius','IP' )
```

| IsAllowed | Reason | IdentType | IdentGroup | IdentValue |
|---|---|---|---|---|
| Y | Allowed by Certificate | CERTIFICATEDN | 1 | /O=XYZ |
| Y | Allowed by Certificate | CERTIFICATEDN | 1 | /OU=Engineering |
| Y | Allowed by Certificate | CERTIFICATEDN | 1 | /CN=JoeUser |

SmartCard Types : Table

| SmartcardType | Type | Manufacturer | Version | Number |
|---|---|---|---|---|
| 947715538 | LDAPBind | Bind to an LDAP Server to authenticate a users identity | 1 | 3 |
| (AutoNumber) | | | | 0 |

Proxy Definitions : Table

| ProxyDefID | Name | Description | Type | RecordType | Details | Pre-defined | Parameters | Number |
|---|---|---|---|---|---|---|---|---|
| 344148459 | LDAPBind | Web service proxy | 1 | 1 | | 0 | | 50 |
| (AutoNumber) | | | | 0 | | 0 | | 0 |

Fig. 49

SmartCard Types : Table

| ProxyParamD | ProxyDefID | Name | Description | Value |
|---|---|---|---|---|
| -1287839664 | 344148459 | Cookie TTL | Cookie time to live in [seconds] | 2580 |
| -2554222959 | 344148459 | Queries | Defined queries | Step1, Step2 |
| 581256871 | 344148459 | Step1/DLL Function | Function name in query DLL | LDAPBindAuth |
| -1513472258 | 344148459 | Step1/DLL Name | Query's DLL name | ClientAuth.DLL |
| 704661805 | 344148459 | Step1/Include In Cookie | Include query results in cookie | 1 |
| -838120726 | 344148459 | Step1/Maximum Execution Time | Maximum query execution time in [seconds] | 0 |
| 922587944 | 344148459 | Step1/Port | | 389 |
| 1170892639 | 344148459 | Step1/ProfileAttribute | | Room* |
| 237910181 | 344148459 | Step1/ProfileAttribute | | WorkPhone* |
| 1513326004 | 344148459 | Step1/ProfileAttribute | | EM* |
| 994538844 | 344148459 | Step1/Required | Query is required for authentication | 1 |
| 97150755 | 344148459 | Step1/Server | | betelgeuse |
| 2127089161 | 344148459 | Step1/UserDN | | ${UserID} |
| -945271402 | 344148459 | Step1/UserPwd | | ${UserPwd} |
| 1498465115 | 344148459 | Step2/DLL Function | Function name in query DLL | GetNTUserGroups |
| -1253821694 | 344148459 | Step2/DLL Name | Query's DLL name | ClientAuth |
| 423126273 | 344148459 | Step2/Include In Cookie | Include query results in cookie | 1 |
| 350791470 | 344148459 | Step2/Maximum ExecutionTime | Maximum query execution time in [seconds] | 0 |
| 412661527 | 344148459 | Step2/NTDomain | | INTERDYN |
| -1837754112 | 344148459 | Step2/Required | Query is required for authentication | 0 |
| 437704972 | 344148459 | Step2/UserID | | ${UserID} |
| 604303133 | 344148459 | Step2/UserPwd | | ${UserPwd} |

SmartCard Types : Table

| SmartcardDefID | Name | TypeID | Code | Description |
|---|---|---|---|---|
| -1175316966 | TonyM | 947715538 | 0 | RoomNumber=2236* |
| (AutoNumber) | | | | |

Fig. 50

```
select Cookie,IdentityIsValid, IsAllowed, reasoncode,
      maybelist, cookiemodified
from policyeval
where sourceip='192.168.36.215' and
      application='WS' and
      resource='BindNeptune.html&GET&192.168.36.217&
          pluto.interdyn.com&80&0'
      and includeeval='Y' and
      includeidentitystore='Y' and
      askclientforidentities='N' and
      identity= 'AUTHPOSTIDENTITY IDENTTYPE="LDAP Bind"&
          ORIGINALURL="BindNeptune.html&GET&            5204
          192.168.36.217&pluto.interdyn.com&80&0"&
          AUTHTYPE="LDAP Bind"&USER="fred"&PWD="agent99"&
          SUBMIT1="Log in"'
                    5205            5207         5209
                5211
```

5203 brackets the identity block. 5201 points to the whole query.

Fig. 52

5303 {
```
Cookie=CONCLAVE=COOKIEIDENTITY=COOKIEIDENTITY%26AUTHTYPE%
    3D%22LDAP%20Bind%22%26IDENTTYPE%3D%22LDAP%20Bind%
    22%26ORIGINALURL%3D%22BindNeptune.html%26GET%
    26192.168.36.217%26pluto.interdyn.com%2680%260%
    22%26SUBMIT1%3D%22Log%20in%22%26USER%3D%22fred%
    22%26UserName%3D%22cn%3Dfred%2Cou%3DQA%2Cou%
    3DEngineering%2Co%3DIDI%22&EXPIRES=Thu%2C%
    2008-Jun-2000%2000:28:41%20GMT&cn=fred&
    facsimileTelephoneNumber=805-666-5563&
    initials=ddf&mail=fred@interdyn.com&objectClass=top&
    objectClass=person&objectClass=organizationalPerson&
    objectClass=inetOrgPerson&roomNumber=2217&sn=user&
    telephoneNumber=805-652-2544&uid=fred&
    NONCE=f+7KBJmHR6/XWCTmREhmnQ&          ~ 5305
    SIG=qd0ZLcPBjMiPbGlR7C7urAXad2Q;       ~ 5307
    EXPIRES=Thu, 08-Jun-2000 00:28:41 GMT;
    MAX-AGE=960424121;
IdentityIsValid = Y  ~ 5309
IsAllowed = Y        ~ 5311
ReasonCode = 116
MaybeList =    5313
CookieModified = Y
```

5301 →  Fig. 53

ADAPTIVE ENCRYPTION

CROSS REFERENCE TO RELATED PATENT APPLICATIONS

This application is a continuation and claims the priority benefit of U.S. patent application Ser. No. 10/019,101, filed Dec. 20, 2001 now U.S. Pat. No. 7,580,919 and entitled "Query Interface to Policy Server," which is the U.S. national stage application and claims the priority benefit of Patent Cooperation Treaty patent application number PCT/US00/17078, filed Jun. 21, 2000 and entitled "Query Interface to Policy Server," which claims the priority benefit of U.S. provisional patent application No. 60/140,417, filed Jun. 22, 1999 and entitled "Using a Standard Database System Interface to Check Access to a Resource," and which is a continuation-in-part of Patent Cooperation Treaty patent application number PCT/US99/14585, filed Jun. 28, 1999 and entitled "Generalized Policy Server," which claims the priority benefit of U.S. provisional patent application No. 60/091,130, filed Jun. 29, 1998 and entitled "Generalized Policy Server," the disclosure of which is incorporated herein by reference.

BACKGROUND OF THE INVENTION

1. Field of the Invention

The invention relates generally to systems for responding to queries and relates more specifically to such systems as components of systems which control access to data.

2. Description of Related Art

The Internet has revolutionized data communications. It has done so by providing protocols and addressing schemes which make it possible for any computer system anywhere in the world to exchange information with any other computer system anywhere in the world, regardless of the computer system's physical hardware, the kind of physical network it is connected to, or the kinds of physical networks that are used to send the information from the one computer system to the other computer system. All that is required for the two computer systems to exchange information is that each computer system have an Internet address and the software necessary for the protocols and that there be a route between the two machines by way of some combination of the many physical networks that may be used to carry messages constructed according to the protocols.

The very ease with which computer systems may exchange information via the Internet has, however, caused problems. On the one hand, it has made accessing information easier and cheaper than it ever was before; on the other hand, it has made it much harder to protect information. The Internet has made it harder to protect information in two ways:

It is harder to restrict access. If information may be accessed at all via the Internet, it is potentially accessible to anyone with access to the Internet. Once there is Internet access to information, blocking skilled intruders becomes a difficult technical problem.

It is harder to maintain security en route through the Internet. The Internet is implemented as a packet switching network. It is impossible to predict what route a message will take through the network. It is further impossible to ensure the security of all of the switches, or to ensure that the portions of the message, including those which specify its source or destination, have not been read or altered en route.

FIG. 1 shows techniques presently used to increase security in networks that are accessible via the Internet. FIG. 1 shows network 101, which is made up of two separate internal networks 103(A) and 103(B) that are connected by Internet 111. Networks 103(A) and 103(B) are not generally accessible, but are part of the Internet in the sense that computer systems in these networks have Internet addresses and employ Internet protocols to exchange information. Two such computer systems appear in FIG. 1 as requestor 105 in network 103(A) and server 113 in network 103(b). Requestor 105 is requesting access to data which can be provided by server 113. Attached to server 113 is a mass storage device 115 that contains data 117 which is being requested by requester 105. Of course, for other data, server 113 may be the requestor and requester 105 the server. Moreover, access is to be understood in the present context as any operation which can read or change data stored on server 113 or which can change the state of server 113. In making the request, requester 105 is using one of the standard TCP/IP protocols. As used here, a protocol is a description of a set of messages that can be used to exchange information between computer systems.

The actual messages that are sent between computer systems that are communicating according to a protocol are collectively termed a session. During the session, Requestor 105 sends messages according to the protocol to server 113's Internet address and server 113 sends messages according to the protocol to requestor 105's Internet address. Both the request and response will travel between internal network 103(A) and 103(B) by Internet 111. If server 113 permits requestor 105 to access the data, some of the messages flowing from server 113 to requester 105 in the session will include the requested data 117. The software components of server 113 which respond to the messages as required by the protocol are termed a service.

If the owner of internal networks 103(A and B) wants to be sure that only users of computer systems connected directly to networks 103(A and B) can access data 117 and that the contents of the request and response are not known outside those networks, the owner must solve two problems: making sure that server 113 does not respond to requests from computer systems other than those connected to the internal networks and making sure that people with access to Internet 111 cannot access or modify the request and response while they are in transit through Internet 111. Two techniques which make it possible to achieve these goals are firewalls and tunneling using encryption.

Conceptually, a firewall is a barrier between an internal network and the rest of Internet 111. Firewalls appear at 109(A) and (B). Firewall 109(A) protects internal network 103(A) and firewall 109(B) protects internal network 103(B). Firewalls are implemented by means of a gateway running in a computer system that is installed at the point where an internal network is connected to the Internet. Included in the gateway is an access filter: a set of software and hardware components in the computer system which checks all requests from outside the internal network for information stored inside the internal network and only sends a request on into the internal network if it is from a sources that has the right to access the information. Otherwise, it discards the request. Two such access filters, access filter 107(A), and access filter 107(B), appear in FIG. 1.

A source has the right to access the requested information if two questions can be answered affirmatively:

Is the source in fact who or what it claims to be?

Does the source have the right to access the data?

The process of finding the answer to the first question is termed authentication. A user authenticates himself or herself to the firewall by providing information to the firewall that identifies the user. Among such information is the following:

information provided by an authentication token (sometimes called a smartcard) in the possession of the user;

the operating system identification for the user's machine; and the IP address and the Internet domain name of the user's machine.

The information that the firewall uses for authentication can either be in band, that is, it is part of the protocol, or it can be out of band, that is, it is provided by a separate protocol.

As is clear from the above list of identification information, the degree to which a firewall can trust identification information to authenticate a user depends on the kind of identification information. For example, the IP address in a packet can be changed by anyone who can intercept the packet; consequently, the firewall can put little trust in it and authentication by means of the IP address is said to have a very low trust level On the other hand, when the identification information comes from a token, the firewall can give the identification a much higher trust level, since the token would fail to identify the user only if it had come into someone else's possession. For a discussion on authentication generally, see S. Bellovin and W. Cheswick, *Firewalls and Internet Security*, Addison Wesley, Reading, Mass., 1994.

In modern access filters, access is checked at two levels, the Internet packet, or IP level, and the application level. Beginning with the IP level, the messages used in Internet protocols are carried in packets called datagrams. Each such packet has a header which contains information indicating the source and destination of the packet. The source and destination are each expressed in terms of IP address and port number. A port number is a number from 1 to 65535 used to individuate multiple streams of traffic within a computer. Services for well-known Internet protocols (such as HTTP or FTP) are assigned well known port numbers that they 'listen' to. The access filter has a set of rules which indicate which destinations may receive IP packets from which sources, and if the source and destination specified in the header do not conform to these rules, the packet is discarded. For example, the rules may allow or disallow all access from one computer to another, or limit access to a particular service (specified by the port number) based on the source of the IP packet. There is, however, no information in the header of the IP packet about the individual piece of information being accessed and the only information about the user is the source information. Access checking that involves either authentication of the user beyond what is possible using the source information or determining whether the user has access to an individual piece of information thus cannot by done at the IP level, but must instead be done at the protocol level.

Access checking at the application level is usually done in the firewall by proxies. A proxy is a software component of the access filter. The proxy is so called because it serves as the protocol's stand-in in the access filter for the purposes of carrying out user authentication and/or access checking on the piece of information that the user has requested. For example, a frequently-used TCP/IP protocol is the hyper-text transfer protocol, or HTTP, which is used to transfer World-Wide Web pages from one computer to another such computer system. If access control for individual pages is needed, the contents of the protocol must be inspected to determine which particular Web page is requested. For a detailed discussion of firewalls, see the Bellovin and Cheswick reference supra.

While properly-done access filtering can prevent unauthorized access via Internet 111 to data stored in an internal network, it cannot prevent unauthorized access to data that is in transit through Internet 111. That is prevented by means of tunneling using encryption. This kind of tunneling works as follows: when access filter 107(A) receives an IP packet from a computer system in internal network 103(A) which has a destination address in internal network 103(B), it encrypts the IP packet, including its header, and adds a new header which specifies the IP address of access filter 107(A) as the source address for the packet and the IP address of access filter 107(B) as the destination address. The new header may also contain authentication information which identifies access filter 107(A) as the source of the encrypted packet and information from which access filter 107(B) can determine whether the encrypted packet has been tampered with.

Because the original IP packet has been encrypted, neither the header nor the contents of the original IP packet can be read while it is passing through Internet 111, nor can the header or data of the original IP packet be modified without detection. When access filter 107(B) receives the IP packet, it uses any identification information to determine whether the packet is really from access filter 107(A). If it is, it removes the header added by access filter 107(A) to the packet, determines whether the packet was tampered with and if it was not, decrypts the packet and performs IP-level access checking on the original header. If the header passes, access filter 107(B) forwards the packet to the IP address in the internal network specified in the original header or to a proxy for protocol level access control. The original IP packet is said to tunnel through Internet 111. In FIG. 1, one such tunnel 112 is shown between access filter 107(A) and 107(B). An additional advantage of tunneling is that it hides the structure of the internal networks from those who have access to them only from Internet 111, since the only unencrypted IP addresses are those of the access filters.

The owner of internal networks 103(A) and 103(B) can also use tunneling together with Internet 111 to make the two internal networks 103(A and B) into a single virtual private network (VPN) 119. By means of tunnel 112, computer systems in network 103(A) and 103(B) can communicate with each other securely and refer to other computers as if network 103(A) and 103(B) were connected by a private physical link instead of by Internet 111. Indeed, virtual private network 119 may be extended to include any user who has access to Internet 111 and can do the following:

encrypt Internet packets addressed to a computer system in an internal network 103 in a fashion which permits an access filter 107 to decrypt them;

add a header to the encrypted packet which is addressed to filter 107; and authenticate him or herself to access filter 107.

For example, an employee who has a portable computer that is connected to Internet 111 and has the necessary encryption and authentication capabilities can use the virtual private network to securely retrieve data from a computer system in one of the internal networks.

Once internal networks begin using Internet addressing and Internet protocols and are connected into virtual private networks, the browsers that have been developed for the Internet can be used as well in the internal networks 103, and from the point of view of the user, there is no difference between accessing data in Internet 111 and accessing it in internal network 103. Internal network 103 has thus become an intranet, that is, an internal network that has the same user interface as Internet 111. Of course, once all of the internal networks belonging to an entity have been combined into a single virtual private intranet, the access control issues characteristic of the Internet arise again—except this time with regard to internal access to data. While firewalls at the points where the internal networks are connected to Internet 111 are perfectly sufficient to keep outsiders from accessing data in the internal networks, they cannot keep insiders from accessing that data. For example, it may be just as important to a company to protect its personnel data from its employees as to protect it from outsiders. At the same time, the company may want to make its World Wide Web site on a computer system in one of the internal networks 103 easily accessible to anyone who has access to Internet 111.

One solution to the security problems posed by virtual private intranets is to use firewalls to subdivide the internal networks, as well as to protect the internal networks from unauthorized access via the Internet. Present-day access filters 107 are designed for protecting the perimeter of an internal network from unauthorized access, and there is typically only one access filter 107 per Internet connection. If access filters are to be used within the internal networks, there will be many more of them, and virtual private networks that use multiple present-day access filters 107 are not easily scalable, that is, in virtual private networks with small numbers of access filters, the access filters are not a serious burden; in networks with large numbers of access filters, they are. The access filters described in the part of the present patent application which precedes the section titled Generalization of the techniques employed in access filter 203 in fact solves the scalability problems of prior-art access filters and thus greatly ease the implementation of networks with large numbers of access filters.

In the course of further work on the access filters described in the first part of the present patent application, it has become apparent that the techniques developed to do access checking. in access filter 203 would be even more useful if they could be generalized: if they could be used in contexts other than access filters operating at the IP filter or Internet protocol levels and if they could be made to be extensible, so that policies could be made not only for access to information sets, but for any action that could be performed on an entity accessible through a computer system, so that user groups could include any kind of entity that can perform an action through a computer system, and so that information sets could become resource sets, where a resource is any entity that can be controlled via a computer system. It further became apparent that policies would be even more useful if they were permitted to include a temporal component, for example, a component which permitted a certain group of users access to certain resources only during non-working hours and that it would also be beneficial to be able to associate attributes with a policy that described how the policy's action was to be performed. For instance, a policy might specify not only that members of a given user group could access a given resource, but also the class of network service to be used for the access.

Development work has continued on the generalized policy server of the parent of the present patent application, and significant improvements have resulted. One improvement is the protocol used to transfer messages between a policy-enabled component of a system and the generalized policy server. In the parent, such messages were used to provide the generalized policy server with the information it needed to make the access determination and return the result of the access determination to the policy-enabled component. No particular protocol for the messages was specified. While any protocol that provides for the transfer of the information required by the general policy server to make the access determination and the results of the access determination between the policy-enabled component and the general policy server would do, what was needed was a protocol that had a form that was familiar to most programmers, that could be easily incorporated into existing and new programs, and that could deal easily with the fact that at least part of the information needed to make an access determination is often not available before the request for access is made.

Another improvement solves a problem of the access control systems of the parent and grandparent of the present application, namely that in the grandparent of the present patent application, both the kinds of information that could be used for authentication and user group membership determination and the sources of that information were predefined; in the access control system described in the parent of the present patent application, system administrators could define information to be used to determine user group membership, but the sources of that information were still predefined. It was thus not possible to use information from a source such as a business's general database system to make a determination whether to allow access. It was also not possible to use the access control system to return information other than information required for the access checking. process to the policy-enabled client. Among the objects of the inventions disclosed herein are thus providing an improved protocol for communicating between a policy-enabled component and a generalized policy server and providing technique that permits the access control system to define sources of information accessed in the access checking process, ways of obtaining the information, and uses of the information within the access checking process.

SUMMARY OF THE INVENTION

The invention attains the foregoing objects as follows:
The improved generalized policy server provides an interface to the policy-enabled component which presents the access control system as a virtual relational database table in which there is a row for every user-information source combination; to determine whether a user has access to an information source, the policy-enabled component addresses a query indicating the user and the information source to the table; the result indicates at least whether the user has access. The relational database table is virtual because a real table would tend at a minimum to be very large and would in very many cases simply be undefinable. A virtual database service in the improved generalized policy server assembles the information needed for the query result using data sources that are accessible to it. In a preferred embodiment, the query is written in the well-known SQL language and the virtual database service emulates standard remotely-accessible database systems.

The improved generalized policy server permits administrators of the access control system to define methods of obtaining information about users and associating these methods with user groups. The methods may define ways of collecting information from the user, ways of collecting information about the user from external sources, and ways of using the collected information to authenticate the user, to determine the membership of the user in a user group, and to provide information about the user to the policy-enabled component.

Other objects and advantages of the invention will be apparent to those skilled in the arts to which the invention pertains upon perusing the following Detailed Description and Drawing, wherein:

BRIEF DESCRIPTION OF THE DRAWING

FIG. 6 is a table used in defining the relationship between sensitivity and trust levels and authentication and encryption techniques;

FIG. 28 shows a syntax used to define generalized policies;

FIG. 32 shows a window used in a preferred embodiment to define a schedule rule;

FIG. 39 shows the top level of an application programmer's interface to the improved message protocol;

FIG. 40 shows a function ConclavePolicyAllowed which implements the improved message protocol;

FIG. 41 shows a schema for a query interface to the generalized policy server;

FIG. 42 shows first examples of queries to VDB Service 3813 and their results;

FIG. 43 shows second examples of queries to VDB Service 3813 and their results;

FIG. 49 shows tables in database 4401 that are used to define custom authentication types;

FIG. 50 shows additional tables in database 4401 that are used to define custom authentication types;

FIG. 52 shows how the information collected via the browser window of FIG. 51 is returned to the virtual database service in a query;

FIG. 53 shows the response to the query of FIG. 52; and

Figure 1:
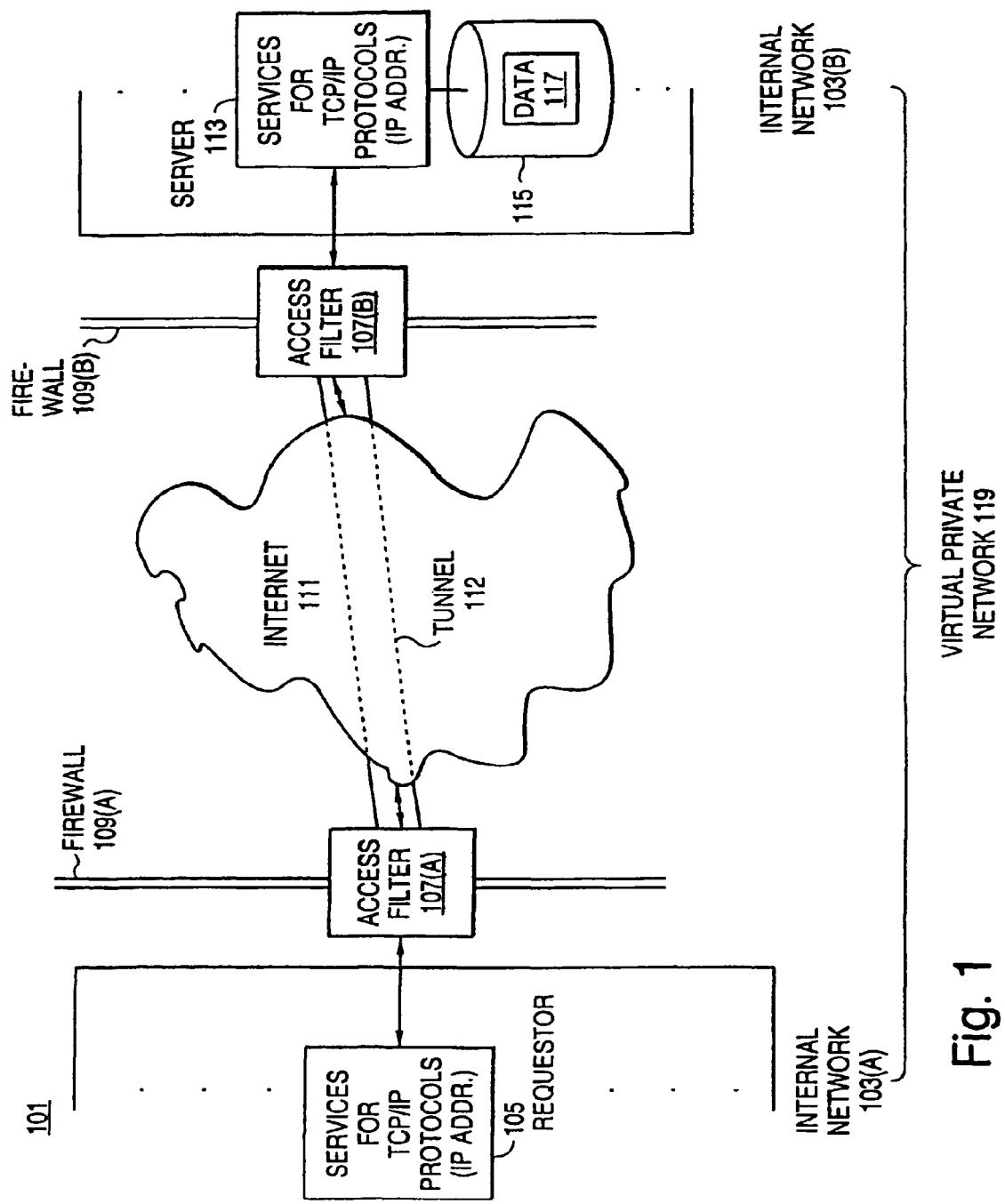
FIG. 1 is an overview of techniques used to control access of information via the Internet.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

The following Detailed Description will first provide an overview of access filters that are easily scalable, of how they are used to control access in intranets, and of how they can be used to construct virtual private networks. Thereupon, the Detailed Description will provide details of the access-control database used in the filters, of the manner in which it is changed and those changes are distributed among the filters, and of the manner in which an individual filter controls access.

Figure 2:
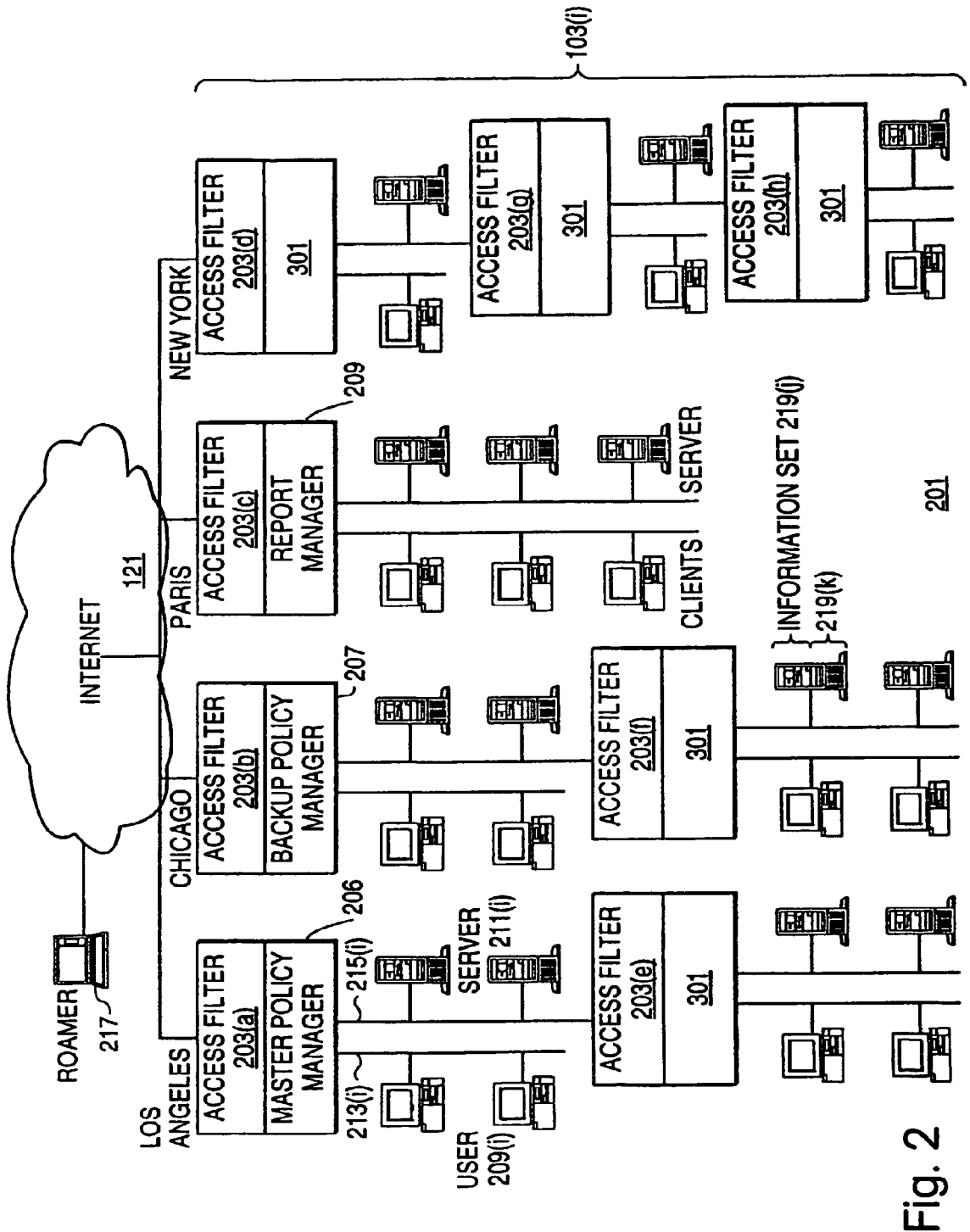
FIG. 2 is an overview of a VPN that uses access filters incorporating the techniques disclosed herein.

A Network with Access Filters that do not Interfere with Scalability: FIG. 2

FIG. 2 shows a virtual private network (VPN) 201 in which access to data is controlled by access filters that are designed to avoid the problems posed by multiple access filters. VPN 201 is made up of four internal networks 103 which are connected to each other by Internet 121. Also connected to VPN 201 via Internet 121 is a roamer 217, that is, a computer system which is being used by a person who may access data in intranet 201, but is connected to the internal networks only by Internet 121. Each internal network 103 has a number of computer systems or terminals 209 belonging to users and a number of servers 211 which contain data that may be accessed by users at systems or terminals 209 or by a user at roamer 217. However, no computer system or terminal 209 or roamer 217 is connected directly to a server 211; instead, each is connected via an access filter 203, so that all references made by a user at a user system to a data item on a server go through at least one access filter 203. Thus, user system 209(*i*) is connected to network 213(*i*), which is connected to access filter 203(*a*), while server 211(*i*) is connected to network 215(*i*), which is also connected to access filter 203(*a*), and any attempt by a user at user system 209(*i*) to access data on server 211(*i*) goes through access filter 203(*a*), where it is rejected if the user does not have the right to access the data.

If VPN 201 is of any size at all, there will be a substantial number of access filters 203, and consequently, scaling problems will immediately arise. Access filters 203 avoid these problems because they are designed according to the following principles:

Distributed access control database. Each access filter 203 has its own copy of the access control database used to control access to data in VPN 201. Changes made in one copy of the database are propagated to all other copies.

Distributed administration. Any number of administrators may be delegated responsibility for subsets of the system. All administrators may perform their tasks simultaneously.

Distributed access control. Access control functions are performed at the near-end access filter 203. That is, the first access filter 203 in the path between a client and the server determines if the access is allowed and subsequent access filters in the path do not repeat the access checks made by the first access filter.

End-to-end encryption. Encryption occurs between the near-end access filter and the furthest encryption endpoint possible. This endpoint is either the information server itself or the far-end access filter 203—the one last in the route from client to server. Dynamic tunnels are created based on current network routing conditions Adaptive encryption and authentication. Variable levels of encryption and authentication requirements are applied to traffic passed through the VPN, based on the sensitivity of the information being transmitted.

All of these aspects of the design will be discussed in more detail below.

It should be pointed out at this point that access filter 203 may be implemented in any A fashion which ensures that all references to data in VPN 201 which are made by users who may not be authorized to access that data go through an access filter 203. In a preferred embodiment, access filter 203 is implemented on a server and runs under the Windows NT® operating system manufactured by Microsoft Corporation. In other embodiments, access filter 203 may be implemented as a component of an operating system and/or may be implemented in a router in VPN 201.

Figure 3:
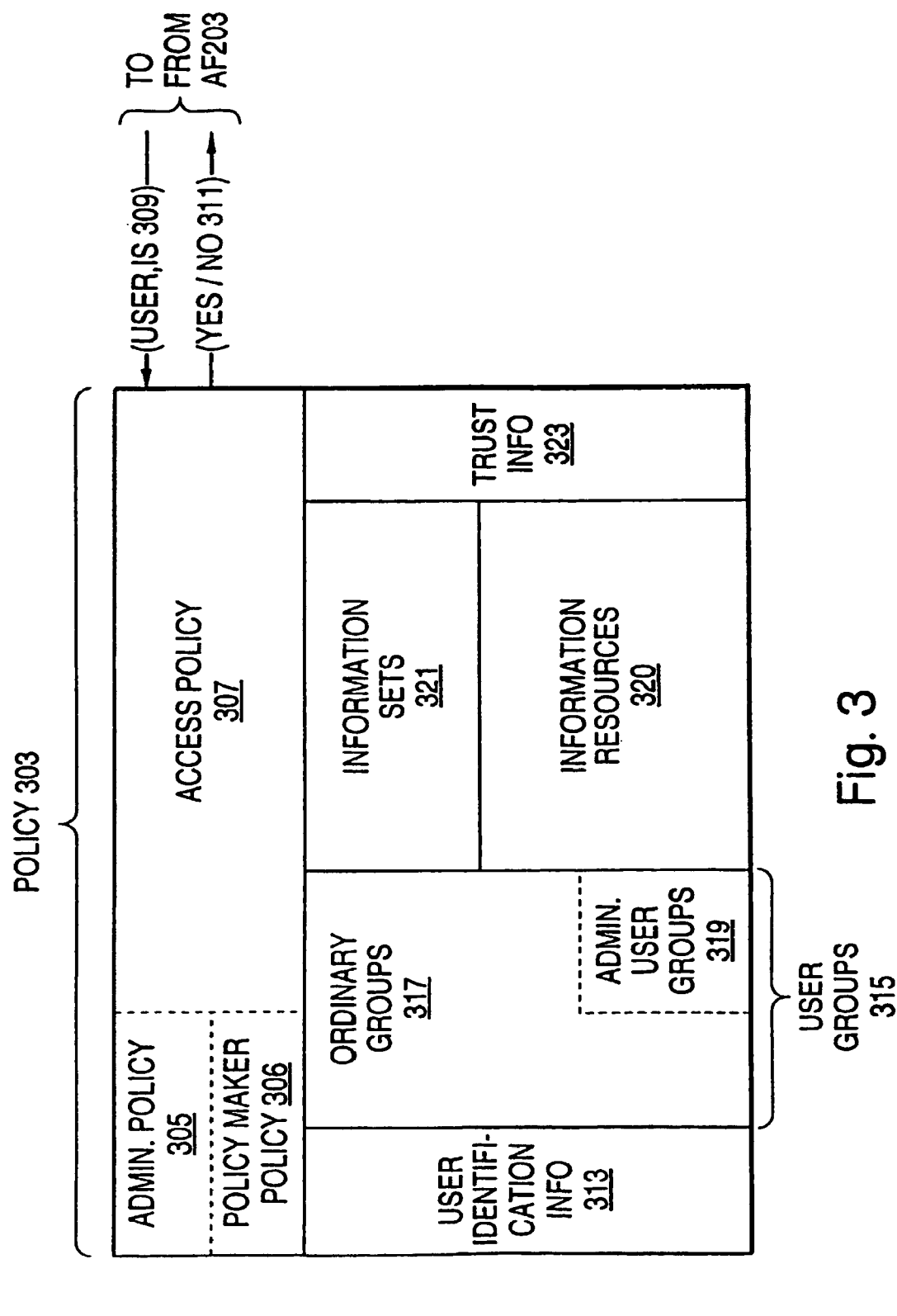
FIG. 3 is an overview of an access control database that is used in the access filters.

Distributed Policy Database: FIG. 3

Each access filter 203 has a copy of an access control database 301 that holds all data relevant to access control in VPN 201. One access filter, shown as access filter 203(*a*) in FIG. 2, has a master copy 205 of access control database 301. Because of this, access filter 203(*a*) is termed the Master Policy Manager. The master copy 205 is the one that is used to initialize new access filters 203 or replace a damaged access control database 301. The backup for the master policy manager computer is access filter 203(*b*). Backup 207 is a mirror image of master copy 205. Report manager 209, finally, includes software for generating reports from the information in access control database 301 and from logs obtained from all other access filters 203. Any copy of access control database 301 may be altered by any user who has the access required to do so; as will be described in more detail later, any such alteration is propagated first to master policy manager 205 and then to all of the other access filters 203 in virtual private network 201.

FIG. 3 is a conceptual overview of access control database 301. The primary function of the database is to respond to an access request 309 from access filter 203 which identifies a user and an information resource with an indication 311 of whether the request will be granted or denied. The request will be granted if both of the following are true:

The user belongs to a user group which data base 301 indicates may access an information set to which the information resource belongs; and the request has a trust level which is at least as high as a sensitivity level belonging to the information resource.

Each user belongs to one or more of the user groups and each information resource belongs to one or more information sets; if none of the user groups that the user belongs to is denied access to an information set that the resource belongs to and any of the user groups that the user belongs to is allowed access to any of the information sets that the information resource belongs to, the user may access the information resource, provided that the request has the requisite trust level.

The sensitivity level of a resource is simply a value that indicates the trust level required to access the resource. In general, the greater the need to protect the information resource, the higher its sensitivity level. The trust level of a request has a number of components:

the trust level of the identification technique used to identify the user; for example, identification of a user by a token has a higher trust level than identification of the user by IP address.

the trust level of the path taken by the access request through the network; for example, a path that includes the Internet has a lower trust level than one that includes only internal networks. if the access request is encrypted, the trust level of the encryption technique used;

the stronger the encryption technique, the higher the trust level.

The trust level of the identification technique and the trust level of the path are each considered separately. The trust level of the path may, however, be affected by the trust level of the encryption technique used to encrypt the access request. If the request is encrypted with an encryption technique whose trust level is higher that the trust level of a portion of the path, the trust level of the portion is increased to the trust level of the encryption technique. Thus, if the trust level of a portion of a path is less than required for the sensitivity level of the resource, the problem can be solved by encrypting the access request with an encryption technique that has the necessary trust level.

The information contained in database 301 may be divided into five broad categories:

user identification information 313, which identifies the user;

user groups 315, which defines the groups the users belong to;

information resources 320, which defines the individual information items subject to protection and specifies where to find them;

information sets 321, which defines groups of information resources;

trust information 323, which specifies the sensitivity levels of information resources and the trust levels of user identifications and network paths; and policy information 303, which defines access rights in terms of user groups and objects in VPN 201.

Policy information is further divided into access policy 307, administrative policy 305, and policy maker policy 306.

access policy 307 defines rights of access by user groups to information sets;

administrative policy 305 defines rights of user groups to define/delete/modify objects in VPN 201. Among the objects are access policies, information sets, user groups, locations in VPN 201, servers, and services; and policy maker policy 306 defines rights of user groups to make access policy for information sets.

The user groups specified in the administrative policy and policy maker policy portions of database 301 are user groups of administrators. In VPN 201, administrative authority is delegated by defining groups of administrators and the objects over which they have control in database 301. Of course, a given user may be a member of both ordinary user groups 317 and administrative user groups 319.

Identification of Users

User groups identify their members with user identification information 313. The identification information identifies its users by means of a set of extensible identification techniques. Presently, these identification techniques include X.509 certificates, Windows NT Domain identification, authentication tokens, and IP address/domain name. The kind of identification technique used to identify a user determines the trust level of the identification.

Where strong identification of a user or other entity that an access filter 203 communicates with is required, VPN 201 employs the Simple Key Management for Internet Protocols (SKIP) software protocol, developed by Sun Microsystems, Inc. The protocol manages public key exchange, authentication of keys, and encryption of sessions. It does session encryption by means of a transport key generated from the public and private keys of the parties who are exchanging data. Public keys are included. in X.509 certificates that are exchanged between SKIP parties using a separate protocol known as the Certificate Discovery Protocol (CDP). A message that is encrypted using SKIP includes in addition to the encrypted message an encrypted transport key for the message and identifiers for the certificates for the source and destination of the data. The recipient of the message uses the identifiers for the certificate of the source of the message to locate the public key for the source, and uses its keys and the source's public key to decrypt the transport key and uses the transport key to decrypt the message. A SKIP message is self-authenticating in the sense that it contains an authentication header which includes a cryptographic digest of the packet contents and modification of any kind will render the digest incorrect. For details on SKIP, see Ashar Aziz and Martin Patterson, Simple Key-Management for Internet Protocols (SKIP), which could be found on Feb. 28, 1998 at http://www.skip.org/inet-95.html. For details on X.509 certification, see the description that could be found on Sep. 2, 1997 at http://www.rnbo.com/PROD/rmadillo/p/pdoc2.htm.

In VPN 201, SKIP is also used by access filters 203 to identify themselves to other access filters 203 in the VPN and to encrypt TCP/IP sessions where that is required. Access filters 203 can also use the certificates for the SKIP keys to identify users when they are performing access checks. Such an identification is particularly trustworthy and has a correspondingly high trust level. One use for such identification by mean of certificate is for trustworthy identification of a "roamer" 217. The X.509 certificates can be used for user identification because they relate the key information to information about the user.

Access filter 203 uses the following fields of information from the certificates:

Expiration Date. The date after which the certificate is invalid.

Public Key. The public half of a public-private key pair, as used in the SKIP-based cryptography that Conclave uses.

Certificate Authority Signature. The distinguished name associated with the authority that issued the certificate.

Serial Number for the certificate

Subject name, the name of the entity the certificate was issued to.

The subject name includes the following subfields (the value in parentheses is the common abbreviation for the field):

Common Name (CN). The given name of the subject, for example, John Q. Public.

Country (C). The country in which the subject resides. Country codes are 2-letter codes specified in the X.509 specification.

Locality (L). The location at which the subject resides. This is usually the city in which the subject resides, but can be used for any location-related value.

Organization (O). The organization to which the subject belongs. This is usually the organization's name.

Organizational Unit (OU). The organizational unit for the subject. This is usually the department for the subject, for example, "sales". The X.509 certificate allows up to four of these fields to exist.

A Certificate Authority used with access filters 203 issues certificates with all of these fields. Further, the four OU fields can be used to define additional categories. The information used to describe a user in a certificate is available to the administrators of data base 301 for use when defining user groups. If the information in the certificates properly reflects the organizational structure of the enterprise, a certificate will not only identify the user, but show where the user fits in the enterprise's organization and to the extent that the user groups in data base 301 reflect the organizational structure, the user groups that the user belongs to.

As will be explained in more detail later, one way in which members of user groups may be defined is by certificate matching criteria which define the values of the fields which a certificate that belongs to a member of a given user group must have. The certificate matching criteria can be based on as few or as many of the above fields as desired. For example, the certificate matching criteria for the Engineering user group might be the organization field and an organization unit field specifying the engineering department. Other information that identifies a user may be used to define members of user groups as well.

Information Sets

Information sets hold collections of individual information resources. A resource may be as small as an individual WWW page or newsgroup, but most often it will consist of a Web directory tree and its contents, FTP accounts, or major Usenet news categories. Two information sets, 219(*j*) and (*k*), are shown in one of the servers of FIG. 2. While it is completely up to the administrators of access control database 301 to determine what information is included in an information set, the information in a given set will generally be information that is related both topically and by intended audience. Example information sets for a corporation might be HR policies, HR Personnel Records, and Public Information.

Access Policy 307

Conceptually, access policy 307 consists of simple statements of the form:

| | | |
|---|---|---|
| Engineers | allowed access to | engineering data |
| Internet | allowed access to | public web site |

The first column specifies user groups; the last column specifies information sets. The middle column is the access policy—allow or deny.

Database 301 permits hierarchical definition of both user groups and information sets. For example, the Engineers user group may be defined as including a Hardware Engineers user group, a Software Engineers user group, and a Sales Engineers user group. Similarly, the engineering data information set may be defined as including a hardware engineering data information set, a software engineering data information set, and a sales engineering data information set. Access rights are inherited within hierarchies of user groups. Thus, a user who belongs to the Hardware Engineers user group also automatically belongs to the Engineers user group for access checking purposes. Access rights are similarly inherited within hierarchies of information sets. An information resource that belongs to the hardware engineering information set also automatically belongs to the engineering data information set for access checking purposes. Thus, if there is an access policy that gives Engineers access to engineering data, any user who is a member of one of the three user groups making up Engineers may access any information resource that belongs to any of the three information sets making up engineering data. The use of inheritance in the definitions of user groups and information sets greatly reduces the number of access policies 307 that are required in access control database 301. For instance, in the above example, a single access policy gives all engineers access to all engineering data. Inheritance also makes it possible to define virtually all access policies in terms of allowing access. Continuing with the above example, if there is a user group Salespeople that does not belong to Engineers and there is an access policy that gives that user group access to sales engineering data, a user who is a member of Salespeople will be able to access sales engineering data, but not software engineering data or hardware engineering data.

A user may of course belong to more than one user group and an information resource may belong to more than one information set. There may also be different access policies for the various user groups the user belongs to and the various information sets the information resource belongs to. When faced with multiple access policies that apply to the user and to the information resource that the user is seeking to access, access filter 203 applies the policies in a restrictive, rather than permissive way:

If multiple policies allow or deny a user group's access to an information set, policies that deny access prevail.

If a particular user is a member of multiple user groups, and multiple policies allow or deny access to the information set, policies that deny access prevail.

What user groups a user belongs to may vary according to the mode of identification used to identify the user. Thus, if no access policies apply for the user groups that the user belongs to according to the modes of identification that the user has thus far provided to access filter 203, access filter 203 may try to obtain additional identification information and determine whether the additional identification information places the user in a user group for which there is a policy regarding the resource. Access filter 203 may obtain the additional identification information if:

The user has installed the User Identification Client (software that runs on the user's machine and provides identification information about the user to access filter 203).

The UIC is currently running on the user's machine.

The user has enabled his UIC to popup for further authentication. (The user has a check box that enables this feature.)

If all of these requirements are true, then access filter 203 will force the user's UIC to pop-up and ask for further identification information. Any identification information that the user supplies is saved. After each new piece of user identification information, access filter 203 performs the same evaluation process, popping up the UIC window until identification information is obtained that places the user in a user group for which there is an access policy that permits or denies access or until the user gives up on his or her request.

Administrative Policies 305

The administrative policies 305 implement administration of objects in VPN 201's access control system. Included in the objects are user groups, information sets, access policies, and what are termed herein available resources, that is, the services, servers, access filters, and network hardware making up VPN 201. An object is administered by one or more administrative user groups. A member of an administrative user group that administers a given object may modify the object and its relationship to other objects and may make administrative policy for the object. As will be explained in more detail later, the fact that a member of an administrative user group that administers an object may make administrative policy for the object makes it possible for the member to delegate administration of the object. For example, a member of an administrative user group that administers a Hardware Engineers user group may make an administrative policy that gives administration of the Hardware Engineers to a Hardware Engineering Administrator user group, thereby delegating administration of Hardware Engineers to Hardware Engineering Administrator. It should be noted that the right to administer an information set is separate from the right to make access policy for the information set. The fact that a user group has the right to make access policy concerning an information set does not give the user group the right to make administrative policy for the information set, and vice-versa. When an access filter 203 is first set up, a single built-in security officer user group has administrative authority over all of the objects in VPN 201 and over policy maker policy 306.

Inheritance with Administrative Policy

Inheritance works with administrative policy the same way that it does with access policy. The user groups, information sets, and available resources to which administrative policies are directed are hierarchically organized: Within the user groups, user groups that are subsets of a given user group are at the next level down in the hierarchy of user groups from the given user group. The same is the case with information sets. Inheritance applies within the hierarchy in the same fashion as with access policy. Thus, within the user group hierarchy an administrative user who controls a user group also controls all subsidiary, contained user groups. Similarly, with the information set hierarchy an administrative user who controls the information set also controls all subsidiary, contained information sets and an administrative user who controls access policy for an information set also controls access policy for all contained information sets.

There is further a natural hierarchy of available resources. For example, one level of the hierarchy is locations. Within a given location, the servers at that location form the next level down, and within a server, the services offered by the service form the next level. The administrative user group that has control of any level of the available resources tree also controls all lower levels. For example, the administrator(s) to whom an administrative policy gives control of an access filter 203 has administrative rights to all servers beneath that site, all services running on those servers and all resources supported by those services.

Figure 25:
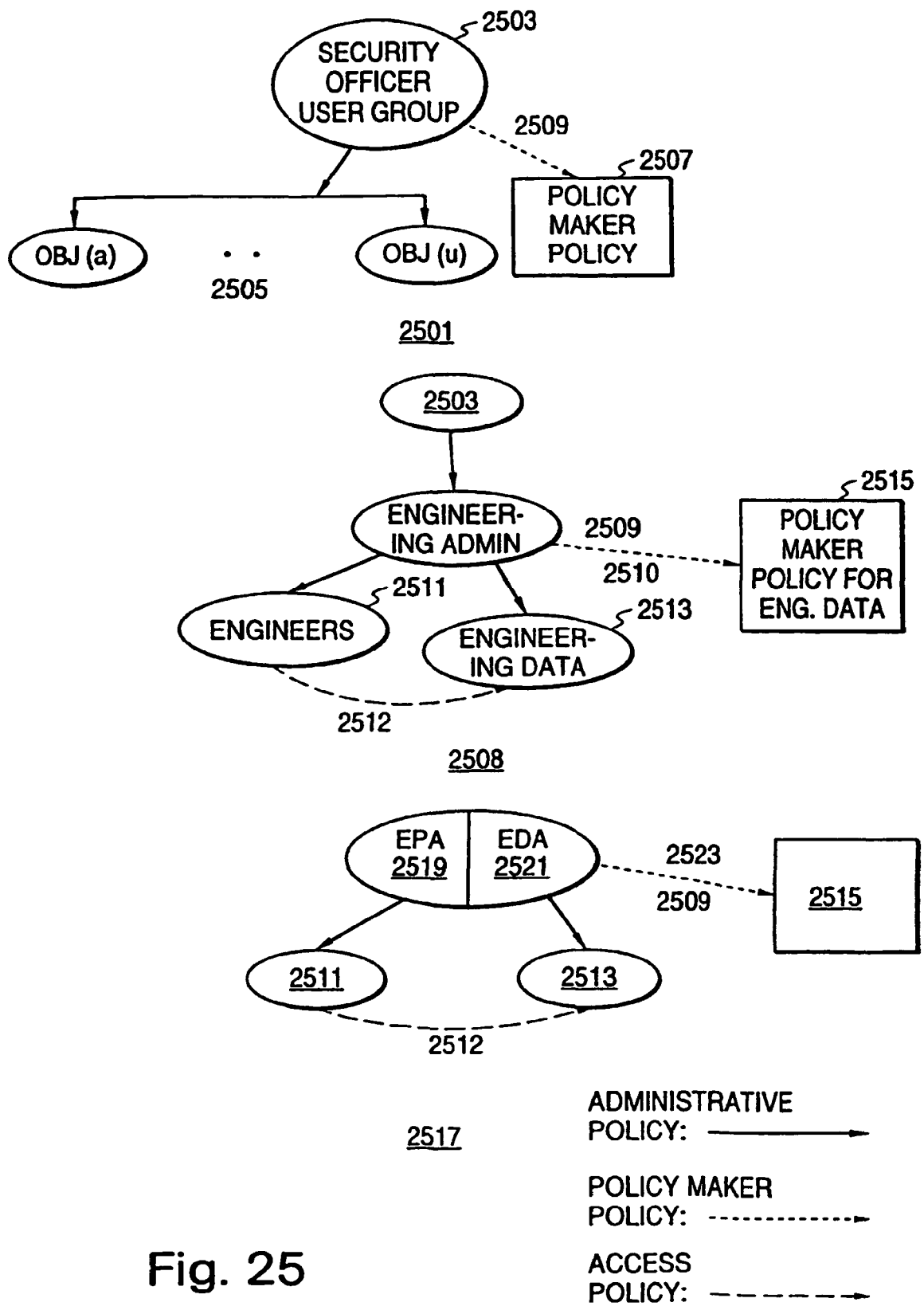
FIG. 25 is a diagram illustrating delegation in VPN 201.

Delegation: FIG. 25

Delegation is easy in VPN 201 because the members of the administrative user group that administers an object may both modify the object and make administrative policy for it. For example, if an administrative user group administers an information set, it can divide the information set into two subsets and make new administrative policies which give each of two other user groups administrative authority over one of the two subsets.

FIG. 25 gives an extended example of delegation. In FIG. 25, user groups and other objects are represented by circles; policy maker policy is represented by a square box; policy relationships are expressed by different kinds of arrows: a solid arrow for administrative policy, a dotted arrow for policy maker policy, and a dashed arrow for access policy. The part of the figure labeled 2501 shows the situation when access filter 203 is being set up: the built-in Security Officer user group 2503 has administrative authority over all of the built-in objects 2505 and over policy maker policy 2507. Members of Security Officer user group 2503 use their administrative authority to make subsets of objects 2505, rearrange the object hierarchies, and set up policy maker policy 2507.

One result of the activity of Security Officer user group 2503's activity is seen in the section of FIG. 25 labeled 2508. A member of Security Officer user group 2503 has set up an Engineering Administrators administrative user group 2509, an Engineers user group 2511, and an Engineering Data information set 2513 and has given Engineering Administrators administrative authority over Engineers and Engineering Data. The member of Security Officer has also set up policy maker policy 2507 so that Engineering Administrators has the right to make access policy for Engineering Data, as shown by dotted arrow 2510. A member of Engineering Administrators has used that right to make access policy that permits members of Engineers 2511 to access information in Engineering Data 2513, as shown by dashed arrow 2512. The member of Security Officer has thus delegated the administrative authority over Engineers 2511, Engineering Data 2513, and over access to Engineering Data to Engineering Administrators 2509.

Security Officer 2503 of course still has administrative authority over Engineering Administrators and can use that authority for further delegation. An example is shown at 2517. A member of Security Officer 2503 has divided Engineering Administrators into two subsets: Engineering Personnel Administrators (EPA) 2519 and Engineering Data Administrators (EDA) 2521. The members of these subsets inherit administrative rights over Engineers 2511 and Engineering Data 2513 from Engineering Administrators 2509. The members of EPA 2519 and EDA 2521 use these administrative rights to delegate administrative authority over Engineers 2511 to Engineering Personnel Administrators 2519 and administrative authority over Engineering Data 2513 to Engineering Data Administrators 2521. The members of EPA 2519 and EDA 2521 have further used their right to make access policy for Engineering Data 2513 to change the access policy so that access policy for Engineering Data is made by Engineering Data Administrators 2513, as shown by dotted arrow 2523, instead of by Engineering Administrators, thereby delegating that function to Engineering Data Administrators.

Members of Engineering Personnel Administrators and Engineering Data Administrators can now use their administrative rights over Engineers, Engineering Data, and access policy for Engineering Data to refine access to Engineering Data. For example, a member of Engineering Personnel Administrators might subdivide Engineers into Software Engineers and Hardware Engineers and a member of Engineering Data Administrators might subdivide Engineering Data into Hardware Engineering Data and Software Engineering Data.

That done, a member of Engineering Data Administrators might replace the access policy giving Engineers access to Engineering Data with access policies that give Software Engineers access to Software Engineering Data and Hardware Engineers access to Hardware Engineering Data.

In summary, it may be said that the administrators who have control over a user group are responsible for correctly defining membership in the user group; they may delegate any part of this responsibility to other administrators. Similarly, administrators who have control over an information set are responsible for correctly including information resources into the information set; they may delegate any part of this responsibility to other administrators. The latter administrators must of course also be administrators for some available resource from which the information being added to the information set may be obtained. Administrators of available resources carry responsibility for overall network and security operation. Likewise, they may delegate their responsibilities. Policy maker administrators, finally, hold the ultimate control over access to information. They alone may create access policies related to specific information sets. In a sense, the policy makers determine the overall information sharing policy for the enterprise. Administrators for the user groups, information sets, and available resources then determine the particulars of implementation.

Figure 4:
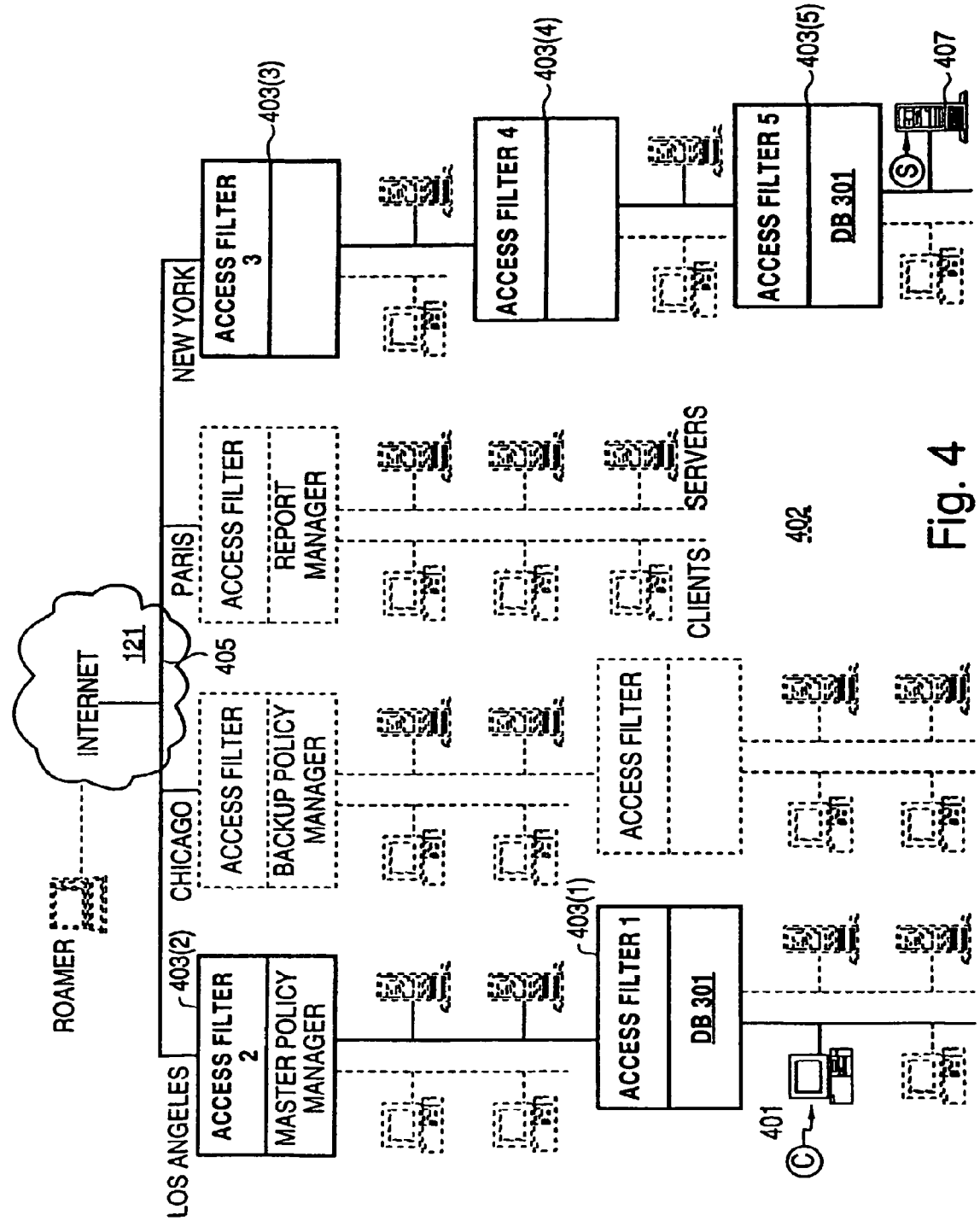
FIG. 4 shows access checking and tunneling in a VPN that uses access filters incorporating the techniques disclosed herein.

Access Control using Filters 203 and Database 301: FIG. 4

As shown in FIG. 2, an access filter 203 has a position in VPN 201 which puts it between the client from which the user is requesting access to the information resource and the server upon which the information resource resides. The access filter 203 is thus able to control access by the user to the resource by interceding in the communication between a user and a service on the server which is able to provide the user with access to the information resource. In order for the user to gain access to the information resource, a session must be established between the user and the service. In the present context, the term session is defined liberally, to include well-behaved connectionless protocols. When an access filter 203 observes an attempt by a user to initiate a session with a service, it determines whether access should be permitted. It does so from the known identity of the user, the information resource to which the information is being accessed, the sensitivity level of the information, and the trust levels of the user identification, of the path between the user and the service, and of any encryption technique used.

FIG. 4 shows how a session can involve more than one access filter 203. Session 402 shown in FIG. 4 involves five access filters 203, numbered 403(1 ... 5) in the Figure. Access filters 203 are designed such that the decision whether to grant a user access to an information resource need only be made in one of the access filters 203. The key to this feature of access filters 203 is their ability to authenticate themselves to each other. SKIP is used to do this. Every access filter 203 has an X.509 certificate that binds the access filter 203's keys to the access filter's name and is signed by the Certificate Authority for the VPN. Each access filter 203 has the names and IP addresses of all of the other access filters in VPN 201 in data base 301, and upon arrival of a session that is encrypted using SKIP, each access filter uses the Subject Name from the certificates as described above in the discussion of SKIP to determine whether SKIP-encrypted network traffic is from another access filter 203 in VPN 201.

If the access filter receiving the session is not the destination of the session, (that is, the access filter functions simply as an IP router along the path), the access filter merely verifies from data base 301 that the destination IP address is the IP address of some other access filter 203 in VPN 201. If that is the case, then the session is allowed to pass without additional checking. When the request reaches the last access filter 203, the last access filter 203 uses SKIP to decrypt the request, to confirm that the request was indeed checked by the first access filter 203, and to confirm that the request has not been modified in transit.

Thus, in FIG. 4, access filter 403(1) uses its own copy of access control database 301 to determine whether the user who originates a session has access to the information resource specified for the session. If access filter 403(1) so determines, it authenticates the session's outgoing messages and encrypts them as required to achieve the proper trust level. Access filters 403(2 . . . 5) then permit the session to proceed because the session is from access filter 403(1) and has been encrypted with SKIP and neither decrypt the messages nor check them using their own copies of access control database 301. Access filter 403(5) then decrypts the messages, confirms that they were encrypted and therefore checked by access filter 403(1), and if the messages are intact, forwards them to server 407 that contains the desired resource. Messages in the session which pass between server 407 and user system 401 are treated in the same way, with access filter 403(5) encrypting them if necessary, access filters 403(2 . . . 4) passing them through on the basis of the authentication by 403(5), and access filter 403(1) passing the message on to system 401 on the basis of the authentication and decrypting the message if necessary.

What this technique effectively does is to make a tunnel 405 for the session between access filter 403(1) and access filter 403(5), and because of the tunnel, only the access filter 403 closest to the client needs to do decryption, access checking, and reencryption. Moreover, the tunnel is equally secure in the internal networks and in Internet 121. In a large VPN, access filter 403(1) is in the best position to check access, because it has access to the most detailed information about the user who originates the session. The technique of performing the access check at the first access filter 401 further distributes the access control responsibility evenly across the VPN, allowing it to scale to any size.

Figure 5:
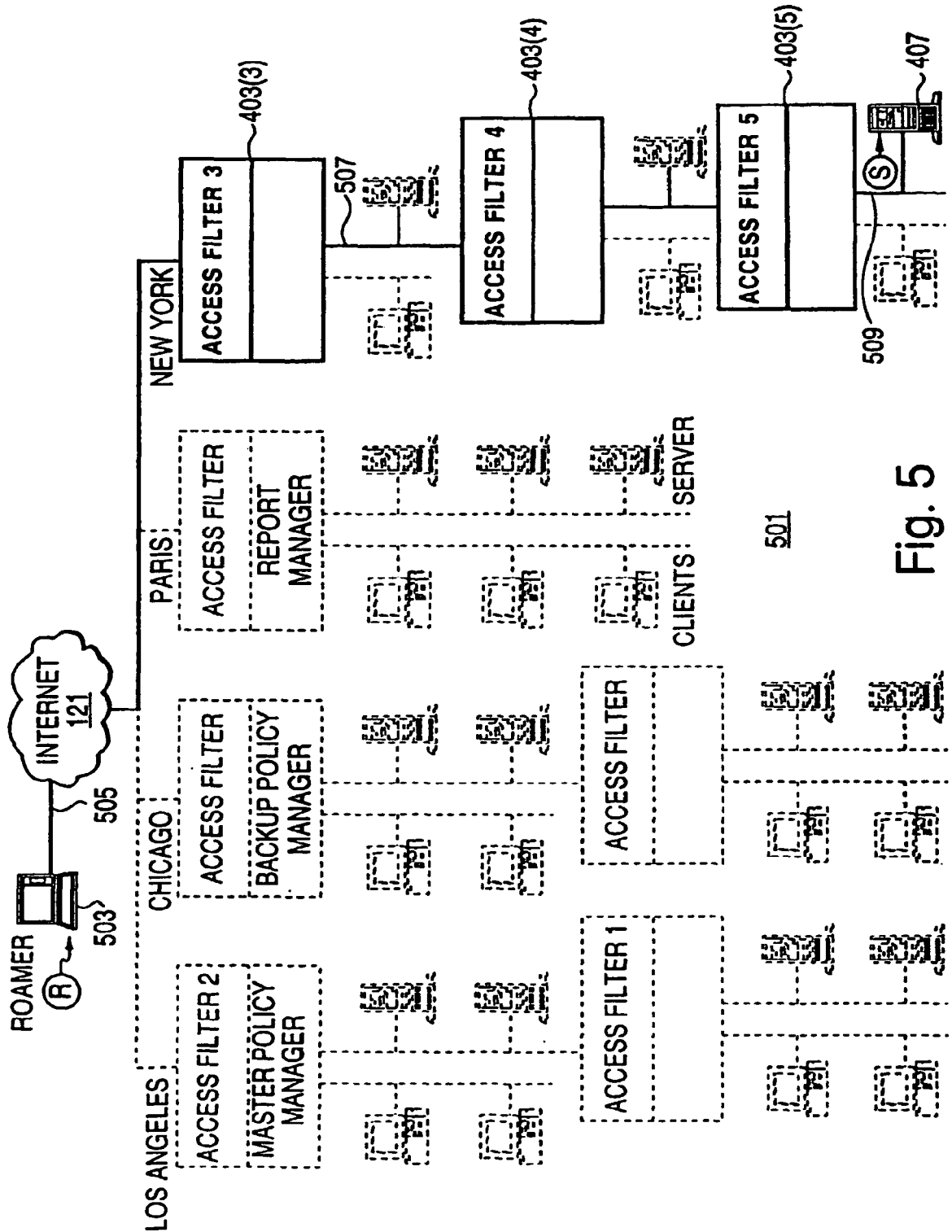
FIG. 5 shows access by a "roamer" to information in the VPN.

End-to-End Encryption: FIG. 5

Tunnel 405 of FIG. 4 extends only from access filter 403(1) to access filter 403(5); the messages of the session are unencrypted between system 401 employed by the user and access filter 403(1) and again between access filter 403(5) and server 407 that contains the information resource. In the case of extremely sensitive information, authentication and encryption may be needed from the near end access filter to the end of the path through the network, namely between system 403(1) and server 407.

FIG. 5 shows how this is accomplished using access filters 203. Within the VPN, authentication and encryption may be used with any client system 401 or 503 or any server system 407 in addition to access filters 203. When a client computer utilizes encryption, it uses SKIP to authenticate the session and encrypt it using a shared secret that is shared between the client computer and a selected access filter 203 and then sends the encrypted message to the selected access filter 203, thereby effectively establishing a tunnel between the client and the selected access filter 203 and making the selected access filter 203 the first access filter 203 for purposes of access checking. At the first access filter 203, the messages are decrypted and access checking is done. Since SKIP makes available the user's certificate along with the encrypted message, the user's authenticated identity can be used for access checking. If the access is permitted, the message is once again encrypted and sent to access filter 403(5) nearest server 407, which decrypts it. If data base 301 contains a SKIP name and encryption algorithms for server 407, access filter 403(5) retrieves the certificate for server 407 if necessary and uses SKIP to reencrypt the session as required for server 407. Otherwise, access filter 403(5) simply sends the message to server 407 in the clear. If the message was reencrypted for server 407, server 407, finally, receives the encrypted message and decrypts it. The access filters 203 intermediate to the first access filter 203 and last access filter 203 simply note that the message is from another access filter and is encrypted with SKIP and pass the message on, as described above. When server 407 retrieves the information resource, it either sends it in the clear to access filter 403(5) or encrypts the message containing the resource with the key for access filter 403(5). The process of decrypting and encrypting described above is then performed in reverse, pairwise, from server 407 to access filter 403(5), from access filter 403(5) to access filter 403(1), and finally from access filter 403(1) to the original client system, which decrypts it.

The effect of this technique is to construct a tunnel on the path between the client and the server which runs from the access filter 203 on the path which is nearest to the client to the access filter 203 on the path which is nearest to the server. If the client is capable of encryption and decryption, the tunnel can be extended from the access filter nearest the client to the client and if the server is capable of encryption and decryption, the tunnel can be similarly extended to from the access filter nearest the server to the server. Once the first access filter 203 in the path has been reached and has authenticated the session, no further encryption or decryption is required until the access filter 203 nearest the server has been reached. Moreover, access control database 301 in each access filter 203 contains all of the necessary identification and certification information for the client, the server, and the access filters 203 in the route. An advantage of the end-to-end encryption technique just described is that it distributes encryption load throughout the network, rather than concentrating it at the access filters connecting the VPN to the Internet, and thereby enhances scalability.

FIG. 5 shows how the technique works with a session 501 that originates with a roamer, that is, a client 503 whose connection to the VPN is via Internet 121. Roamer 503 is equipped with SKIP, as is target server 407 on an internal network. When SKIP was is configured in the roamer, it was given the certificate for access filter 403(3) and access filter 403(3) was given the certificate for the roamer. When roamer 503 sends a message belonging to the session, it addresses the message to server 407 and encrypts it using a transport key which it shares with access filter 403(3). The message is thus tunneled via tunnel 505 to access filter 403(3). There, access filter 403(3) decrypts the session, performs the access check, and reencrypts it using a transport key for access filter 403(5).

The subsequent access filters 403 in the path allow the session through because it is authenticated by access filter 403(3), thus providing tunnel 507 to at least access filter 403(5). If target server 407 is SKIP-equipped, access filter 403(5) extends the tunnel to target server 407, as described above.

Figure 7:
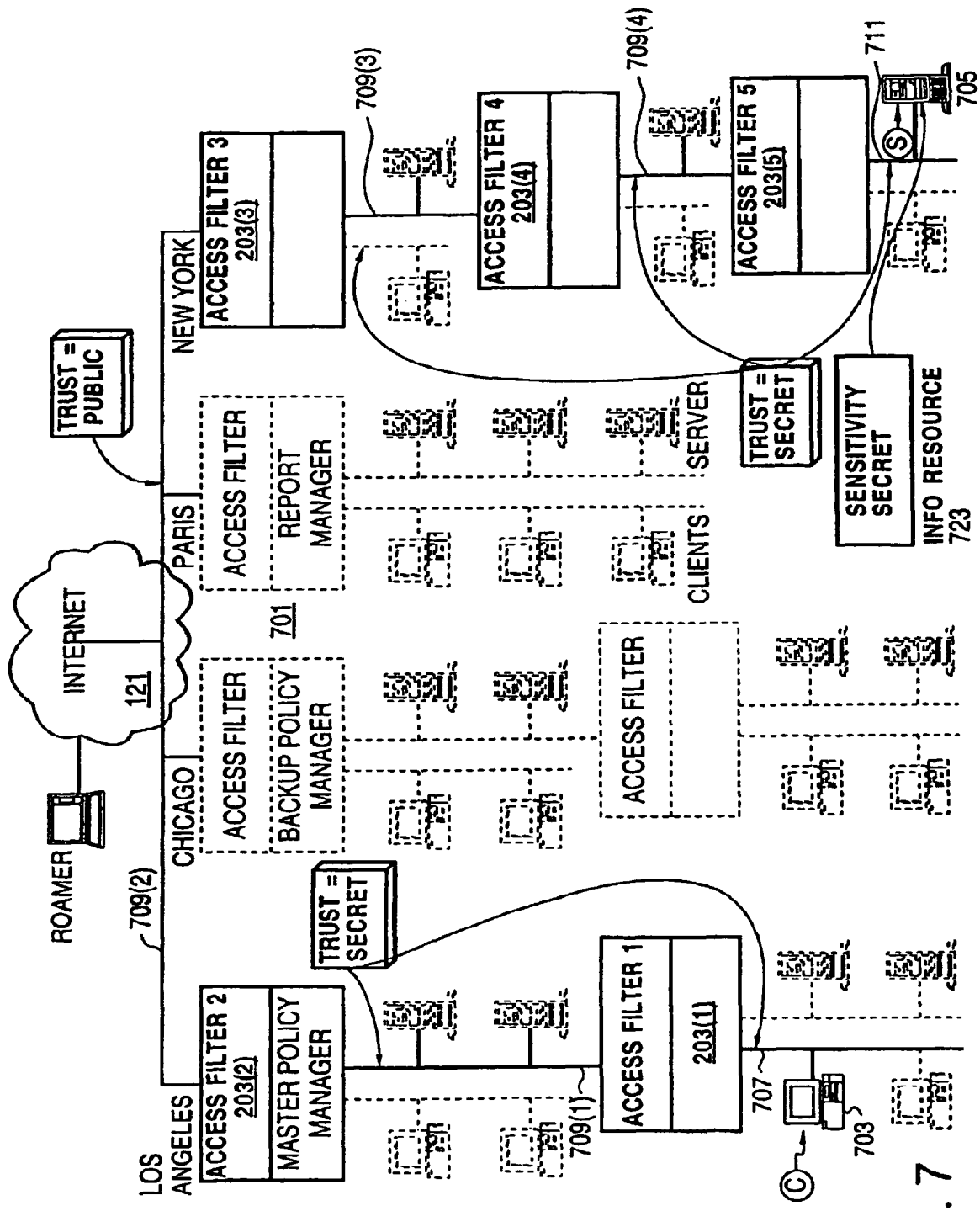
FIG. 7 is an example of the application of SEND.

Adaptive Encryption and Authentication based on Data Sensitivity: FIGS. 6 and 7

An important task in access control in a VPN is determining the minimum amount of security needed by a session. This is important first because at least that minimum must be guaranteed and second because more security than is necessary wastes resources. The techniques employed in access filters 203 to determine the minimum amount are collectively termed SEND (Secure Encrypted Network Delivery). In SEND, access control database 301 contains a data sensitivity level for each information resource. The data sensitivity level indicates the level of secrecy associated with the information resource and is assigned to the information resource by the security administrator responsible for the resource. An exemplary set of levels is Top Secret, Secret, Private, and Public.

The levels used to indicate data sensitivity are also used to indicate the trust level required for the access request. As previously described, access will be permitted only if the trust level determined from the trust level of the technique used to identify the user, the trust level of the path of the access request through VPN 201 or the trust level of any encryption technique used to encrypt messages sent over the path is at least as great as the data sensitivity level for the information. The trust levels for user identifications, paths, and encryption algorithms are contained in access control database 301. With regard to trust levels of paths, the VPN is divided into network components, each network component being a connected set of IP networks that is separated from other components by access filters 203. Each network component has a name and a trust level. For example, an Internet component will have the Public trust level, while an internal network component may have the Private trust level. The trust level of a given component may be based on its physical security or on the use of encryption hardware in the component. As each access filter 203 is added to a VPN, a description of its connections to the components of the VPN is added to database 301. Included in this description are the trust levels of the networks. Consequently, any access filter 203 can use its copy of database 301 to determine the trust level of each component of the path by which a session will be carried between a client and a server.

The trust level for a user is determined from the manner in which the access request identifies the user. In access control database 301, each group of users has one or more identification techniques associated with it, and each identification technique has a minimum trust level. The basic techniques are:

Certificate via SKIP. A user is identified by the name in his or her X.509 certificate used with the SKIP protocol to authenticate and encrypt traffic.

Certificate via User Identification Client. A user is identified by the name in his or her X.509 certificate transmitted to attached access filters 203 via a special Conclave client module called the User Identification Client. This transmittal is done securely, using a challenge/response mechanism.

Windows Domain ID via User Identification Client. A user who logs in to a Microsoft Windows Domain and has installed the User Identification Client automatically has his or her Windows identity, including group memberships, transmitted to attached access filters 203. The logon to the network is done securely within the mechanisms of the NetBIOS protocol.

Authentication Tokens. Authentication tokens (such as those manufactured by Security Dynamics Inc. and Axent Corp.) may be utilized in two ways: via the User Identification Client in an out-of-band manner, or in-band within the Telnet and FTP protocols.

IP Address and/or Domain Name. The IP address or fully qualified domain name of the user's computer.

In a preferred implementation of SEND, the identification techniques have a predetermined order from most secure to least secure. The techniques just listed would be ordered are as they are in the above list, with the most secure techniques being at the top of the list. The ordering of the identification techniques is somewhat subjective, but reflects the general security of the identification technique and the rigor applied to the distribution and validation of user identities. An administrator in VPN 201 then relates the ordered trust levels to the ordered identification techniques. For example, if the administrator relates the private trust level to identification by means of authentication tokens, a user who desires to access a resource with the private sensitivity level must identify himself or herself by means of an authentication token or another identification technique which is above the authentication in the order of identification techniques. The administrator of the access filter likewise orders the cryptographic algorithms available in the VPN from most secure to least secure and relates the ordered trust levels to the ordered cryptographic algorithms and orders the network paths employed in VPN 201 and relates the ordered trust levels to the ordered network paths. These relationships between trust levels and orderings with regard to security are included in access control database 301. Then a SEND table is constructed which relates trust and sensitivity levels to identification and encryption techniques. FIG. 6 is a conceptual representation of such a SEND table.

SEND table 601 has three columns: one, 603 for the trust/sensitivity levels, one, 605, for minimum encryption methods, and one, 607, for minimum identification methods. For details on the encryption methods of column 605, see Bruce Schneier, *Applied Cryptography*, John Wiley & Sons, New York, 1994. Each row 609 of the table associates a trust/sensitivity level with a minimum encryption level for the path connecting the access filter, client, and server and a minimum identification level for the user. Thus, row 609(1) associates the "top secret" trust/sensitivity level with the 3DES encryption algorithm and a user certificate obtained via SKIP. A user who wishes to gain access to a resource with the sensitivity level "top secret" must consequently have an identification that is certified by SKIP and if the path does not have a "top secret" trust level, the session must be encrypted with the 3DES algorithm. On the other hand, as shown by row 609(4), a user who wishes to gain access to a resource with the sensitivity level "public" may be identified by any method and there is no requirement that the session be encrypted.

When a new session is initiated, the first access filter 203 in the path employed for the session proceeds as follows:

1. The access filter determines the information resource being accessed and looks up its sensitivity level in database 301.
2. The minimum authentication for that sensitivity level from SEND table 601 specifies which identification mechanisms may be used by the access filter to identify and authenticate the user making the access.
3. The first access filter 203 then consults database 301 to determine from the user groups the user belongs to and the information sets the resource belongs to whether the user may access the resource.
   a. The first step is to determine from the access data base which of the identification methods used to identify the user have trust levels high enough for the sensitivity level of the resource.

b. Then first access filter 203 consults database 301 using the user's identification according to each of the identification methods that has a high enough trust level to determine the user groups that the user belongs to.

c. First access filter 203 also consults data base 301 to determine which information sets the resource belongs to.

d. Having determined the relevant user groups and information sets, first access filter 203 consults data base 301 to locate the access policies that determine whether access is to be allowed or denied to the session. If at least one policy allowing access is found and none denying access are found, the user is allowed access; otherwise, access is denied. Details of steps b, c, and d will be given below.

4. If access was not denied, the first access filter 203 then consults database 301 to determine the network components that make up the route through the VPN from the client to the server that contains the information resource. The route is considered as having up to three logical segments:

a. Segment (a), from the client to the first access filter 203. This segment may or may not have been encrypted, depending on whether the client uses SKIP;

b. Segment (b), from the first access filter 203 to the access filter 203 in the path nearest the server; and c. Segment (c), from the access filter 203 nearest the server to the server; this segment also may or may not be encrypted.

If segment (a) and segment (c) exist, each will consist of a single network component. Segment (a) will not exist if the client is on the first access filter; segment (c) will not exist if the server is on the access filter nearest the server. If segment (b) exists, it will consist of one or more network components. Segment (b) will not exist if there is only one access filter between the client and server.

5. For each of the segments:

a. For segment (a), any encryption must be done by the client. If the trust level of segment(a) is not at least as strong as the sensitivity of he resource, or if the trust level of the encryption done by the client is not at least as strong as the sensitivity of the resource, access is denied.

b. For segment (b), if the weakest trust level of any network component in the path is greater than or equal to the data sensitivity of the resource, then the traffic is sent without encryption. This corresponds to the case where the network is inherently secure enough to transmit the data. In the example table above, information resources with a Public data sensitivity level may be transmitted on any network, as shown by row 609(4). However, the access filters 203 will use SKIP to authenticate the session, allowing subsequent access filters to pass the session through without incurring the larger overheads of decryption, access checking, and reencryption. If the weakest trust level for the path is less than the data sensitivity of the resource, then the SEND table is consulted for the minimum encryption algorithm required for the sensitivity level and the session is encrypted using that algorithm. The encryption upgrades the security of the link, making it suitable to carry data of that given sensitivity and permitting access by the user to the resource.

c. For segment (c), the portion of the path from the access filter 203 nearest the server to the server, first access filter 203 determines the trust levels of segment (c) and of any encryption used in segment (c) from information in database 301. If the trust level of this segment of the path is less than the sensitivity level of the information resource, and in that case, if the encryption used in segment(c) is not at least as strong as that required as the minimum level in the SEND table considering the sensitivity level of the resource, then first access filter 203 will deny access.

The above method of determining sensitivity and trust levels ensures that access filters 203 employ encryption only as necessary to achieve the necessary trust levels. This reduces the number of sessions that will be encrypted while keeping the description of network configuration in database 301 simple and manageable. The result is better scalability with regard to both management of and performance in the VPN.

FIG. 7 provides an example of how the sensitivity level of an information resource, the trust level of the user identification, and the trust level associated with the path between the client and the server affect access by the user to the information resource. In FIG. 7, a SKIP-equipped user at client 703 initiates a session 701 to obtain an information resource 723 which is stored at SKIP-equipped server 705. Segment (a) of the above discussion appears in FIG. 7 at 707; segment (b) appears at 709(1 . . . 4); Segment (c) appears at 711. Information resource 723 has a sensitivity level of "secret". The first access filter 203 that the session encounters is filter 203(1). Access filter 203(1) uses its copy of the access control database to determine the sensitivity level of resource 723. Here, the user has used a SKIP certificate and an examination of SEND table 601 in data base 301 shows access filter 203(1) that this kind of user identification meets the requirements for information resources having the "secret" sensitivity level, so segment (a) 707 has the required trust level. Consequently, the first access filter goes on to determine the trust level of segments (b) 709(1 . . . 4) and (c) between access filter 203(1) and server 705 in the VPN. Segment 709 has subsegments 709(1), 709(2), 709(3), 709(4), and 709(5), and first access filter 203(1) checks the trust level of each of these subsegments in database 301. Segment 709(2) is Internet 121, so its trust level is "public", which is the minimum in segment 709. Then access filter 203(1) uses access control data base 301 to check the trust level of segment 711. It is "secret". Thus, only segment (b) 709 has a trust level that is too low for the path of a session that is accessing a "secret" information resource 703. To deal with this problem, access filter 103(1) must encrypt the session to bring it up to the necessary trust level. First access filter 203(1) consults SEND table 601 to determine what kind of encryption is required, and row 609(2) indicates that DES encryption is sufficient. First access filter 203(1) accordingly encrypts the session using that algorithm and sends it to access filter 203(5).

In FIG. 7, segment 707 connecting client 703 to access filter 203(1) has a trust level which is high enough for the resource's sensitivity level, and there is thus no need for client 703 to encrypt its request. When that is not the case, access filter 203(1) will give client 703 access only if client 703 has encrypted the request using an encryption method whose trust level is sufficient for the sensitivity level of the resource. It is for this reason that roamer 503 in FIG. 5 must be SKIP-equipped. Since roamer 503 accesses access filter 403(3) via Internet 121, roamer 503's requests can never have more than the public trust level unless they are encrypted, and in order to have full access to the resources in VPN 201, roamer 503 must use an encryption method such as the one provided by SKIP whose trust level is sufficient for the highest sensitivity levels. In some embodiments of access filter 203, the access filter may negotiate the encryption technique to be used in a request with the client in a manner similar to that which it employs in the preferred embodiment to negotiate the user identification mode.

Overview of the Administrators' Interface to Access Control Database 301: FIGS. 8-12

Figure 8:
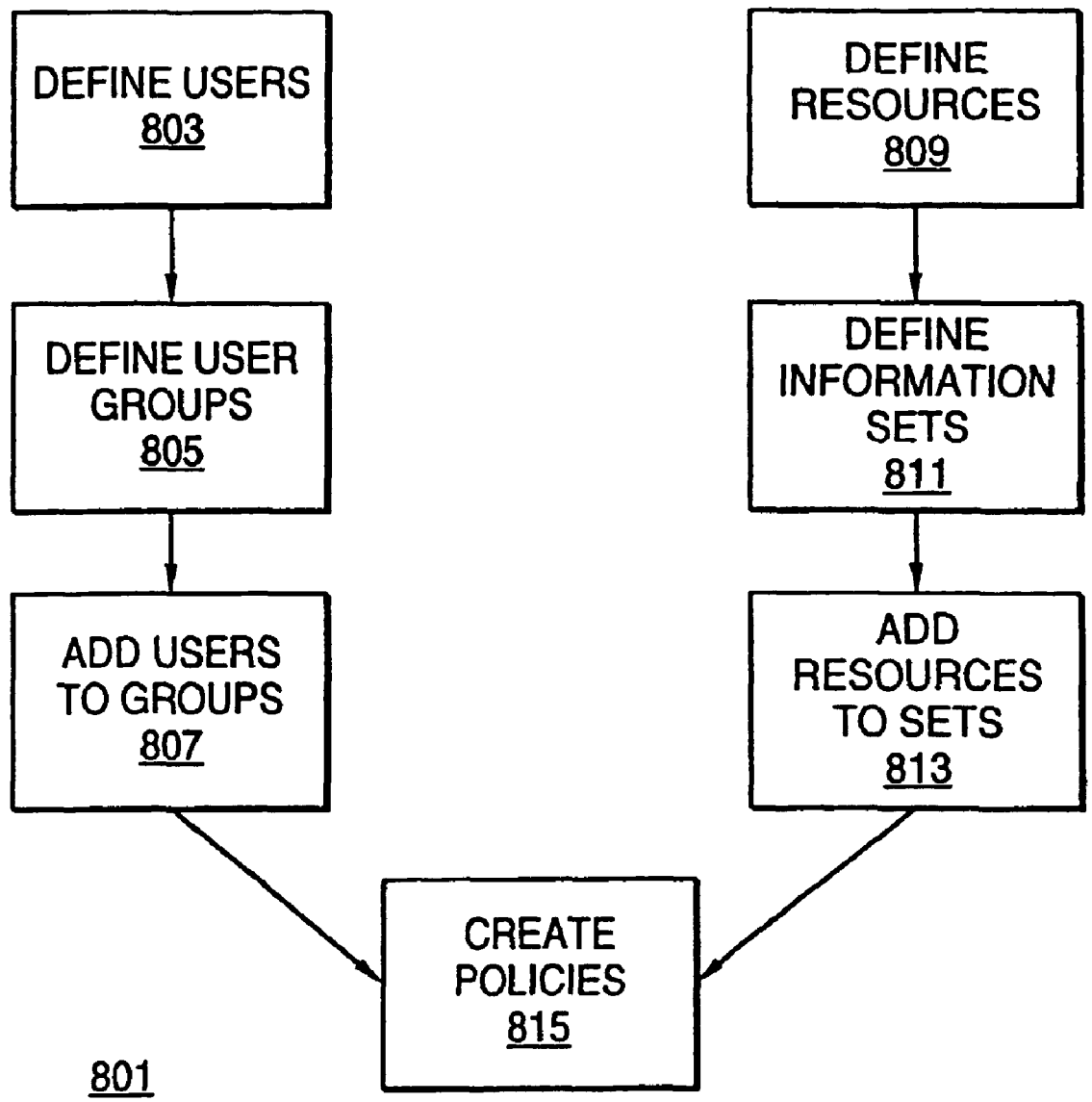
FIG. 8 is a flow chart of the policy creation process.

An access policy defines access in terms of user groups and information sets; consequently, before an access policy may be defined, the administrators must define the user groups and information sets; how that is done is shown in FIG. 8. Defining a user group involves steps 803 through 807: first the users are defined, then the user groups are defined, and then the users are assigned to the proper user groups. Defining information sets involves steps 809 through 813: first the resources are defined, then the information sets are defined, and then the resources are assigned to the information sets. When this has been done for the user group and information set involved in a policy, the access policy can be created, as shown at 815. As previously pointed out, the rights to define and determine the membership of user groups and information sets and to make administrative policy for them are determined by the administrative policy, while the right to make access policy for user groups and information sets are determined by the policy maker policy. As can be seen from the foregoing, the user interface is generally used to define relationships between two entities or sets thereof. The general form of the graphical user interface (GUI) for access control database 301 corresponds to that task. The display includes two windows, each of which contains representations of entities that are to be brought into relationship with each other, and the relationship is defined by selecting the entities and where necessary, defining the relationship.

Figure 9:
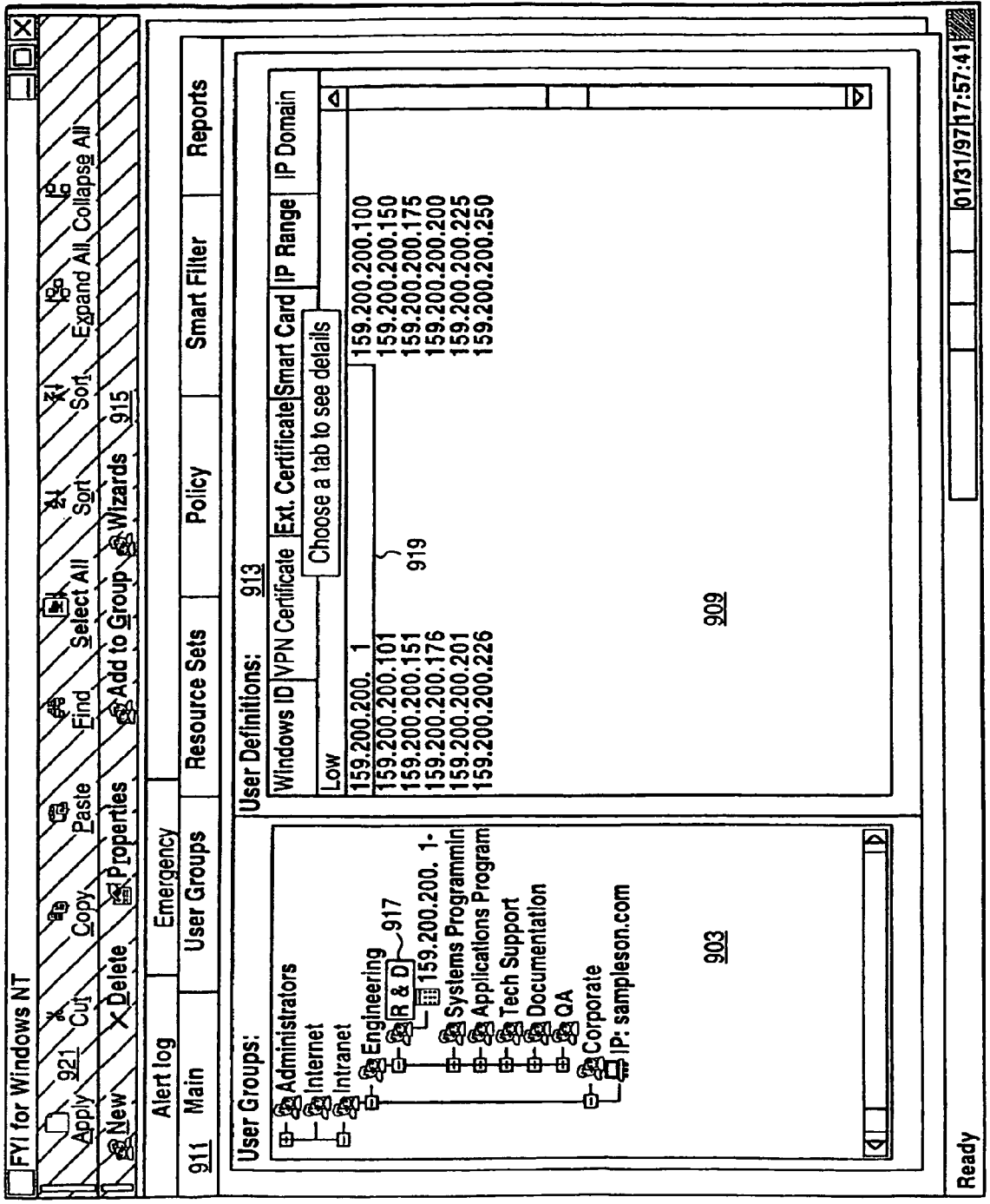
FIG. 9 shows a display used to define user groups.

Defining User Groups: FIG. 9

FIG. 9 shows the display 901 for populating and defining user groups. Window 903 in the display contains a hierarchical display of currently-defined user groups; window 903 is similar to those used to display hierarchies of files in the Windows 95 brand operating system manufactured by Microsoft Corporation. In window 903, user groups for which the administrative user using display 901 has administrative rights appear in black; the other user groups appear in gray. Above the two windows are two button bars 911 and 915. Button bar 911 lists the displays available for modifying access control database 301, while button bar 915 lists the operations that may be performed on those displays. Thus, the button label "user groups" in button bar 911 is highlighted, indicating that display 901 is the one for populating and defining user groups. With regard to button bar 915, when window 903 is active, an administrative user with the right to administer a user group may modify the user group by selecting it in window 903 and using the delete button in button bar 915 to delete the user group or the new button to add and name a new user group that is beneath the selected user group in the hierarchy. When the administrative user clicks on apply button 921, access filter 203 modifies its copy of access control database 301 to conform with what is on display 901 and the modifications are propagated to all copies of access control database 301 in the VPN.

Window 909 displays users. A set of user is indicated in the display by the manner in which the user in the set identified. In this case, the users are identified by IP addresses and they appear in the display as ranges of IP addresses. Button bar 913 indicates the other kinds of identifications that can be displayed in window 909. As with window 903, when the window is active, the new and delete buttons can be used to add and delete users. To assign the user(s) specified by a user identification to a user group, the user of the GUI selects a user group, as shown at 917, and a set of identifications, as shown at 919, and then uses the add to group button in button bar 913 to add the set of identifications to the group, as is shown by the fact that the range of IP addresses selected at 919 now appears in the hierarchy below the user group selected at 917. The effect of the operation is to make users whose sessions have the source IP addresses listed at 917 into members of the user group R&D, and when the user clicks on the apply button, all copies of access control database 301 are modified accordingly.

Figure 10:
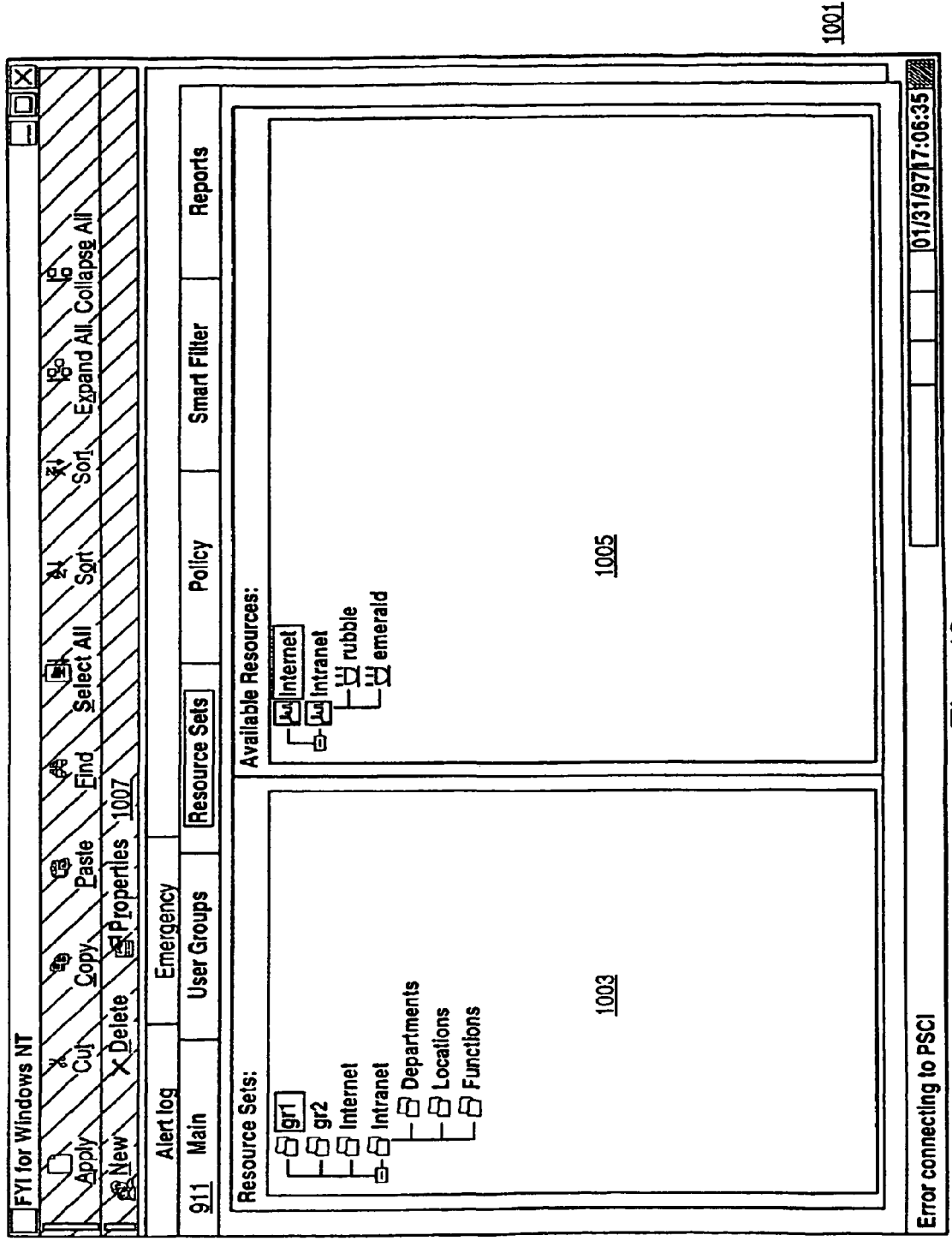
FIG. 10 shows a display used to define information sets.

FIG. 10 shows the display 1001 used to define information sets. Here, window 1003 contains a hierarchical list of information sets and window 1005 contains a hierarchical list of the available resources. The hierarchical list of information sets and the hierarchical list of available user groups made in the same fashion as the list of user groups. Again, information sets and available resources over which the user of display 1001 has administrative authority appear in black; the other items on the list appear in gray. In window 1001, the available resources are the Internet and the two locations that make up VPN 201. In a more developed VPN 201, the list of available resources would indicate servers at the location, services in the servers, and the information items provided by the services. For example, if the service provides a directory tree, the information items contained in the directory tree would be indicated by means of a pathname which specified the root of the directory tree and used wildcard characters to specify the files above the root in the tree. When a resource is added to a server, the resource may be defined via the 1005 window. Having thus been defined, a resource may be assigned to an information set in the same fashion that a user identification is assigned to a user group. Again, clicking on the apply button causes the changes in display 1001 to be propagated to all copies of access control database 301.

Figure 11:
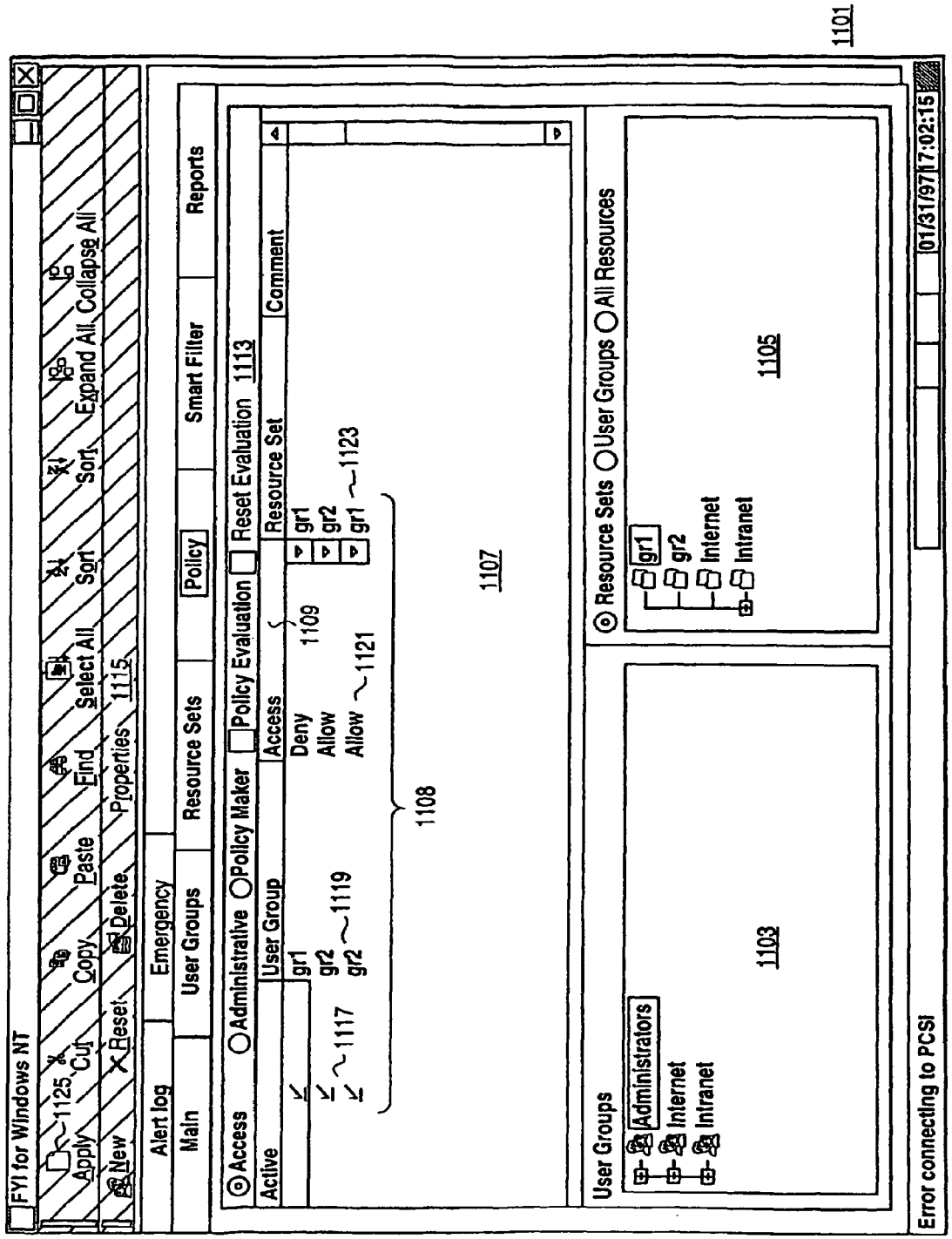
FIG. 11 shows a display used to define access policies.

FIG. 11 shows the display 1101 used to define policies. Which type of policy is being defined is specified in button bar 1113; as indicated there, display 1101 is defining access policy. All of the policy displays have the same general format: a window 1103 which contains a hierarchical display of user groups, a window 1105 which contains a display of a hierarchy of objects for which policy may be defined and a policy definition window 1107 which contains access policy definitions 1108. In the hierarchy of objects, objects for which the user of display 1101 has the right to define policies appear in black; the others appear in gray. In display 1101, what is being defined is access policies, so the objects are information sets.

Each access policy definition has four parts:

an active check box 1117 that indicates whether the access policy defined by the definition is active, i.e., being used to control access;

the user group 1119 for which the access policy is being defined;

the information set 1123 for which the access policy is being defined; and access field 1121, which indicates whether access is being allowed or denied and thereby defines the access policy.

Menu bar 1109 and button bar 1115 permit administrators whom the policy maker policy allows to do so to edit, add, delete, and activate or deactivate a selected policy definition 108. Active check box 1117 of each policy definition 1108 permits the administrator to activate or deactivate the selected policy definition 1108; access field 1121 permits the administrator to select either allow or deny as the policy. The delete button in button bar 1115 permits the administrator to delete a selected policy; the new button permits the administrator to make a new policy definition 1108; to do this, the administrator selects a user group in window 1103 and an information set in window 1105 and then pushes the new button. The new access policy definition 1108 appears in display 1107, and the administrator can edit the new access policy definition as just described. To apply a change to access control database 301 and propagate it to all access filters 203, the administrator clicks on apply button 1125.

Display 1101 also contains a policy evaluator tool which lets the administrator see how the current set of access policy definitions determines access for a given user group or resource set. When the administrator clicks on the policy evaluation button in button bar 1113 and selects a user group from display 1103, the tool displays the selected user group in blue and all of the information sets in display 1105 which the policy definitions permit the user group to access in green and the remainder in red; all of the policy definitions which are relevant to the determination of which information sets may be accessed by the user group are highlighted in the same set of colors. The same thing happens if the administrator selects an information set; then the evaluator tool displays the selected information set in blue, all of the user groups that can access the information set in green and the rest in red, and also highlights the relevant policy definitions. The user can also select a policy. In that case, the selected policy appears in blue and the user groups and information sets affected by the policy in appear in blue or red, as determined by the policy. The user can additionally select more than one user group, information set, or policy. In that case, the evaluator tool shows each policy that applies to all of the selected items and the effects of those policies. The evaluator tool can be turned off by clicking on policy evaluation in button bar 1113 and colors and highlights can be turned off in preparation for a new policy evaluation by clicking on the reset evaluation button in button bar 1115.

Figure 12:
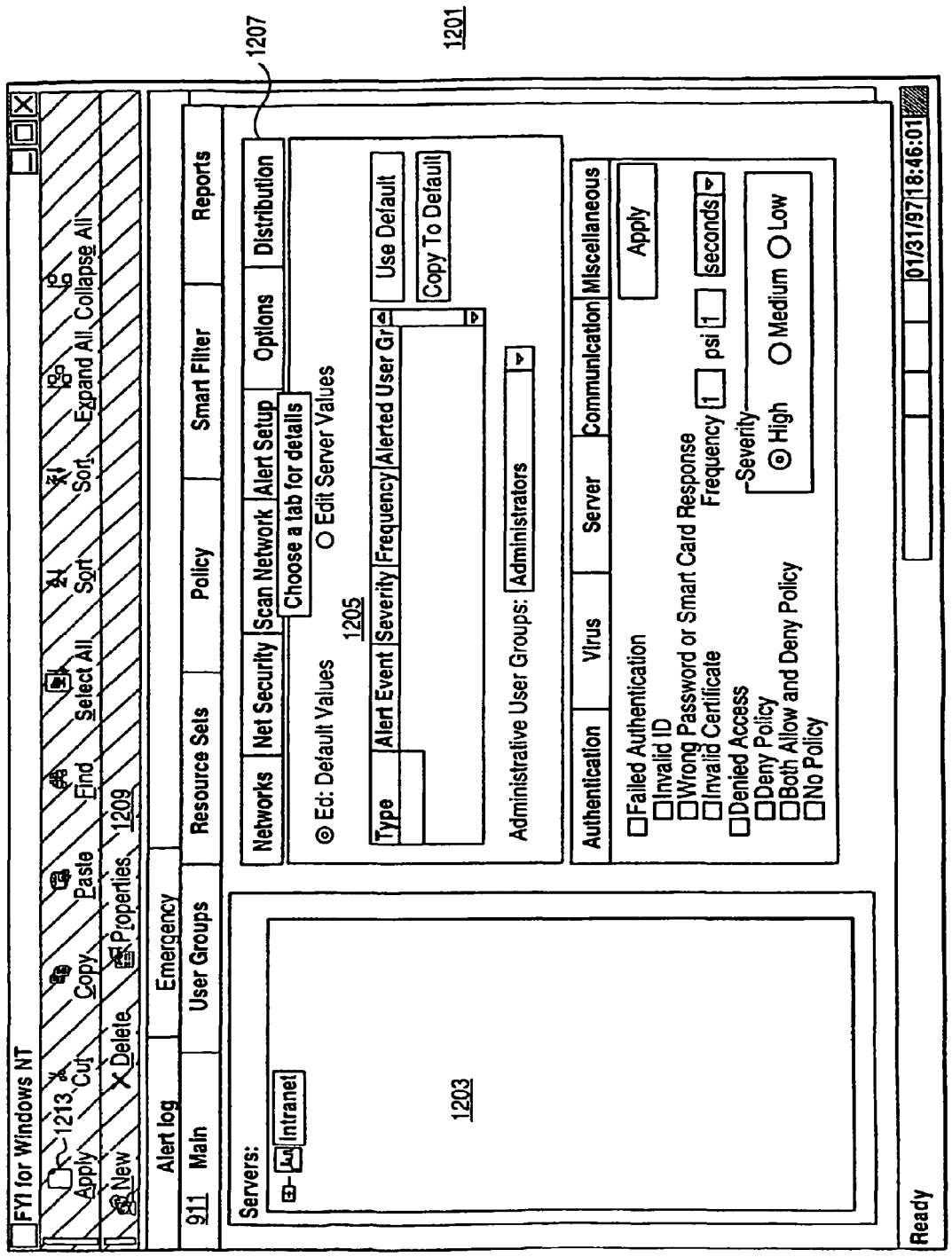
FIG. 12 shows a display used to define an access filter 203.

FIG. 12 shows the display 1201 used to input information about an access filter 203 to access control database 301. Window 1203 shows a hierarchical list of the access filters 203; when the window is active, access filters may be added or deleted using the add and delete buttons in button bar 1209. Window 1205 is used to input or display information about the access filter 203. The display in window 1207 is determined by clicking on a button in button bar 1207; as shown by the buttons, displays in window 1207 can be used to input and view information about access filter 203's network connections, to input and view information about the trust levels of those connections, to scan networks for available servers and services, to set up alerts for problems detected in access filter 203, to specify optional parameter for software, and to specify the distribution order of access control database 301 changes. The highlighting of alert setup indicates that display 1205 shown in FIG. 12 is the display used to display and establish alerts.

Figure 18:
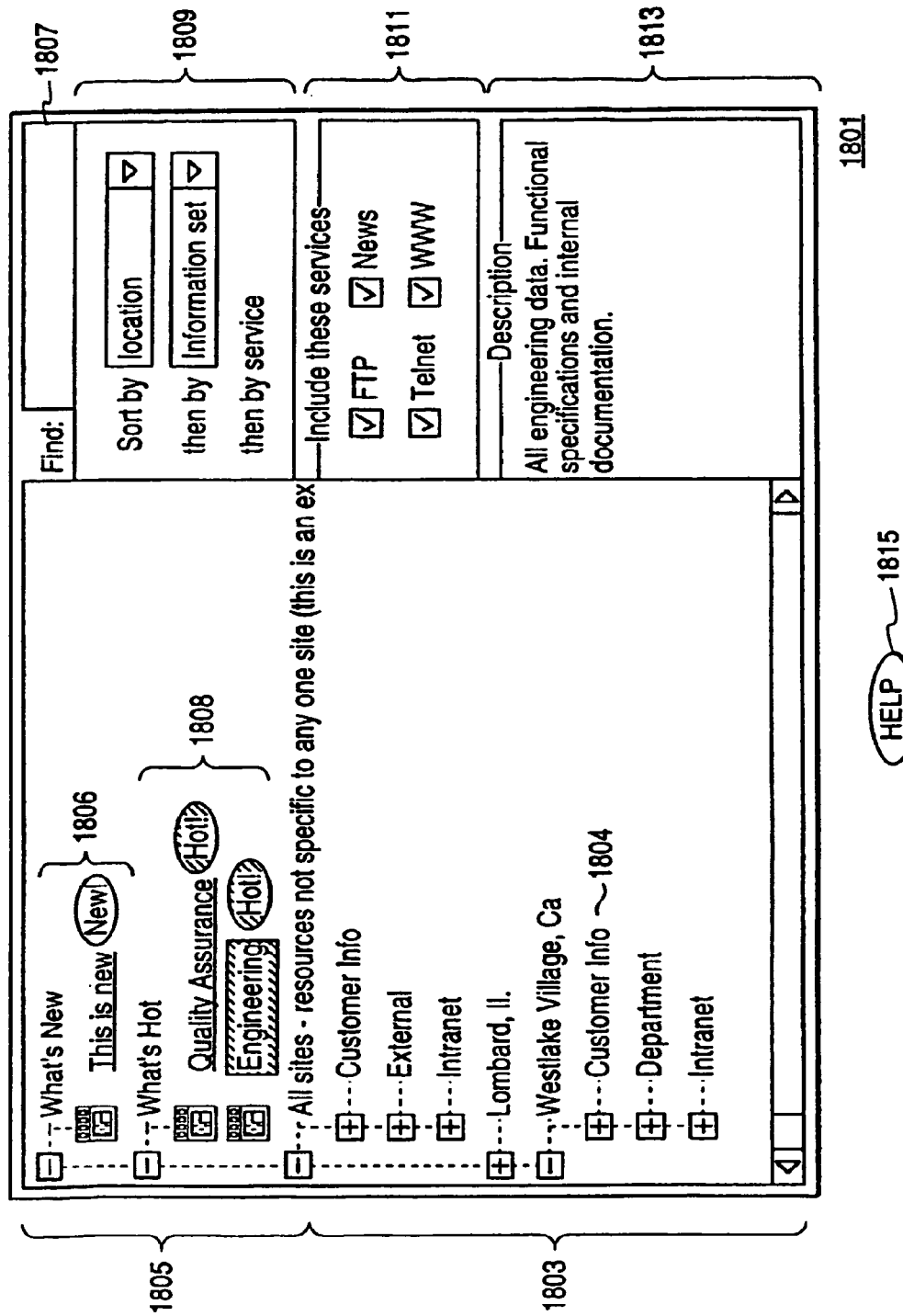
FIG. 18 shows the display used in the IntraMap interface.
Figure 24:
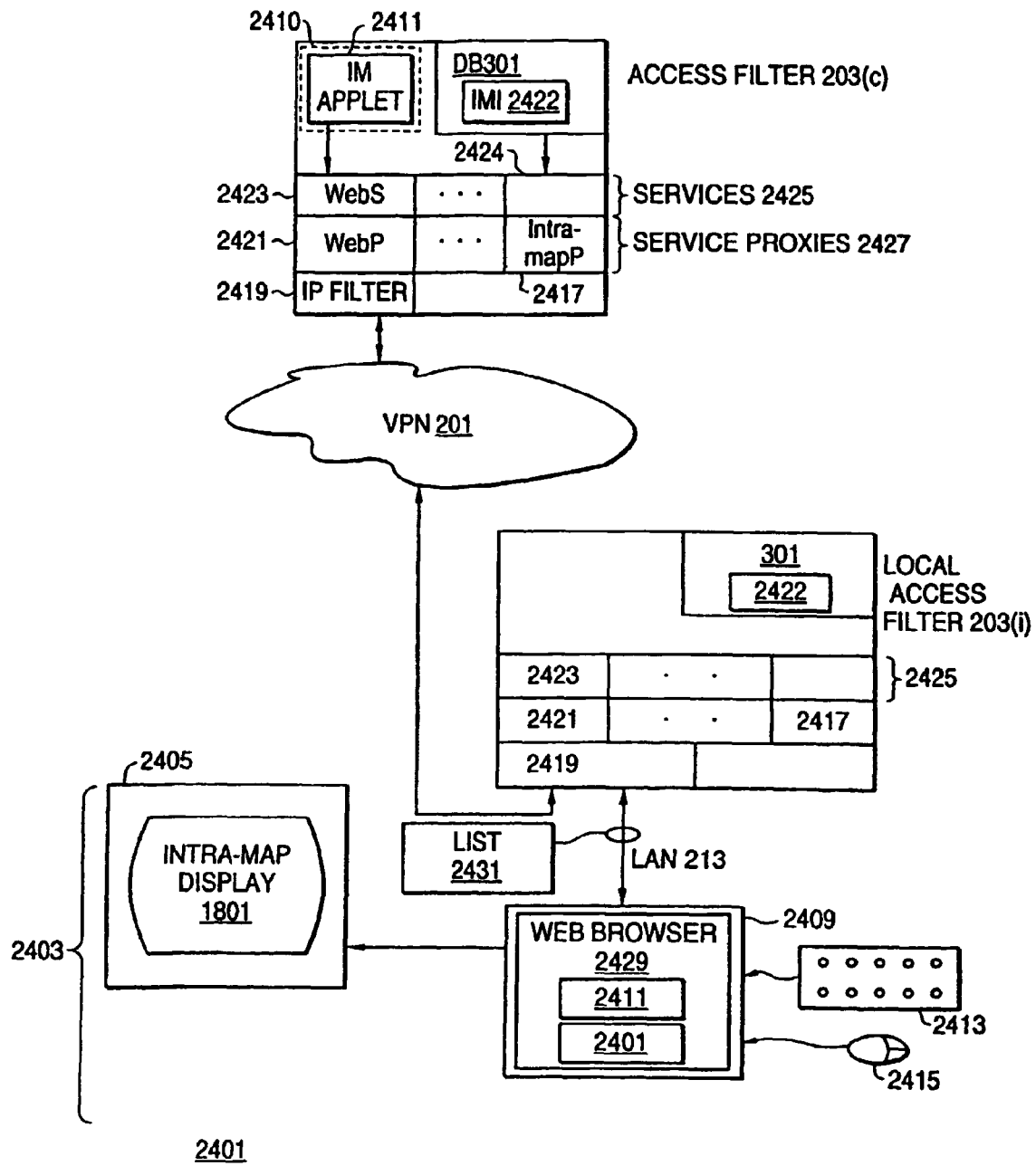
FIG. 24 is a diagram of an implementation of the IntraMap interface.

User Interface for Discovering Resources: FIGS. 18 and 24

The users of VPN 201 have an interface for seeing what resources are available to them in VPN 201. The interface, termed herein the IntraMap interface (IntraMap is a trademark of Internet Dynamics, Incorporated), shows each user at least the resources that belong to the information sets that the user may access according to the access policies for the user sets the user belongs to. In other embodiments, the IntraMap may take the sensitivity level of the resource and the trust level of the user's identification into account as well.

The IntraMap interface is implemented by means of a Java™ applet that runs on any Java-equipped World Wide Web browser. Using the Web browser, the user can scan the graphical display to find and access resources that are available to the user or to request access to resources that are not currently available to the user. Access by a user to a resource is determined by the access policies that apply to the user and the resource. FIG. 18 shows the display 1801 produced by the IntraMap interface. The left-hand side of IntraMap display 1801 shows a Resource List 1803; the right-hand side of the display shows a Find field 1807, a Sort section 1809, a Services section 1811, and a Description field 1813. On-line help for using the IntraMap is available by clicking Help button 1815.

Resource List 1803 shows resources and information available in VPN 201 to the user who is using the IntraMap interface. The listing is hierarchical. The user can expand or collapse branches of the "tree" by clicking on the '+' and '−' markers on the branches. Each entry 1804 in the list includes a name for the resource. The color used to display an entry indicates what kind of access the user has. If the entry 1804 is displayed in blue, the user has an active hyperlink to the resource and may double click on the resource to have it displayed. If it is displayed in black, it is also available to the user, but no hyperlink is available, so a separate application must be used to retrieve it. Resources displayed in gray are not directly available to the user, but if the user selects one, the IntraMap interface opens a dialog box that permits the user to send email requesting access to the administrator who is responsible for access policy for the information set the resource belongs to. The administrator may then modify the access and/or administrative policies as required to give the user access. An administrator may further give a resource the hidden property. When a resource has that property, it will appear in IntraMap interface 1801 only if the user belongs to a user group that the access policies permit to have access to an information set that the resource belongs to. If a resource does not have the hidden property, it will always appear in IntraMap interface 1801. Otherwise, it does not appear. A resource may have a more detailed description than that contained in its entry 1804. The description is displayed in Description field 1813 when the user selects the resource.

In addition to resource list 1803, IntraMap display 1801 displays two specialized resource lists at 1805.

What's New 1806 displays the latest information postings from others within the enterprise. If an administrator has given the user access to the What's New web page, the user may post the URL of a new resource there.

What's Hot 1808 displays the enterprise's most popular information resources, based on how frequently they are accessed.

The service types control at 1811 lets the user filter the resources that are to be displayed in resource list 1803 by the type of service that provides the resource. Each service type has a check box in service type control 1811. If the box is checked, the service type is included and the resources associated with this service appear in the Resource List. Otherwise, the resources associated with this service do not appear in the Resource List.

The IntraMap interface lets the user sort Resource List 1803 by information sets, locations, or services. To do this, the user selects the way he or she wishes to sort the resource list in sort field 1809. The user may also specify the order in which the categories are used in the sort. The interface further has a search function. To do a search, the user enters a search string in FIND field 1807. The resource list and the resource descriptions for the resources on it are then searched in the order specified in sort field 1809. The search simply looks for whole or partial word matches. It is not case sensitive. The first match is displayed, and function keys may be used to navigate to other matches. Of course, if a user has not checked a service type in service type field 1811, resources of that service type are not involved in either sorting or searching.

FIG. 24 shows an implementation 2401 of the IntraMap interface. To the user of VPN 201, the IntraMap interface appears as a Web page that is one of the resources provided by report manager 209 running on access filter 203(*c*) of FIG. 2. A user in VPN 201 or even the general public (that is, someone who is a member of the Internet user group) may be given access to the Intramap interface in the same fashion as he or she may be given access to any other resource. As will be clear from the following description, the Web page for the IntraMap may be on any server in VPN 201. Implementation 2401 has components in workstation 2403 used by the user to look at the IntraMap, components in access filter 203(I) which is local to work station 2401, and in access filter 203(*c*), which is the access filter upon which report manager 201 runs. Of course, access filter 203(*c*) may also function as a local access filter. Local access filter 203(I) is connected to report access filter 203(*c*) by VPN 201 and workstation 2403 is connected to local access filter 203(I) by LAN 213.

As will be explained in more detail later, all access filters 203 have a layered architecture. The bottommost layer is an Internet packet filter 2419 that deals only with Internet packet headers. Packet filter 219 reads the source and destination addresses in the Internet packet headers and applies a set of rules to them. As determined by the rules, it either accepts them, discards them, or routes them further in VPN 201. The rules also determine how the accepted packets are to be routed within access filter 203. The next layer of the architecture is service proxies 2427. The service proxies intercept traffic for services such as the World Wide Web and do access checking on the traffic. If access filter 203 provides the service itself or does access checking for a server that provides the service, IP filter 2419 sends packets intended for the service to a service proxy 2427 for the service. The service proxy uses access control database 301 to do protocol-level access checking for the service. For example, the service proxy for the Web service may check whether the user making a request for a given Web page has access rights for the page. The next higher level is services level 2425; if the relevant service proxy permits an access request and the access filter is also the server for the service, the request goes to the service at service level 2425 to be processed. In the case of the Web page, the service would locate the page and return it to the requestor. Two services are involved in the IntraMap: the Web service and an IntraMap service. In FIG. 24, the Web service appears as WebS 2423. The proxy for WebS 2423 is WebP 2421; for reasons that will become clear in the following, the IntraMap service has only a proxy, IntraMapP 2417. Additionally, access control database 301 includes IntraMap information 2422, which is an optimized version of the information in access control data base 301 that serves as a basis for the Intramap display.

The chief difference with regard to the IntraMap implementation between access filter 203(*c*) and access filter 203(I) is that access filter 203(*c*) includes a World Wide Web page 2410 with a copy of IntraMap Java applet 2411. When downloaded from access filter 203(I) to Web client 2429 in work station 2403, Java applet 2411 produces requests directed to IntraMap server 2425 and uses the results returned by IntraMap server 2425 to produce IntraMap display 1801.

Operation is as follows: to the user of work station 2403, the IntraMap may appear as a link to a Web page. Thus, to use the IntraMap, the user activates a link to IntraMap page 2410. Web browser 2429 in workstation 2403 responds to the activation of the link as it would to the activation of any other link to a Web page: it makes a request for the page and sends it to the server indicated in the link. In the case of the link to the IntraMap, the link specifies Web server 2423 in access filter 203(*c*), so the request goes via local access filter 203(I) and VPN 201 to access filter 203(*c*). As with any other access to a resource in VP 201, local access filter 203(I) does access checking for the IntraMap page request. Since the request is for a Web page, the checking is done by Web proxy 2421. In most VPNs 201, IntraMap page 2410 will be accessible to any user in VPN 201, and access control data base 301 thus indicates that any user with a valid IP source address may access IntraMap page 2410.

When the request is received in access filter 203(*c*), IP filter 2419 forwards it to Web proxy 2421, which in turn forwards it to Web server 2423, which responds to the request by downloading IntraMap applet 2411 to Web browser 2429 in work station 2403, where IntraMap applet 2411 begins executing in Web browser 2429. During execution, it sends a request to IntraMap proxy 2427 for IntraMap information 2422. Like all Java applets, IntraMap applet 2411 sends the request to the server that it is resident on, in this case, access filter 203(*c*). However, as with any other request from workstation 2403, the request goes by way of local access filter 203(I). There, IntraMap proxy 2427 detects that the request is addressed to Intramap proxy 2427 in access filter 203(*c*) and instead of sending the request on to access filter 203(*c*), obtains IntraMap information 2422 from the local copy of access control data base 301 in local access filter 203(I), filters it so that it specifies only those resources belonging to the information sets to which the user groups to which the user belongs have access to make to list 2431 and returns it via LAN 213 to IntraMap applet 2411, which then uses list 2431 to make IntraMap display 1801. In making the display, applet 2411 applies any filters specified in the request and also sorts the list as specified in the request. List 2431 not only indicates the resources that are available, but also contains information needed to fetch the resource. Thus, if the resource has a hyperlink, the hyperlink is included in the list; if it is a resource for which the user presently does not have access, but to which the user may request access, the list includes the name and email address of the administrator for the resource.

Details of Access Control Database 301: FIGS. 13-17

In a preferred embodiment of access filter 203, access control database 301 is implemented at two levels: one used by the graphical user interfaces use to manipulate access control database 301 and another used in actual access checking. The first level is implemented using the Microsoft Jet brand database system developed by Microsoft Corporation. The second is implemented using memory mapped files (MMFs) which are compiled from the first-level data base. The following discussion will describe the first-level implementation and explain how the information contained in it is used in access checking. In reading this discussion, it should be remembered that actual access checking is done using the MMFs, as will be described in detail later.

Figure 13A:
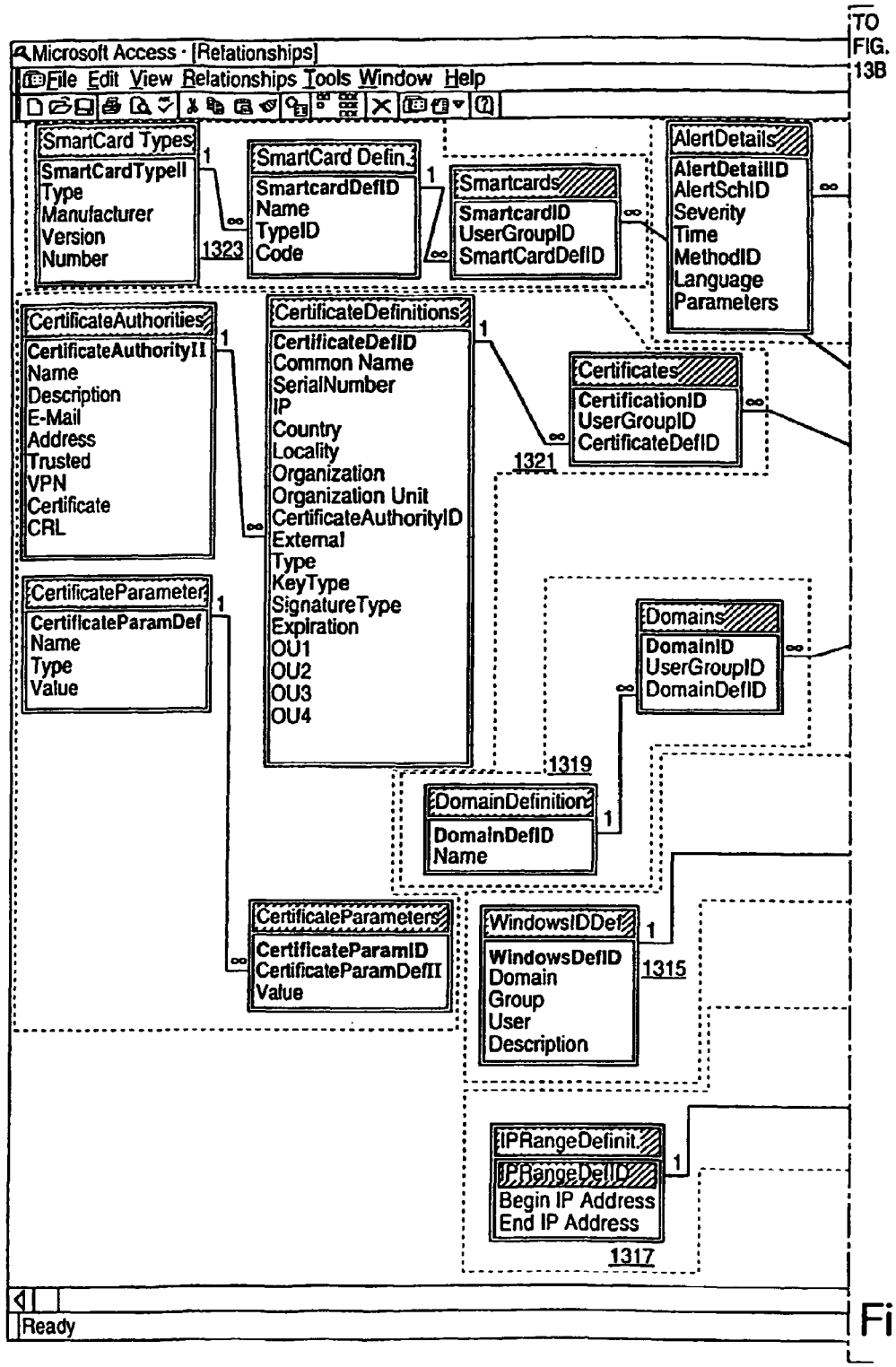
FIG. 13 is a schema of the part of access control database 301 that defines user groups.
Figure 13B:
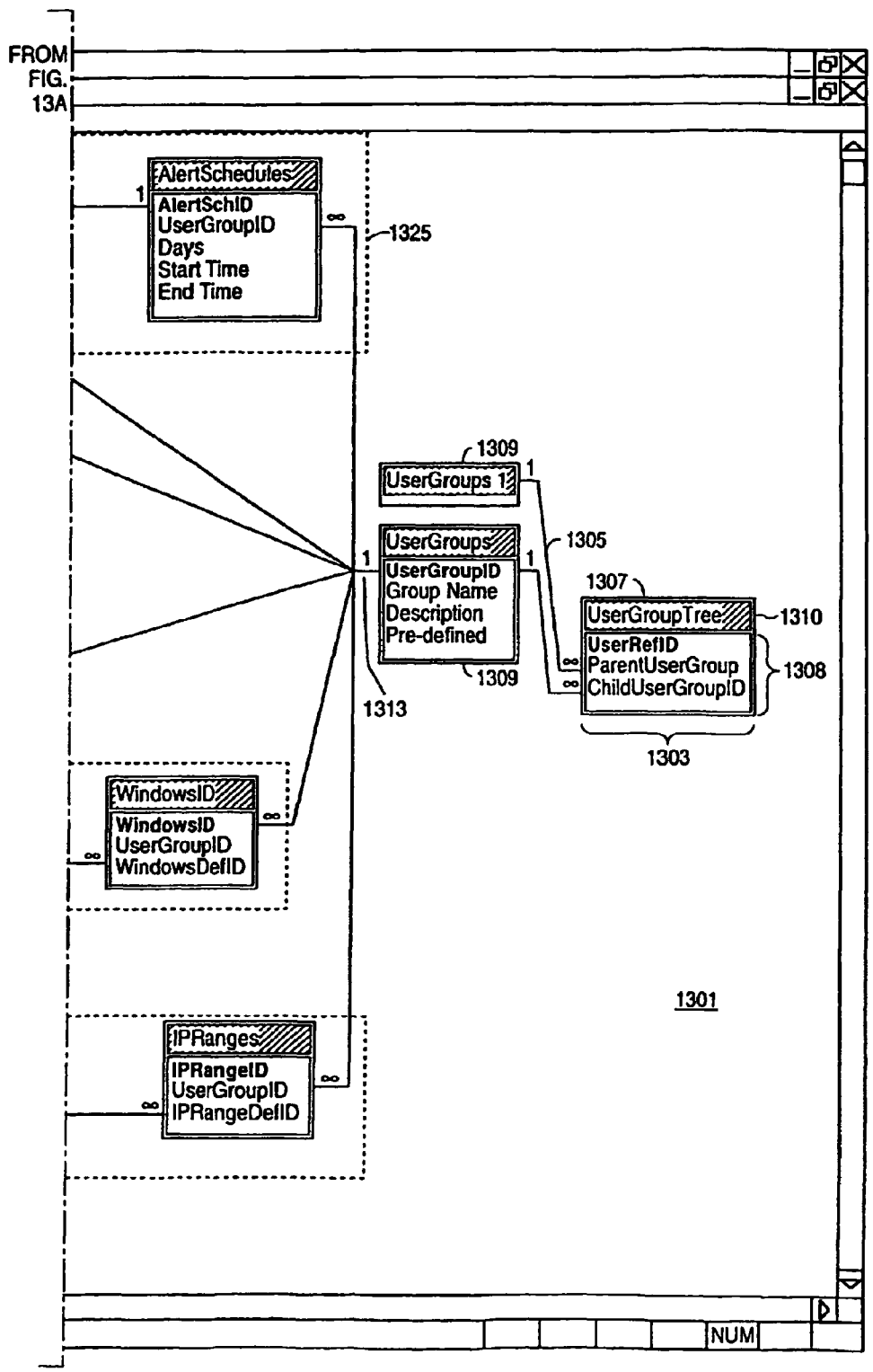

As is the case with most database systems, the Microsoft Jet brand database system has a schema, that is, a description of the logical structure of the database. FIGS. 13-17 are displays generated by the Microsoft Jet brand database system of the schema for access control database 301. FIG. 13 shows the schema 1301 for the part of the database that defines user groups. The display is made up of two elements: representations of classes of tables 1303 in the database and representations of links 1305, which show relationships between tables belonging to certain classes of tables. The representation of the class of the table shows the name of the class at 1310 and the data fields that will be contained in each table belonging to the class at 1308. Each table instance has an ID assigned by the database system. The other data in the table varies with the class of table. A link is made between a first table belonging to the first class of tables and a second table belonging to the second class of tables by using the ID of the second table in the first table and vice-versa. Thus, link 1305 shows that tables of the class User Group Tree table 1307 can be linked with tables of the class User Groups table 1309. Some links have numbers at their ends. The numbers indicate the number of the links that the table at the end the number is located at may have. Thus, the link connecting the table of class 1309 and the table of class 1307 has the number 1 at the end for the table of class 1309 and the number a) at the end for the table of class 1307, indicating that any number of IDs of instances of class 1309 may appear in an instance of class 1307, but only one ID of an instance of class 1307 may appear in an instance of class 1309.

User Group Tables: FIG. 13

User group tables 1301 contains a table of class user groups 1309 for each user group in database 301. Data of particular interest in tables of class User Groups 1309 include the group name, which is the character-string name of the group, the group description, which is a character-string description of the group, and pre-defined information, which indicates among other things whether a user who is a member of the group is an administrator, i.e., can make administrative policy, a security officer, i.e., can make policy maker policy, or a simple user of information. User group tables 1301 further organizes the user groups into a hierarchy—both for the purposes of inheritance and also for the hierarchical display of user groups shown in window 903 of FIG. 9, associate identifications of users with the user groups, and associate alerts with the user groups. The organization into the hierarchy list is done by means of tables of class User Group Tree 1307. Each table of the class User Group Tree links a table of the class User Group to a parent user group (also of the type User Group). Multiple User Group Tree tables may exist for a particular User Group table, depending on the number of places in which a particular user group appears.

As already mentioned, there are five different ways of identifying users to an access filter 203: by a range of IP addresses, by a fully-qualified Internet domain name, by the identity of the user in the Microsoft Windows brand operating system, by an authentication token, and by certificate. The table classes for the tables used to identify users by certificates are shown as 1321. The table classes for the tables that identify users by a range of IP addresses are shown at 1317; those for the tables that identify users by IP domains are shown at 1319; those for the tables that identify users by Windows brand operating system ID's are shown at 1315; and those for the tables that identify users by authentication tokens (labeled as smart card in the figure) are shown at 1323. The table classes 1325, finally, define tables for the information used in alerts that are related to user groups. A table of User Group class 1309 may have associated with it any number of tables for any of the ways of identifying users. As this implies, a given user may be identified in a number of different ways at once.

In order to perform an access check, access filter 203 must determine what user groups the user making the request belongs to. The request includes an identification for the user, and the identification is the starting point for the determination. The tables in user group tables 1301 permit access filter 203 to determine from the identification what user groups the user belongs to and from those user groups, the hierarchical relations that determine the other user groups the user belongs to. Assuming that the user is identified by an IP address, access filter 203 begins by finding one or more tables of the IP Range Definition class (in 1317) which define ranges of IP addresses which include the user's IP address. Each of these tables has a link to a table of the IP Ranges class (in 1317) which relates the range defined in the IP Range Definition class table to a user group ID, which in turn serves as a link to a table of class User Groups 1309 for the user group corresponding to the range of IP addresses. Each of the tables of class User Group has a link to a table of class User Group Trees, from which links can be followed to the tables of class User Groups for the user groups from which the user groups specified by the IP addresses inherit access rights. Thus, at the end of the process, IP filter 203 has located all of the user groups which are relevant for determining whether the user may access the resource. Moreover, IP filter 203 knows from the request how the user is identified and can determine from that what level should be assigned to the identification of the user used in the request. The information in user group tables 1301 is compiled into MMFs. When a user initiates a session, the user provides a user identification to the first access filter 203 on the session's path; access filter 203 uses the user identification with the MMFs to make a determination equivalent to the one explained above. Access filter 203 can thus determine for a given user identification whether it identifies a user that has access, what kind of user identification it is, and therefore what trust level it has, and which user groups the user belongs to. User group tables 1301 thus contain all of the information needed for the user portion of an access policy 1108.

Figure 14:
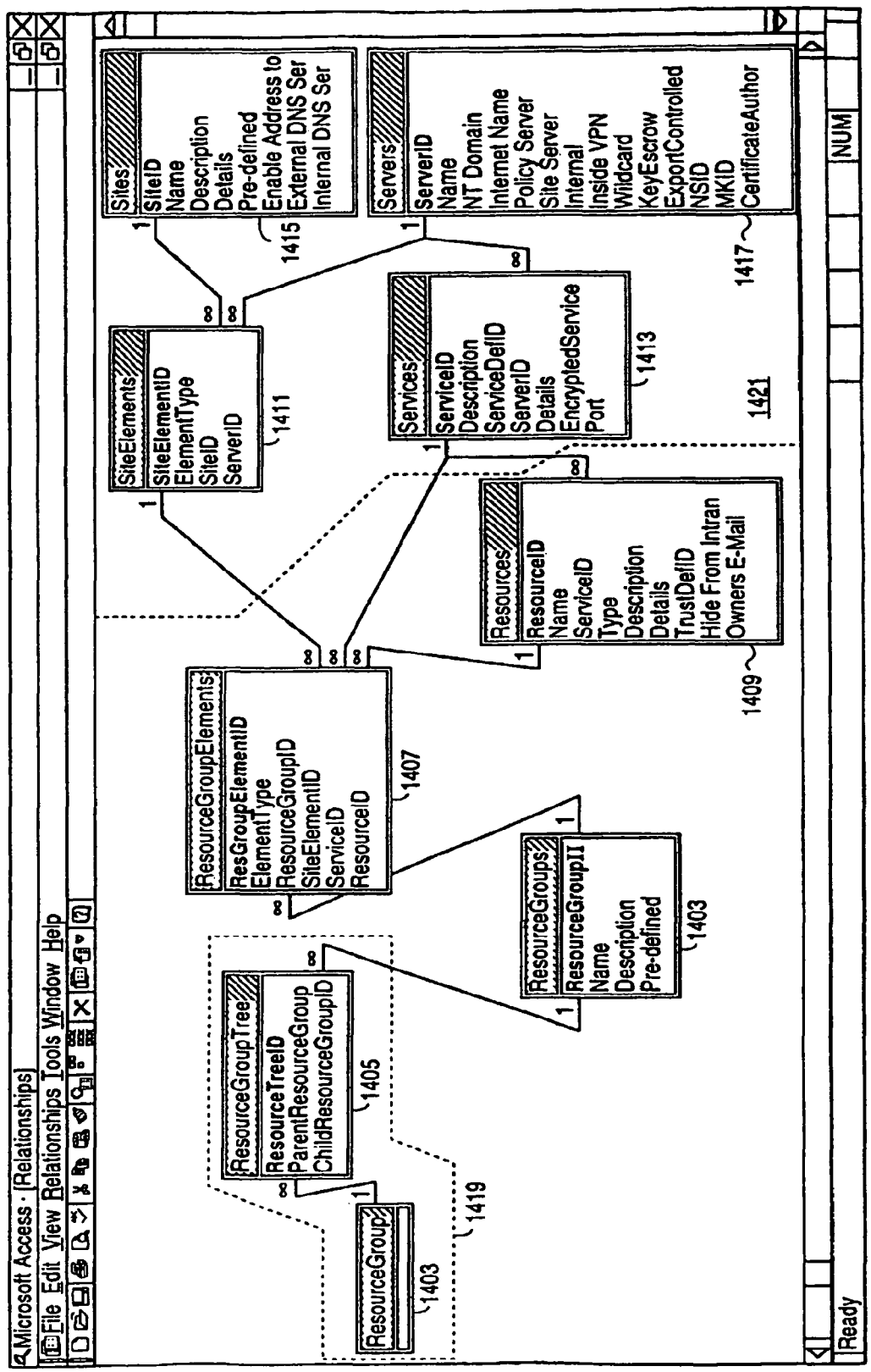
FIG. 14 is a schema of the part of access control database 301 that defines information sets.

Information Set Tables: FIG. 14

FIG. 14 shows the schema 1401 for the tables that define information sets. These tables relate information sets (resource groups in FIG. 14) to the resources that make them up and to the network locations of the resources and also organize the information sets into the hierarchical list of information sets displayed at 1003 of FIG. 10. Each information set in access control database 301 is represented by a table of class resource group 1403. Tables of class resource group are organized into a hierarchy for inheritance and display purposes by tables 1419. The relationship between an information set and the resources that make it up on one hand and the locations in the VPN in which they are stored are established by tables of class resource group elements 1407. A table of class resource group may be linked to any number of tables of class resource group elements. A table of class resource group elements is linked to any number of tables of the classes Site Elements 1411, Services 1413, and Resources 1409. There is a table of class Resources for every resource represented in database 301. Included in the table are the resource's ID, its name, the ID for the service that provides it, an ID for a definition of the resource's sensitivity level, a description of the resource, the email address of the administrator of the resource and a hidden flag which indicates whether IntraMap should display the resource to users who do not belong to user groups that have access to the resource. The IntraMap interface obtains the information it needs about a resource from the Resources table for the resource.

The tables of the classes Site Elements and Services, as well as those of the classes Sites 1415 and Servers 1417 belong to the classes 1421 that describe the locations of information in the VPN. There is a table of class Sites for every physical location in the VPN; there is a table of class Servers for every server in the VPN; and there is a table of class Services for every service in the VPN. Links in the tables of class Site Elements relate sites to servers; links in the tables of class Servers relate the servers to the services they offer; and links in the tables of class Services relate the services to the resources that they host.

In determining what information sets a requested resource belongs to, access filter 203 begins with the information in the request. The request is contained in an IP packet, and consequently has a header and a body. In the header there is an IP address which specifies a location in virtual network 201 and a server at the location, a port number which specifies a service on the server, and in the body, the description of the resource in the form prescribed by the protocol. For example, if the request is for a Web page, the description of the resource will be the resource's URL. Access filter 203 uses the IP address to locate a table of class Sites, uses the link in that table to locate a table of class Site Elements 1411. That table relates the site to the server IDS for the servers at the site and access filter 203 uses the server IDS to locate the tables of class Servers 1417 for the site's servers. It can then use the IP address again to locate the table of class Servers corresponding to the server specified in the request and can follow the links from the Server table to the tables of class Services for the service and can use the port number from the request to find the proper Service table. Once it has found the proper Service table, it can follow the links to the tables of class Resources 1409 and locate the Resources table corresponding to the resource in the request. From there, there is a link to a table of class Resource Group Elements 1407 which relates resources to the resource group identifiers for the information sets they belong to. The resource group identifiers in turn specify tables of class Resources Group 1403, and these tables have links to tables of class Resource group Tree, from which the hierarchies of resource groups can be determined to which the resource specified in the request belongs. Having done that, access filter 203 has found the resource groups that are relevant for determining whether the request should be granted. Resources table for the resource further contains the sensitivity level for the resource. Again, the information in information set tables 1401 is compiled into MMFs. When the request reaches the first access filter 203 in the path between the user and the server that provides the resource, the first access filter 203 uses the MME files to make a determination that is the logical equivalent of the one just described. Thus, after examining the MMF files that contain the information from User Groups tables 1301 and Information Sets Tables 1401, the proxy has determined the trust level of the user identification, the sensitivity level of the information resource, the user groups the user belongs to, and the information sets the information resource belongs to.

Figure 16A:
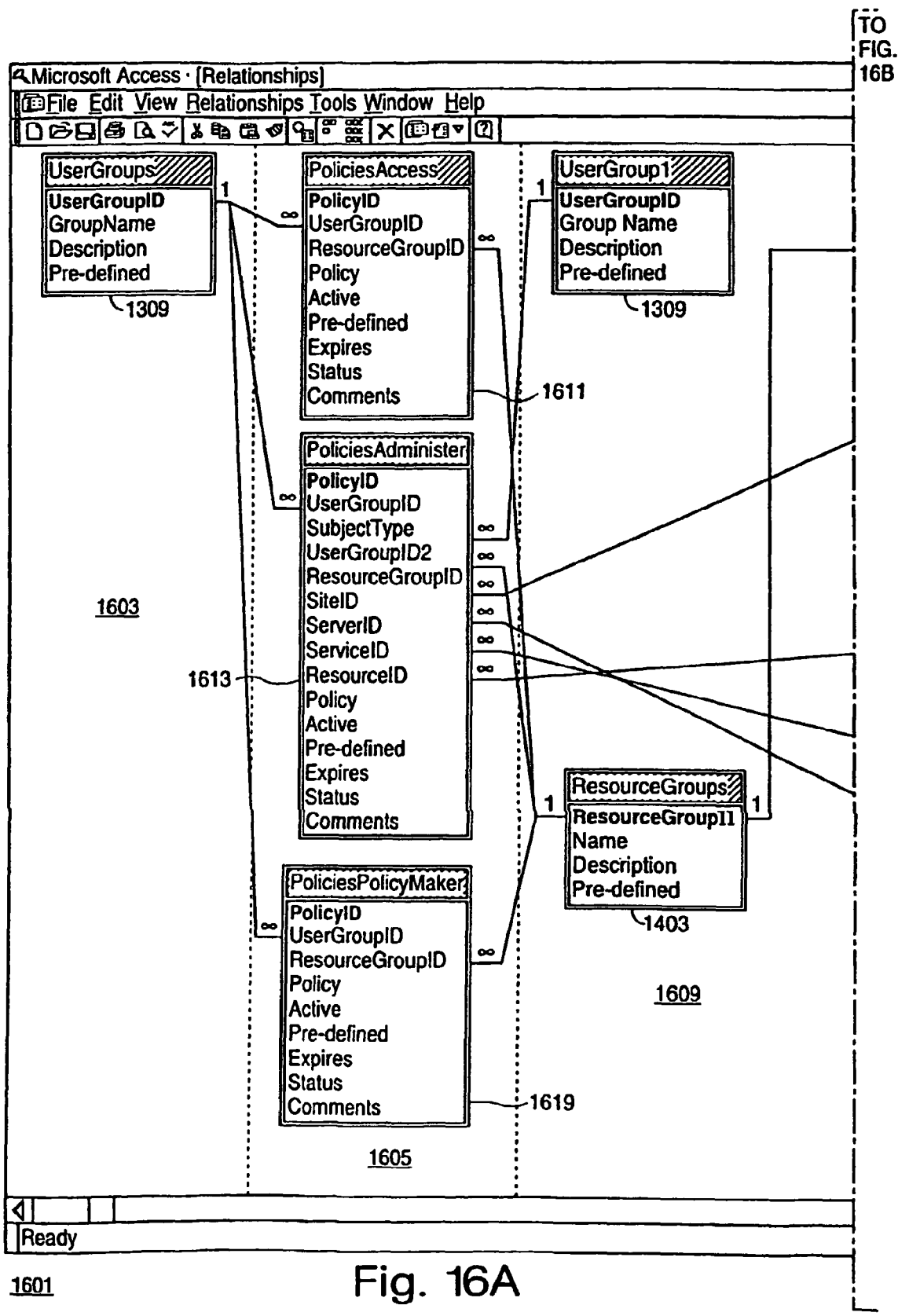
FIG. 16 is a schema of the part of access control database 301 that defines policies.
Figure 16B:
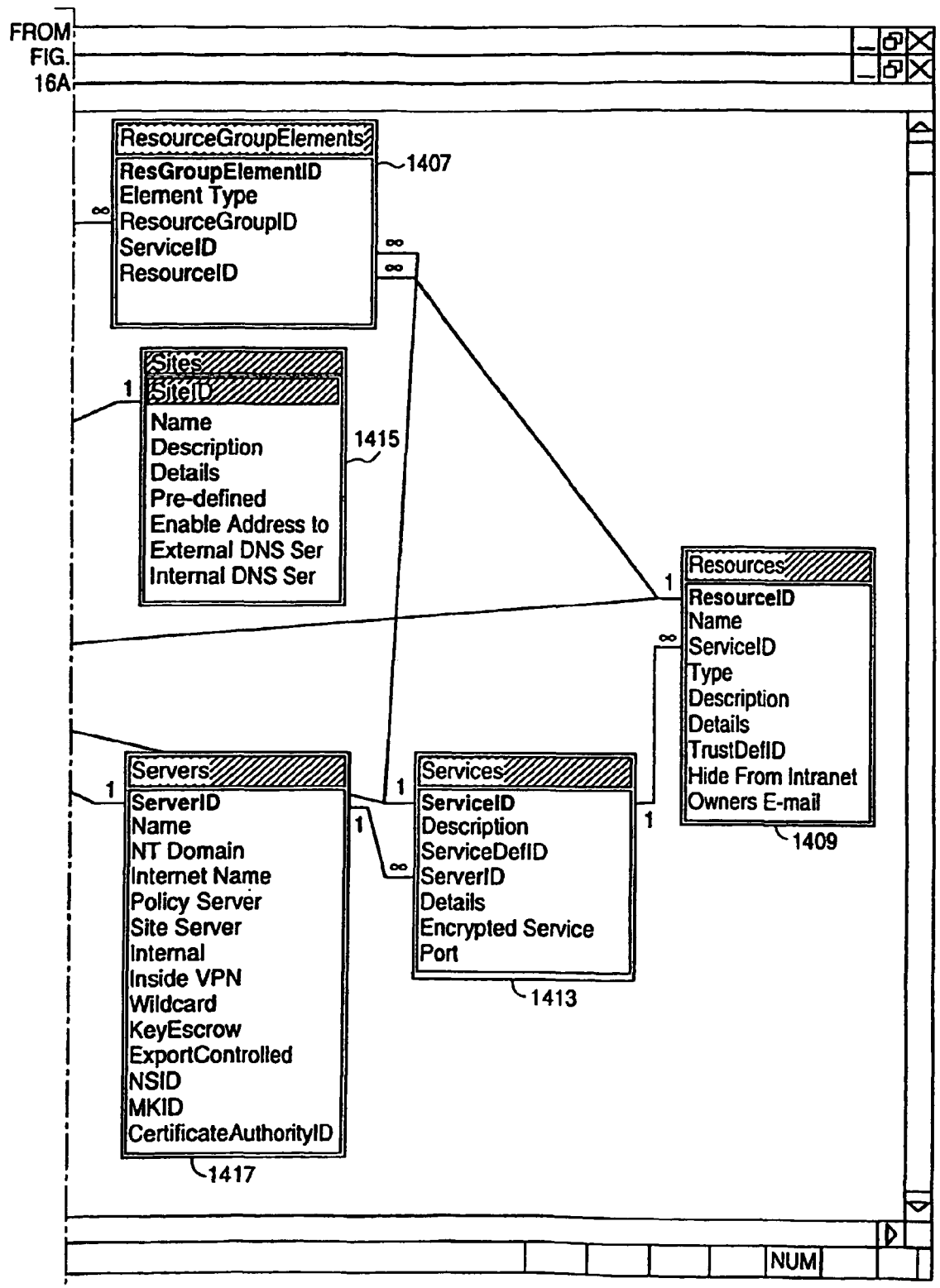

Policy Tables: FIG. 16

FIG. 16 shows the tables used in access control database 301 to define access control policies; included in these policies are access policies, administrative policies, and policy maker policies:

Access policies relate user groups to resource groups;
Administrative policies relates a user group whose members are administrators to one of:
 1. another user group
 2. an information set
 3. a resource
 4. a location (site) in the VPN
 5. an access filter 203 or other server
 6. a service
Policy maker policies relate user groups of administrators to information sets.

Each policy relates a left-hand side, which is always a table of class User Groups 1309, to a right-hand side, which, depending on the kind of policy, may be a table of class Resources 1409, a table of class Resource Groups 1403 (representing information sets), a table of class Sites 1415, a table of class Services 1413, a table of class Servers 1417, or a table of class User Groups 1309. Policy tables 1601 thus fall into three large groups: left-hand tables 1603, policy tables 1605, and right-hand tables 1609. The right to change policies is hierarchical: a member of a user group whose User Group table indicates that it is a group of a type of Administrators can change access policies as determined by the administrative policy for the group. In turn, those administrators may specify other administrative policies related to their sub-domain.

Corresponding to the three kinds of policies, there are three classes of tables in policy tables 1605: tables belonging to Policies Access class 1611, Policies Administer class 1613, and Policies Policy Maker class 1619. Tables of all of these classes share a number of features: they contain the ID of the user group table for the left-hand side of the policy, the ID for the table representing the item specified in the right-hand side of the policy, an indication of the policy (access allowed or denied), an indication of whether the policy is pre-defined and cannot be deleted, and an indication of whether the policy is presently active. The difference between the classes is what can be on the right-hand side of the policy, and therefore the links to the entities on the right-hand side; in the case of access policies and policy maker policies the right-hand entities are information sets only, and consequently, tables of the Policies Access and Policies Policy Maker classes contain right-hand links only to tables of the Resource Groups class, while tables of the Policies Administer class may contain right-hand links to in the alternative tables of class User Groups, tables of class Resource Groups, tables of class Sites, tables of class Servers, tables of class Services, and tables of class Resources.

The rights given the user group specified by the user group on the left-hand side of an administrative policy over the sets of entities specified by the right-hand side vary depending on the kind of entity, as shown in the following table:

| Left-hand Side | Right-hand Side | Meaning of "allowed" Access |
|---|---|---|
| User group | any | Members of the user group can create administrative policies for the target or included items. This allows for the delegation of responsibilities. |
| User group | User group | Members of the user group can administer the target user group, including nested user groups. Allowed administration includes deleting, moving, and copying the target user group; nesting it in another user group; adding members to it; and nesting other user groups in it. |
| User group | Information set | Members of the user group can administer the information set, including nested information sets. Allowed administration includes deleting, moving, and copying the target information set; nesting it in another information set; adding members to it; and nesting other information sets in it. |
| User group | Site | Members of the user group can administer the site, including elements under it from the Available Resources list (all Access Filters, servers, services, and resources). Allowed administration includes deleting and moving the site; adding it to an information set; and adding locations and Access Filters to it. Control over the Intranet location is necessary in order to define new Access Filters. |
| User group | Access Filter | Members of the user group can administer the Access Filter, including elements under it from the Available Resources list (all servers, services and resources). Allowed administration includes deleting and moving the access filter; adding it to an information set; and adding servers or services to it. |
| User group | Server | Members of the user group can administer the server, including elements under it from the Available Resources list (all services and resources). Allowed administration includes deleting and moving the server; adding it to an information set; and adding servers or services to it. |

-continued

| Left-hand Side | Right-hand Side | Meaning of "allowed" Access |
|---|---|---|
| User group | Service | Members of the user group can administer the service, including resources under it from the Available Resources list (all resources). Allowed administration includes deleting, moving, and copying the server; adding it to an information set; adding resources to it. |
| User group | Resource | Members of the user group can administer the resource. Allowed administration includes deleting, moving and copying the resource and adding it to an information set. |

The following table describes the rights given administrative user groups when they appear on the left-hand side of a policy maker policy:

| Left-hand Side | Right-hand Side | Meaning of "allowed" Access |
|---|---|---|
| User group | Information set | Members of the user group can manage access policies controlling access by any user group to the information set, including nested information sets. They may also include the information set and any of its descendants in a further policy maker policy. |

As pointed out in the discussion of the Information Set tables above, the proxy that is doing the access checking can use the User Group tables and the Information Sets tables to find the user groups the user making the access request belongs to and the information sets the information resource being accessed belongs to and can also use these tables to determine the trust level of the user identification and the sensitivity level of the information resource. The proxy can thereupon use the Policies Access tables to find whether any of the user groups the user belongs to may access any of the information sets the information resource belongs to. If any such user group is found, the user may access the information set if the request's trust level is as high as the information resource's sensitivity level. To determine the request's trust level, the proxy must determine the trust level of any encryption technique being used and/or the trust level of the path in VPN 201 that is being used for the access. This information is available in access filters tables 1701, shown in FIG. 17 and described below. If either the access policies or the access request's sensitivity level do not permit the access, the message is disregarded and any session it belongs to is dropped. The access checking process is substantially the same when the request is a request by a user who is a member of an administrative user group to access database 301, except that when access is permitted, it may result in a modification of the database in accordance with the rules set forth above. That modification will then be propagated to all other access filters 203 in VPN 201.

Figure 17A:
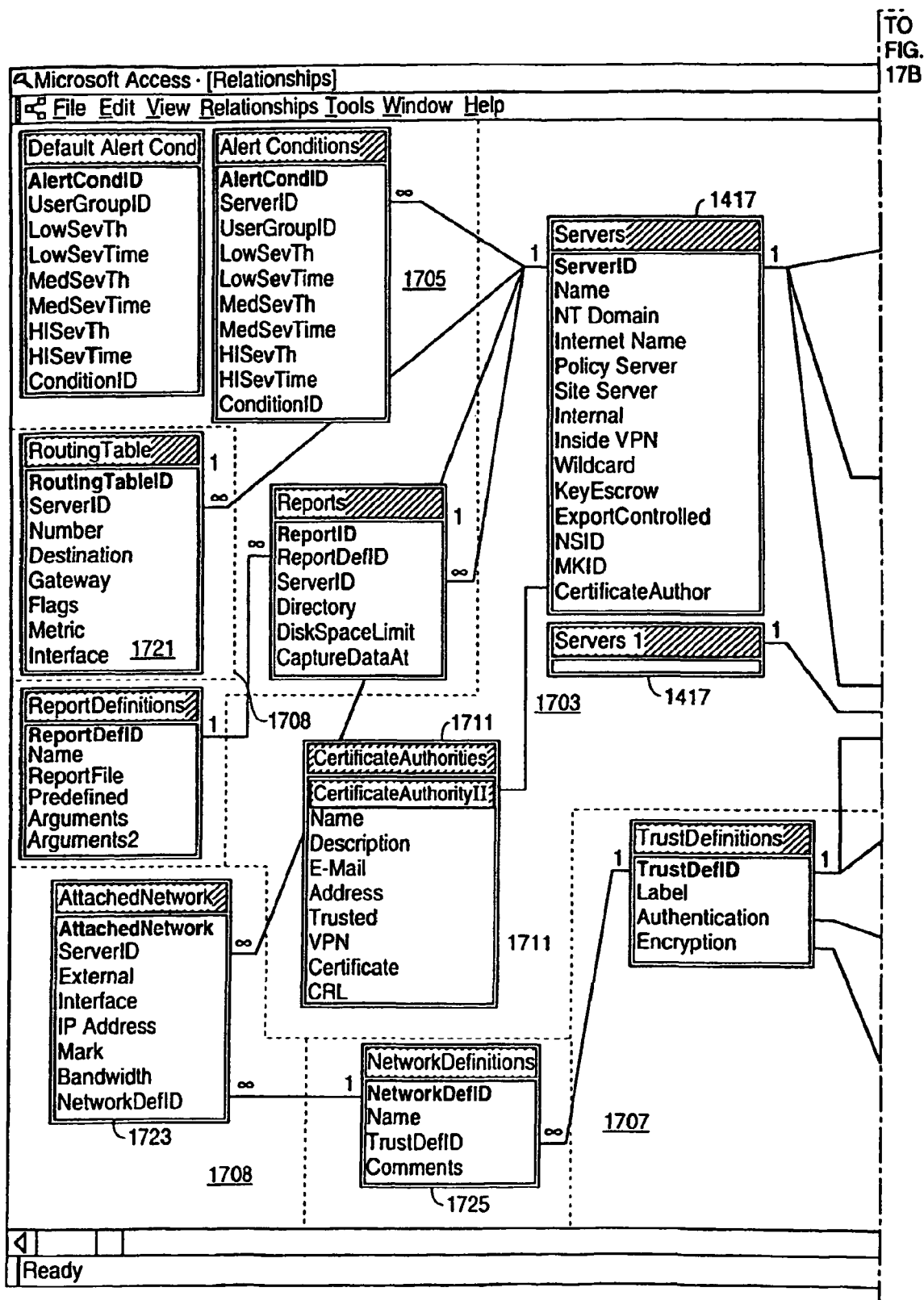
FIG. 17 is a schema of the part of access control database 301 that defines servers.
Figure 17B:
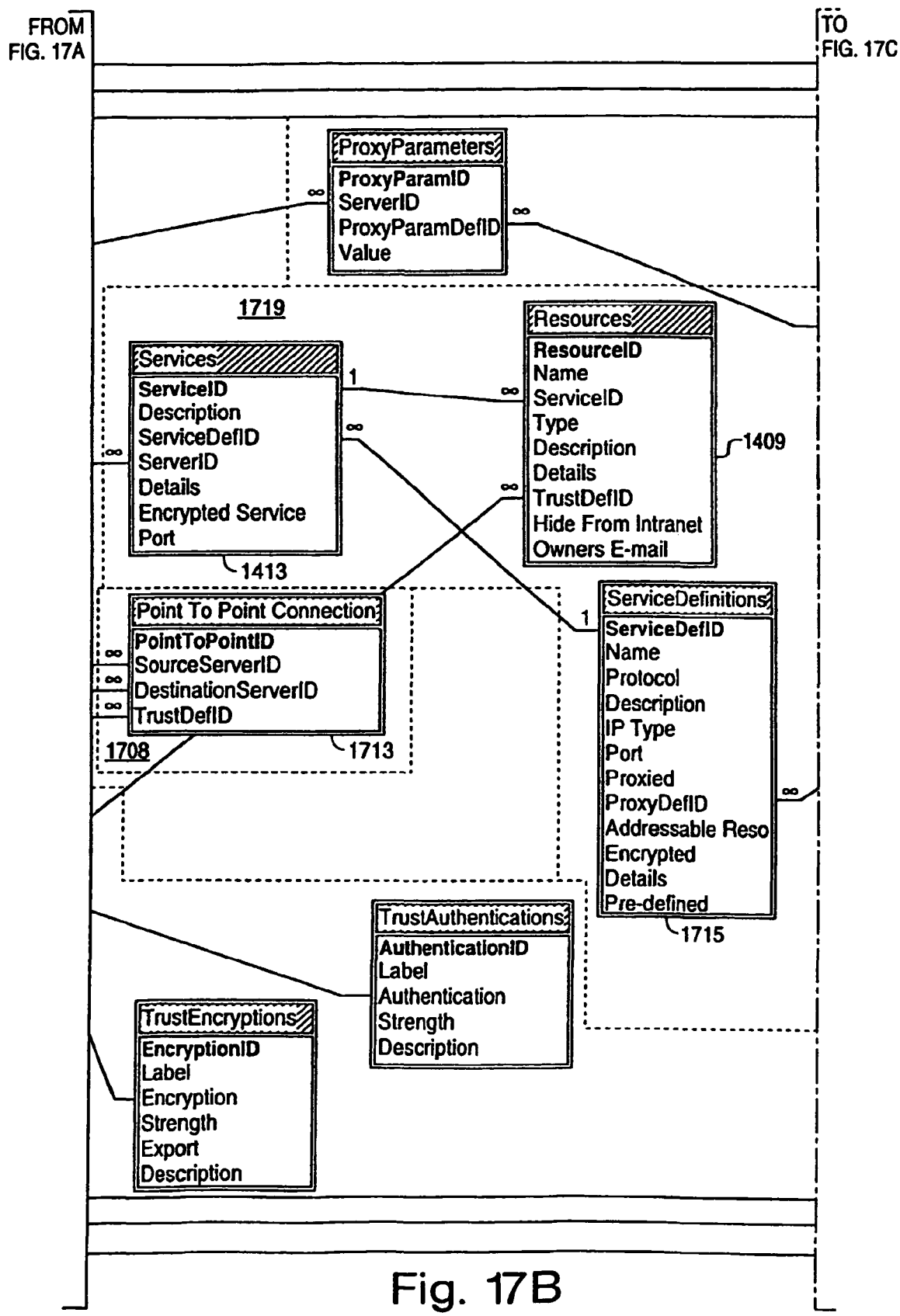
Figure 17C:
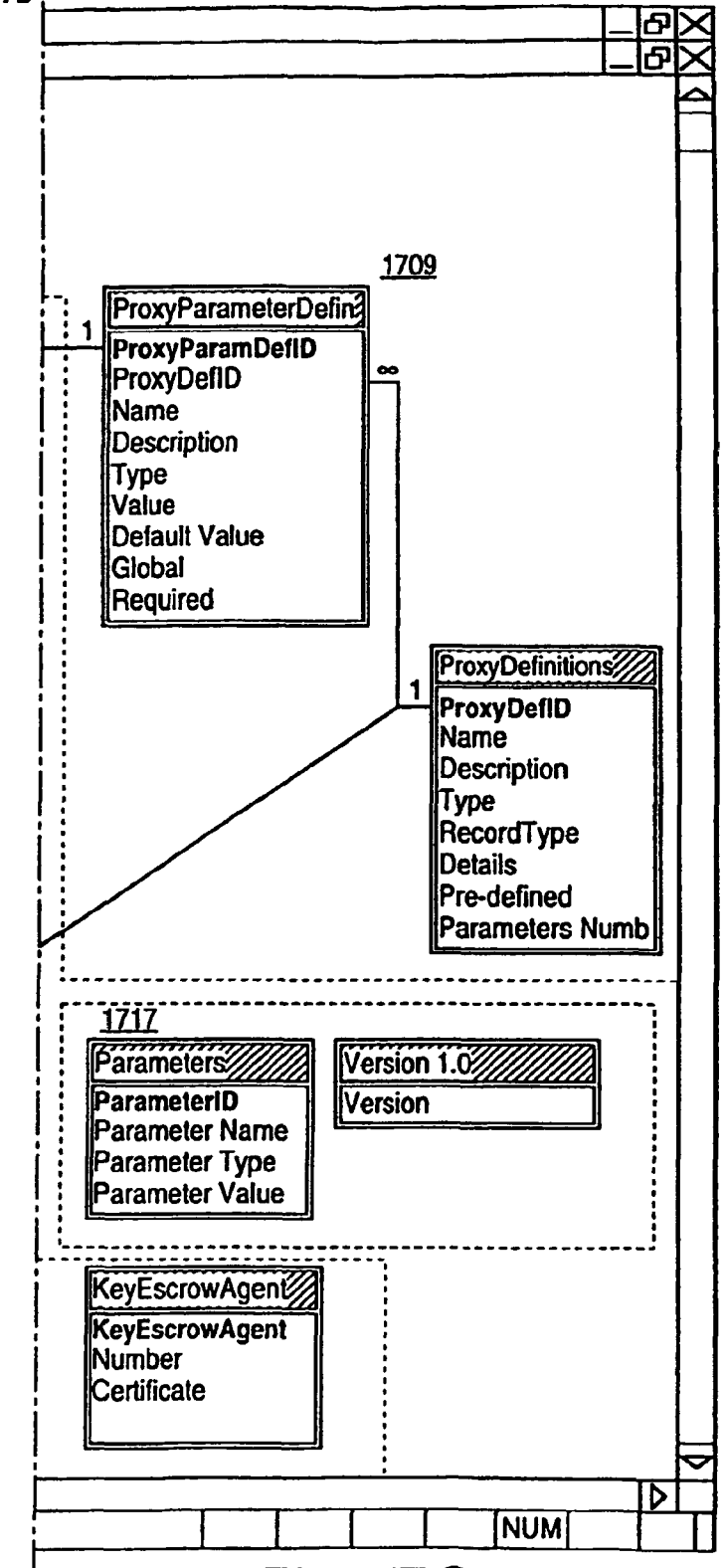

Server Tables: FIG. 17

FIG. 17 shows the schema for tables that are particularly significant for the operation of servers in the VPN. There are three kinds of servers in the VPN:

Plain servers. These are the servers upon which the resources are stored and which execute the services by means of which the resources are accessed.

Access filters 203.

Policy manager servers. These are access filters 203 that additionally coordinate and distribute database 301 and/or generate reports about operation and status of the VPN.

An access filter 203 may function additionally as a plain server.

There is a table of class Servers 1417 for every server in the VPN. Information in the table for each server included its ID, name, domain in the Windows NT brand operating system, its Internet name, whether it is an access filter 203 and additionally a policy server, whether access to it is available only via an access filter 203, and whether it is inside the VPN. If the server is an access filter 203, it additionally has an identity that access filter 203 provides to other entities in VPN 201 for purposes of authentication and encryption. In a preferred embodiment, the identity is the X.509 certificate for the access filter used by SKIP. The X.509 certificate also includes a public key for access filter 203. The public key may belong to one of a number of name spaces; the NSID (name space ID) is an identifier for the public key's name space; the MKID (master key ID) identifies the public key within the name space. Also included in the table is a link to a table of class Certificate Authority 1711 that indicates the certificate authority that issued the X.509 certificate for the access filter. Of course, servers other than access filters may also have X.509 certificates, and in that case, their Server tables will have the server's NSID and MKID.

Every plain server in the VPN has one or more services running on it. For example, an FTP service provides access to files (the resources) on the server according to the file transfer protocol of the TCP/IP protocol suite. Each table of class Servers 1417 for plain servers has links to a group of tables that define the services and resources available on the server. As shown at 1719, these tables include tables of class Services 1413, which represent the services, tables of class Resources 1409, which represent the resources available via the services, and tables of class Service Definitions 1715 which define the service.

The remainder of the tables for which FIG. 17 gives the schemas contain information that is used by access filters 203. The tables whose classes are shown at 1705 contain information used by access filters 203 that are policy managers to distribute database 301 and/or to generate reports; the tables whose classes are shown at 1717 contain information about optional parameters for the software being run by a given access filter 203; those whose classes are shown at 1709 contain information about the proxies and other software modules that access filters 203 use to do protocol-level access checking in access filter 203; and the tables at 1707 contain information about trust and sensitivity definitions for identifications of users and kinds of encryption.

The tables indicated by the reference number 1708 contain information about the VPN to which access filter 203 belongs. Access filter 203 uses this information to route sessions and also to determine the trust level of the path being used for a given session. Routing table class 1721 defines tables that list the current routes to all networks accessible from access filter 203. It is automatically updated as those routes change. Attached Network class 1723 defines tables that indicate for each access filter 203 the networks that access filter 203 is presently attached to; tables of that class contain links to tables of class Network Definition, which in turn contain a link to a definition in trust definitions 1707 which indicates the trust level of the network. The last class in this group is Point to Point Connection 1713, which defines tables that describe connections between access filters 203 accessible via the VPN. There is a table for each combination of source and destination access filter 203 and a link to a trust definition that specifies the trust level of the path between the source and destination access filters 203. The trust level in this table is based on the encryption technique used for messages traversing the path.

As previously explained, the User Group tables 1301 and the Information Sets tables 1401 provide the information needed by access filter 203 to determine whether the access policies of tables 1601 permit the access and also provide information about the sensitivity level of the resource being accessed. Access filters tables 1701 additionally provide the information needed by access filter 203 to determine the minimum trust level of the path in the VPN being taken by the session and the trust levels of the available encryption algorithms. Thus, if access filter 203 determines that a given user wishing to access a given resource belongs to a user group which has the right to access the information set to which the given resource belongs and that the authentication level used for the user's identification is no lower than that required for the resource's sensitivity level, access filter 203 can further determine whether the trust level of the path is sufficiently high, and if it is not, access filter 203 can raise the trust level the necessary amount by selecting an encryption algorithm with the required trust level and encrypting the session.

Figure 15:
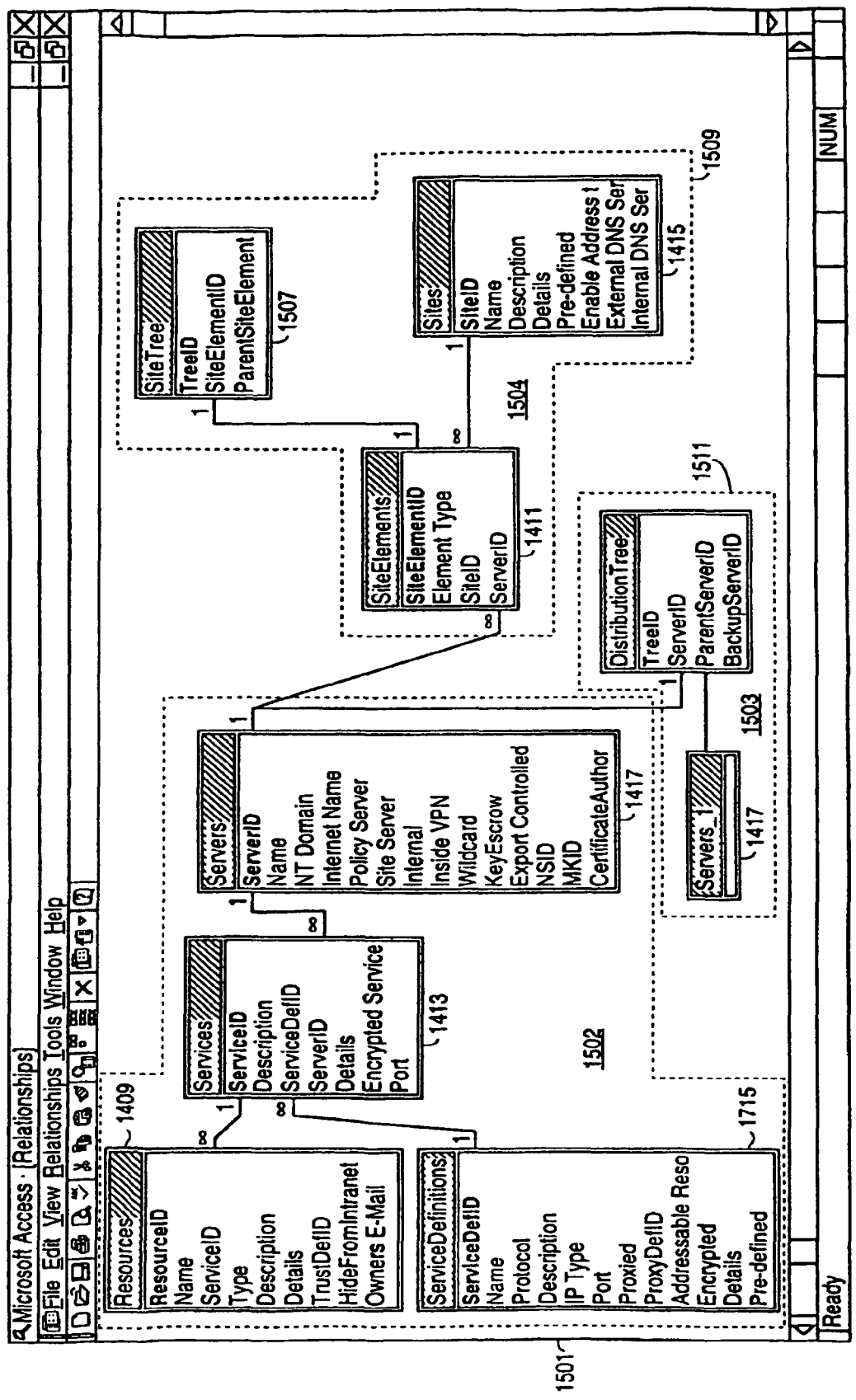
FIG. 15 is a schema of the part of access control database 301 that defines sites in the VPN and the servers, services, and resources at each site.

Available Information Tables: FIG. 15

FIG. 15 shows the schema for available information tables 1501. The tables are used by filter 203 to produce available resources display 1005, shown in FIG. 10. The table classes shown at 1502 relate each server to its services and to the resources provided by the services. The table classes shown at 1504 organizes the available resources into a hierarchy for inheritance purposes and are also used to produce the hierarchical list shown at 1005, and by following the links from the Site Elements tables to the Servers tables, access filter 203 can determine the hierarchy of sites, servers, services, and resources. The table classes at 1503, finally, establish a distribution tree of access filters 203. As will be explained in more detail later, when access control database 301 is modified, the tree defined by those tables determines the order in which modifications are distributed to the access filters.

Figure 19:
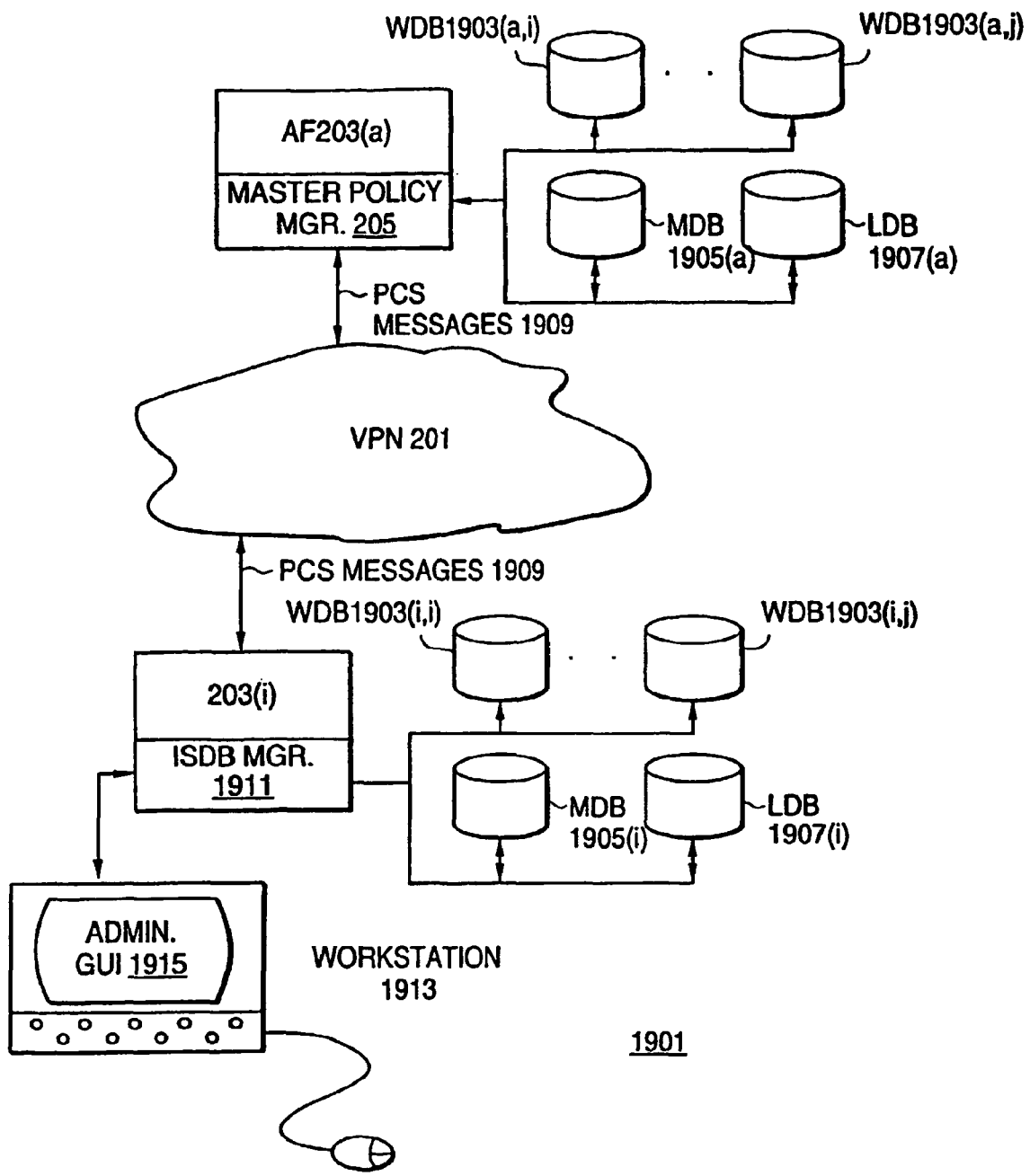
FIG. 19 shows how changes are made to access control database 301.

Modifying Access Control Database 301: FIG. 19

As previously mentioned, each access filter 203 has an exact duplicate of the copy of access control database 301 belonging to master policy manager 205 in access filter 203 (*a*) of FIG. 2. FIG. 19 shows how that copy of access control database 301 is modified and how the modifications are distributed from access filter 203(*a*) to the other access filters 203.

FIG. 19 shows access filter 203(*a*) with master policy manager 205 and another access filter 203(*i*) at which an administrator using a workstation is modifying access control database 301. The messages 1909 needed to distribute and synchronize the modifications are encrypted using SKIP and sent via VPN 201 using a protocol called the private communications service (PCS). Each of the access filters has a number of copies of access control database 301. Any access filter 203 has at a minimum two copies: live database (LDB) 1907, which is the database currently being used to do access checking, and mirror database (MDB) 1905, which is a copy of the database that can be switched in to be used in place of live database 1907. Thus, access filter 203(*a*) has an MDB 1905(*a*) and an LDB 1907(*a*) and access filter 203(*i*) has MDB 1905(*i*) and LDB 1907(*i*).

If an access filter 203 is being used by an administrator to modify access control database 301, then it will additionally have at least one working database (WDB) 1903. The working database is a copy of the database that is not being used to control access and therefore can be modified by the administrator. The administrator does so using a workstation or PC connected via a network to the access filter. The workstation or PC displays the administrative graphical user interface described above, and the administrator uses the GUI to make the changes as enabled by administrative policies. The changes may affect any aspect of the information stored in access control database 301. As indicated above, where the changes are changes in access or administrative policies, the administrator can use the policy evaluation feature to see the effect of the changes. When the administrator is satisfied with the changes, he or she clicks on the apply button and the changes are distributed to all of the access filters and incorporated into each access filter's live database.

The process of updating all of the live databases is called database synchronization and distribution. The process has three phases:

First, the modifications are sent from the access filter 203 where they were made (here, access filter 203(*i*)) to access filter 203 to which the master database belongs (here, access filter 203(*a*)).

There, the changes are incorporated into the master database. This is done by incorporating the changes into mirror database 1905(*a*), then swapping live database 1907(*a*) and mirror database 1905(*a*), and then changing the new mirror database 1905(*a*).

Then, the changes are distributed from the Master Policy Manager to other Access Filters.

At each access filter 203, synchronization is done in the same fashion as with access filter 203(*a*). The order in which the changes are made in the access filters 203 of VPN 201 is determined by distribution tree 1511, which in turn is set up using filters display 1201. The access filter 203 with master policy manager 205 is always the root of the tree. By default, the first access filter 203 installed in VPN 201 has master policy manager 205. As other access filters 203 are installed, they are added to the tree as children of the Master Policy Manager.

The Master Policy Manager distributes changes to its children sequentially. As each child access filter 203 receives its distribution, it then distributes to its children. This means that a shallow distribution tree with many branches off the top level will complete a distribution cycle faster than a deep distribution tree with few branches off the top level. An administrator with the proper access can reconfigure the distribution tree to make distribution more efficient.

If two administrators have modified the same piece of information (for example, an access filter definition) in different working data base 1903, a synchronization conflict can occur. When this happens, master policy manager 205 decides which modification to incorporate into access control database 301.

Figure 21:
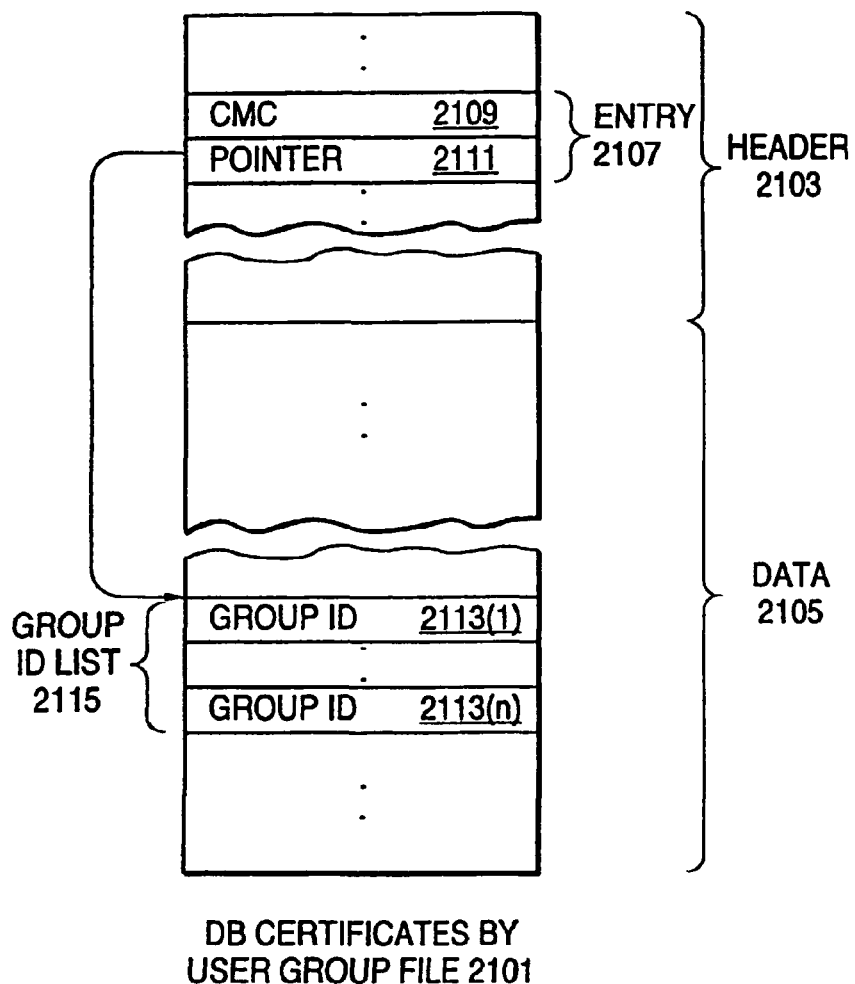
FIG. 21 is a diagram of the structure of an MMF file 2303.
Figure 23A:
FIGS. 23A, B, and C are a table of the MMF files employed in a preferred embodiment.

Optimizing Access Control Database 301: FIGS. 21 and 23

Although appropriate for persistent storage and use by administration GUI 1915, database 301 is not optimized for use in real-time access checking. As will be explained in more detail below, access filter 203 optimizes the data in database 301 that is required for run-time access checking and to make the display for the IntraMap. It does the optimization each time a new copy of database 301 is received in access filter 203. In its optimized form, database 301 is a set of Memory Mapped Files (MMFs) in which the access policy information is stored in a form which permits quick access. The MMFs are so called because they are generated as normal files, but then attached to a program's memory space and accessed by means of memory operations instead of file operations. A further optimization is achieved by using the MMF files to generate rules that are used to do low-level filtering of messages by IP source and destination addresses and port numbers for which access is allowed or denied.

FIG. 21 shows an example MMF file 2303. The MMF file in question is DBCertificatesbyUserGroupFile 2101, which maps the certificate matching criteria used to identify certificates that belong to particular user groups to identifiers in database 301 of records for the user groups specified by the certificate matching criteria. File 2101 thus permits a proxy that has the certificate that identifies the source of a message that has been encrypted using SKIP to quickly determine the user groups that the user identified by the certificate belongs to. In the preferred embodiment, the certificate matching criteria are the O, OU, and CA fields of the X.509 certificate.

All MMF files 2303 have the same general form: there are two main parts: a header 2103 which contains the information being mapped from and a data part 2105 which contains the information being mapped to. Header 2103 contains a list of entries 2107. Each entry contains a value being mapped from (in this case certificate matching criteria (CMC) 2109) and a pointer 2111 to a record in data 2105 which contains the information being mapped to (in this case, a list 2115 of identifiers 2113 in database 301 for the user groups that the user identified by CMC 2109 belongs to). The entries in header 2103 are sorted by the information being mapped from (here, CMC 2109), so that standard fast searching algorithms can be used to locate an entry 2107 corresponding to a given set of certificate matching criteria.

Figure 20:
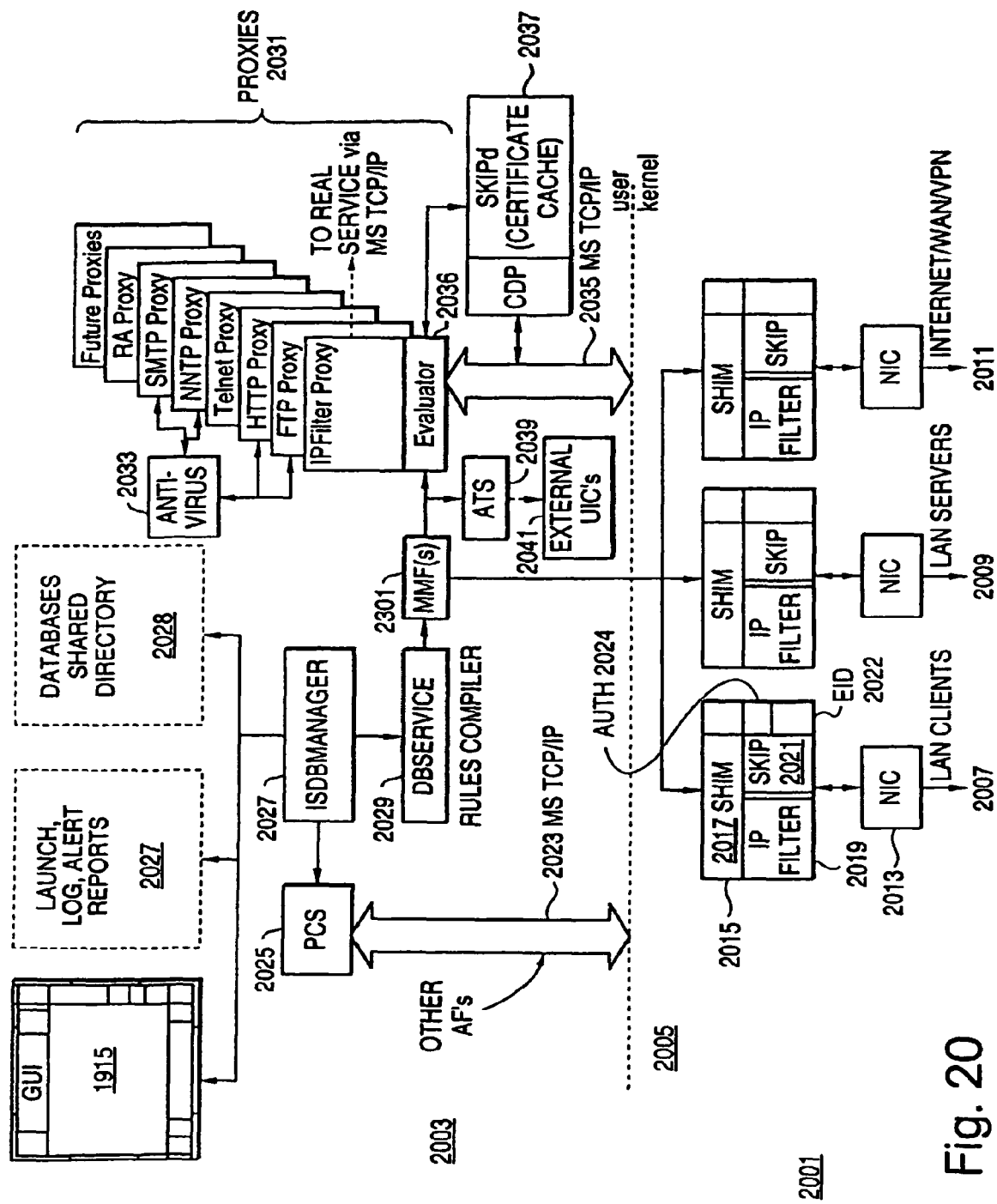
FIG. 20 is a detailed block diagram of the architecture of an access filter 203.

FIGS. 23 A, B, and C provide a complete list of the MMF files 2301 that are employed in one implementation of access filter 203. The relationship between these files and the tables of database 301 will be apparent from the descriptions of the contents of the files provided in the table. Each MMF file 2303 is represented by an entry in the table which indicates the file's name and its contents. The files are subdivided into groups 2311, 2313, 2319, 2321, 2323, and 2422. Files of particular interest are DBUsersFile 2307 and DBResourcesFile 2309, which describe policies, DBCertificatesByUserGroupFile 2101, which is the MMF file shown in detail in FIG. 21, DBResourceIDbyServiceIDFile 2315, which relates URLs of resources to resource IDS, DBResourcesbyResourceIDFile 2317, which relates resources to resource groups, and DBTrustTableFile 2325, which implements SEND table 601. Moreover, the following files are used to compile rules:
DBServerIDByNameFile
DBIPAndTypeByServerIDFile
DBServicePortToProxyPortFile
DBAttachedNetworksByServerIDFile
DBRoutingTableFile
DBRoutingTablebyServerIDFile The files in IntraMap information 2422, finally, are filtered to make list 2431, which is then downloaded to the client for use by IntraMap applet 2411.
Details of Access Filter 203: FIG. 20

FIG. 20 is a block diagram of the architecture 2001 of an access filter 203. In the implementation shown in FIG. 20, all of the components of access filter 203 other than NIC cards 2013 are implemented in software. The software of the implementation runs under the Windows NT brand operating system manufactured by Microsoft Corporation. The software components fall into two broad classes: those that run as applications programs at user level 2003 of the operating system and those that run at the kernel level 2005 of the operating system. In general, the programs that run at the kernel level do IP-level access checking and encryption and authentication, while those that run at the user level do application-level access checking. Also included in the user-level components are software that manages access control database 301 and software that produces the MMFs and rules for IP-level access checking from access control database 301. The following discussion will begin with the kernel components, continue with the user-level components related to access control database 301, and will then deal with the components for protocol-level access checking.
Kernel-Level Components Network Interface Cards (NICs) 2013: These are the ethernet and token ring cards installed in access filter 203. Three network cards are typically configured. One is configured for the interface to the Internet, to a wide area network (WAN) 2011, or to a network connected to another access filter 203. Another is configured for interface 2007 to all client computers and a third is configured for interface 2009 to the servers providing TCP/IP services. If there is no need for an access filter 203 to be interposed between clients and servers, there may be only two NICs 2013, one to WAN 2011 and the other to a LAN. There will be no need for the access filter to be interposed if no servers exist at access filter 203's location or if it is acceptable for all local clients to have access to all local information resources.

SHIM 2017: at installation time, a shim software module is inserted between two levels of the Windows NT brand operating system (the NDIS and TDIS levels). This causes all traffic for particular protocols to pass through SHIM 2017. In the implementation, all traffic for TCP/IP protocols pass through SHIM 2017, while non-TCP/IP protocol traffic goes directly from the NIC to the appropriate other kernel modules. SHIM 2017 invokes SKIP module 2021 as required to process the TCP/IP protocol traffic.

SKIP module 2021: All IP network traffic is sent through SKIP module 2021. If an incoming packet is not SKIP type, i.e., does not require the authentication and decryption services performed by SKIP, then SKIP module 2021 passes it to IP filter module 2019. Similarly, if an outgoing packet is not to be encrypted, then SKIP module 2021 sends it directly to the proper NIC 2013 for transmission. With SKIP-type packets, authenticator 2024 in SKIP module 2021 serves to authenticate a session and encryptor/decryptor 2022 serves to encrypt and decrypt information at a session level. Both authentication and encryption/decryption may be done with an arbitrary number of other access filters 203, servers that employ SKIP, and clients that employ SKIP. Authentication and encryption algorithms are set by IP filter module 2019 for outgoing packets based on SEND parameters or are specified within incoming packets.

SKIP module 2021 maintains enough state information for each other site that it talks to so that it can maintain high-speed operation for most SKIP-type packets. Packets are sometimes 'parked' while additional processing (shared secret and temporary key calculation) is performed. 'skipd' module 2037 in user space 2003 performs this extra processing.

IP Filter 2019: The IP filter operates on a set of rules that the rules compiler, a component of database service 2029, makes from the access policies in access control database 301. The basic functions of IP filter 2019 are to:
1. Pass traffic up to the TCP/IP stack.
2. Block traffic—explicitly drop traffic for specific IP addresses and according to special rules for emergency conditions.
3. Drop traffic—implicitly drop traffic that neither matches any rules nor is allowed by any policies.
4. Proxy traffic—rather than deliver traffic to the indicated destination, route it to a proxy application on the current machine.

5. Perform network address translation—change potentially illegal internal IP addresses to legal ones.
6. Pass decisions off to pr_ipf (discussed below) upon establishing a new session for which access control cannot be decided strictly by the rules. Typically, this is for sessions that may be allowed by policies or by the VPN tunneling features described previously.

IP filter 2019 performs these functions based on the following information:
Rules generated by the rule compiler;
Source and destination IP address and port;
Encryption, or lack of it, on the incoming packet; and
Desired encryption and authentication on outgoing packets.

Components having to do with Database 301

Shared Directory 2028: VPN 201 uses a single access control database 301 that is kept resident in each and every access filter 203. All versions of database 301 in a given access filter 203 are maintained in shared directory 2028. Shared directory 2028 also contains each access filter 203's log files.

Private Connect Service (PCS) Module 2025: PCS module 2025 provides access filter-to-access filter communications in VPN 201. All such communications go through the PCS. The PCS has its own IP port number and its messages must be encrypted. The particular functions carried out by means of PCS messages are:
Distribution tree management;
Distribution and synchronization of database 301;
Retrieval and distribution of routing table 1721;
Retrieval of Windows domain and user information;
Network scanning;
Retrieval of log contents; and
Transfer of files used by reporting and other subsystems.

ISDB Manager 2027: ISDB manager 207 manages database 301. It and the PCS are the only interfaces to the copies of database 301 in each access filter 203. It contains the software used to read and write all tables in the copies of database 301.

DB Service and Rules Compiler 2029: DB Service 2029 produces MMF files 2301. It does so each time a new copy of database 301 is received in access filter 203. It utilizes the functions provided by ISDB Manager 2027 to read live database 1907(I) for a given access filter 203(I) and generate the MMFs 2301. A component of DB service 2029 is the Rule Compiler, which generates rules for use in the IP filter module from relevant ones of the MMFs 2301. The rules specify IP sources, destinations, and port numbers for which access is allowed or denied. The Rule Compiler exists as both a DLL and an application program that simply invokes routines in the DLL. In normal operation, the routines in the DLL are invoked by the DB Service whenever a modified database 301 is received in access filter 203(I) from master policy manager 205. The application program is used in special modes during the installation and bootstrapping process.

Memory Mapped Files (MMFs)2301: As already explained, the MMFs 2301 are data files generated by DB Service module 2029 and utilized by a number of other modules in access filter 203. The files are designed to make the following operations as efficient as possible:
Map from user identification to user group(s);
Map from information resource to information set(s);
Find policies that are associated with user groups; and
Find policies that are associated with information sets.

Components Related to Authentication

Evaluator 2036: Evaluator 2036 is a set of DLLs that are used by each proxy in proxies 2031. Evaluator 2036 provides the following functions to the proxies:
Prompting the user for further in band or out-of-band identification information;
Obtaining out-of-band authentication information from the Authentication Tool Service (ATS);.
Obtaining the certificate associated with the current user from SKIPd;
Reading the MMFs 2301 and determining whether the access policies permit the user to access the resource; and
Implementing the trust/sensitivity calculations for the path if access is otherwise allowed, including deciding whether access may be allowed via the path and if so, what encryption and authentication is needed and which access filter is nearest the server. These functions are performed by a component of evaluator 2036 termed the VPN manager.

Authentication Tool Service/User Identification Client (ATS/UIC) 2039 and 2041:

ATS 2039 is the server in a client-server application that gathers and authenticates user information. ATS 2039 runs on the computer upon which the other components of access filter 203 are running. The client part is UIC 2041, which runs on Windows-based clients. ATS 2039 and UIC 2041 are the mechanism by means of which access filter 203 obtains out-of-band authentication information. ATS 2039 and UIC 2041 communicate by means of a session which is separate from the session being authenticated. ATS 2039 gathers and caches the authentication information it obtains from the UIC clients and provides it to Evaluator 2046. The cached information from the clients includes
Windows ID;
Identity Certificates; and
Authentication token ID's.

SKIPd 2037:

Most of SKIPd's functions are in support of SKIP 2021. Those functions include:
Exchange of certificate information with other communications partners. This is done through the use of the Certificate Discovery Protocol (CDP).
Calculation of the Diffie-Heliman shared secret. This shared secret is key to the operation of SKIP. This calculation can take a considerable amount of time and is saved to disk in an encrypted fomm.
Calculation of the transport key used to encrypt the session. These keys last for a period of time or amount of data.
In addition, SKIPd will provide certificate matching criteria to the Evaluator(s) for use in user identification.

Proxies 2031

As previously explained, a proxy is software in filter 203 that intercepts traffic for a particular protocol. The proxy 'understands' the protocol that it is intercepting and can obtain the information required to identify the resources being accessed and/or to authenticate the user from the messages that are being exchanged during the session. All of the proxies but SMTP receive messages on ports other than the standard ports for their protocol, with the IP filter redirecting messages using a given protocol from its standard port to its non-standard port. The proxy provides the information it has obtained from the session to evaluator 2036 to decide whether the user has access to the information resource. If the user does have access, access filter 203 forwards the incoming messages to the server to which they are addressed and the messages are processed further in the server by the service for the protocol. In the following, each of the protocols employed in a preferred embodiment is discussed; of course, other embodiments may include proxies for other protocols.

Pr_ipf: The majority of network traffic occurs over a small number of protocols for which there are proxies in access filter 203. However, even where there is no proxy, an access decision must be made. In some cases, the decision can be made at the kernel level by IP filter 2019; when it cannot be, IP filter 2019 provides the traffic to pr_ipf, which obtains whatever information relative to user identification and information resources it can from the traffic and passes the information to evaluator 2036 to determine whether access should be granted. Pr_ipf is not truly a proxy, since it only makes an access determination for IP filter 2019 and does not pass any traffic to standard protocol software.

FTP: The FTP proxy handles TCP/IP packets for the File Transfer Protocol. In a present embodiment of VPN 201, access control is only enforced to the account (logon) level; in other embodiments, access may be controlled to the file access level. During the FTP logon portion of the protocol, the proxy determines the server and account being accessed and provides this information to evaluator 2036 to determine whether the user belongs to a user group whose members may access the information sets corresponding to the account. The proxy further handles the in-band authentication using tokens in interactions with the user that are specified in the FTP protocol.

FTP is actually a very complex protocol, involving both an active and passive mode (used in Web browsers and some automated FTP clients). In addition, FTP data transfers utilize a second, dynamically determined TCP session. This requires a special interface between the FTP proxy and IP Filter 2019 so that the FTP proxy can indicate to IP filter 2019 that it should allow the second session.

HTTP: The HTTP proxy is built from the source code for the public domain CERN implementation of HTTP and contains all of its caching logic. The proxy uses evaluator 2036 to check each access to a URL. No in-band authentications are performed with HTTP.

Telnet: The Telnet resource is only controlled to the server level due to the non-standardized nature of Telnet logins. The Telnet proxy is only used in order to provide additional in-band authentications. It is the simplest of the true proxies.

NNTP: The NNTP (Network News Transfer Protocol) is used to control both news feed and news reading operations. During the feed operation, the NNTP proxy watches for uuencoded messages. These are binary messages that have been translated into ASCII text for the purposes of transmission. Such messages are often broken up into multi-part messages to keep them to a reasonable size. The NNTP proxy caches all parts of binary messages. For each such message, if that message is the last part that will complete a multi-part message, then the entire multi-part message is assembled and anti-virus 2033 checks it for viruses as described in more detail below. During the news reading operation, access is protected to the news group level. As in other proxies, evaluator 2036 is used to determine if the current user may access the news group.

Real Audio: The Real Audio proxy allows clients to access real audio servers that are protected at the server level only. The real audio protocol utilizes a standard TCP socket connection to establish a session, but then uses a return UP channel. As with FTP, the real audio proxy has an interface to IP filter 2019 that permits it to indicate to IP filter 2019 that the return UP channel is allowed.

SMTP: The SMTP (Simple Mail Transfer Protocol) differs from the other proxies in that the IP Filter's proxy rules are not used to redirect traffic to the SMTP proxy. Whereas the other proxies 'listen' on a non-standard port, the SMTP proxy listens on the standard port (25) and then makes its own connections to the standard SMTP server software. The access policies in database 301 must explicitly allow this access. IntraMap: When a user specifies the URL for the IntraMap, report manager 209 downloads the IntraMap Java applet and the downloaded applet attempts to make a connection back to a socket of the access filter 203 that has report manager 209. IP filter 2019 of local access filter 203(I) intercepts the attempt to make the connection and provides it to the IntraMap proxy on local access filter 103(I) The proxy responds to queries from the applet by finding the answers in the local copy of database 301 and returning the answers to the applet, with all answers being filtered to reflect the user's access rights. The IntraMap proxy is not a true proxy in that the entire connection is always completely serviced by the instance of the IntraMap proxy that intercepts the connection.

Anti-Virus Module 2033

Anti-virus module 2033 in a preferred embodiment is a set of DLLs provided by Trend Micro Devices, Inc., Cupertino, Calif. In other embodiments, anti-virus modules from other sources may be used. Anti-Virus module 2033 checks all data entering VPN 201 for viruses. In order to provide the user with feedback on the progress of the transfer and to prevent the user's client program from timing out, the data is transferred to the client and is copied at the same time into a temporary file used for virus checking. The last portion of the data, however, is not sent to the client until after virus checking is complete. As soon as the last portion is in the temporary file, the temporary file is checked for viruses. If no viruses are detected, the remainder of the data is sent to the client. If a virus is found, then the transfer is aborted. In a present embodiment, the user is notified of a failed transmission. If an administrator has so specified, an alert may be sent to the administrator.

Launch, Log, Alert and Reports 2027

The components of this module perform the following functions:

- Launch—controls the initial sequence of startup tasks that takes place on an access filter 203 when VPN 201 is established.
- Logs—a DLL that provides a standardized logging interface.
- Alerts—a standalone program that watches all of the NT logs, looking for alert conditions specified in database 301. The method by which an alert is delivered is specified using the GUI for defining alerts.
- Reports—a subset of the logs are forwarded to a special report log, concentrated into a database and later forwarded to Report Manager 209.

Administrative Graphical User Interface 1915

The GUI may run on access filter 203 or on any computer having a 32-bit Windows brand operating system that is attached to access filter 203. Whether the GUI runs on access filter 203 or on an attached system, it utilizes ISDB MANAGER 2027 to read from and write to a working copy 1903 of access control database 301. All necessary modifications to access control database 301 are made through GUI 1915. An 'apply' operation in the GUI is sent as a signal to PCS 2025, which responds to the signal by starting the previously-described distribution and synchronization operation.

Figure 22:
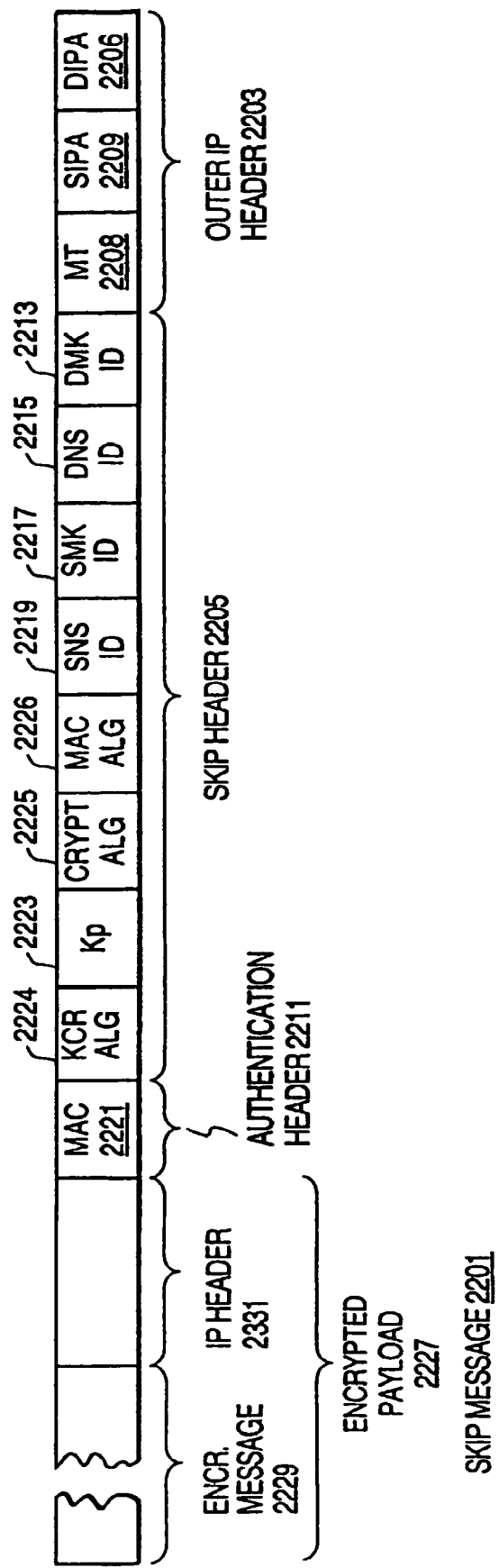
FIG. 22 is a diagram of a message sent using SKIP.

Detailed Example of Operation of Access Filter 203: FIGS. 5 and 22

In the following, the end-to-end encryption example of FIG. 5 will be explained in detail. In that example, a roamer 503 whose PC is equipped with SKIP is accessing a SKIP-equipped server 407 inside a site on VPN 201. When roamer 503 was set up to access VPN 201, it was set up to do so via access filter 403(3) using a particular type of encryption. Here, it will be assumed that the type of encryption being used by roamer 503 has a trust level of "secret" and that the user wishes to access a Web page on server 407 that has a sensitivity level of "secret". Since what is being accessed is a Web page, roamer 503 is using the HTTP protocol for its session with the HTTP service on server 407. Since roamer 503, the access filters 203 in VPN 201, and server 407 are all equipped with SKIP, they are all provided with their own public and private keys. At a minimum, roamer 503 also has the certificate and public key for access filter 403(3) to which it directs messages for servers internal to VPN 201; access filter 403(3) has the certificate and public key for roamer 403 (or obtains them using the Certificate Discovery Protocol); all access filters 203 in VPN 201 have or can get each others' public keys and the public keys for servers in VPN 201 that are equipped with SKIP. Additionally, each access filters 203 in VPN 201 knows the IP addresses of all of the other access filters 203 and servers in VPN 201.

All of the messages which are sent and received as part of the HTTP session between roamer 503 and server 407 are encrypted and authenticated by SKIP. FIG. 22 shows the form taken by such a SKIP message 2201. The SKIP message is made by SKIP software on the system which is the source of the SKIP message. SKIP message 2201 shown here is from roamer 503. Its main components are:

Outer IP header 2203: Outer IP header 2203 is used to deliver the SKIP message to access filter 403(3). Contained in outer IP header 2203 are a source IP address 2209 for roamer 503 and a destination IP address 2206 for access filter 403(3). Destination address 2206 used by roamer 503 was set to specify access filter 403(3) when roamer 503 was set up to access VPN 201. Source IP address 2209 may be dynamically assigned to roamer 503 by the Internet service provider that roamer 503 uses to connect to Internet 121. Outer IP header 2203 further contains a message type (MT) field 2208 which specifies that the message is a SKIP message.

SKIP header 2205: SKIP header 2205 contains the information needed to decrypt SKIP message 2201 when it is received. SKIP header 2205 contains at least a destination NSID 2215 and destination MKID 2213 for the destination's certificate, that is, the certificate for access filter 403(3), and the source NSID 2219 and source MKID 2217 for the source's certificate, that is, the certificate for roamer 503. In addition, SKIP header 2205 contains identifiers for the algorithm used to authenticate the message (MAC ALG 2226) and the algorithm used to encrypt the message (CRYPT ALG 2225), as well as an encrypted transport key for decrypting the message (Kp 2223) and an identifier 2224 for the algorithm used to decrypt the transport key.

Authentication header 2211: Authentication header 2211 contains a MAC (message authentication code) 2221, which is computed according to the MAC algorithm identified in field 2226 and which is used by access filter 403(3) to verify that the message arrived without tampering.

Encrypted payload 2227: Encrypted payload 2227 contains the encrypted message which roamer 503 is sending to server 407, including IP header 2331 for that message and encrypted message 2229. IP header 2331 has the IP address for server 407 and the port number for the HTTP protocol service. Encrypted payload 2227 can be decrypted by using Kp 2223 with the decryption algorithm specified by CRYPT ALG 2225. Handling SKIP Message 2201 SKIP message 2201 arrives on Internet interface 2011 of access filter 403(3). Processing of the message begins at the SHIM level in kernel 2005. SHIM 2017 sends all incoming traffic to SKIP 2021, which in turn recognizes from MT field 2208 that the message is a SKIP message. To decrypt and authenticate the message, SKIP needs to decrypt Kp, and to do that it provides SNSID 2219, SMKID 2217, DNSID 2215, and DMKID 2213 to SKIPd 2037, which uses the IDs to retrieve the certificates for roamer 503 and access filter 403(3) from SKIPd 2037's certificate cache. If a certificate is not there, SKIPd 2037 uses the CDP protocol to fetch the certificate. The information in the certificates is then used together with access filter 403(3)'s private key to create a shared secret value, which is then used to decrypt transport key Kp 2223 and to produce two internal keys, Akp and Ekp. SKIP securely saves the shared secret for use with future messages, since its computation takes a significant amount of time. Next, a MAC is computed for the entire received message and the Akp is used with MAC 2221 and MAC ALG 2226 to verify that entire message 2201 has not been tampered with. If that is the case, the key Ekp is used to decrypt encrypted payload 2227 to recover the original message from roamer 503. Decrypted payload 227 is then provided to IP filter 2019, which applies its rules to the source IP address, destination IP address, and port number of IP header 2231. If no rule denies access, IP filter 2019 follows another rule and redirects the unencrypted message together with SNSID 2219 and SMKID 2217 to the port for the HTTP proxy. IP filter 2019 uses the DBServicePortToProxyPortFile of MMFs 2301 to find the port in question.

Processing continues at the application level in user level 2003 of the operating system. The HTTP proxy has in hand the IP address of the server, the port number of the service, the URL for the Web page, the certificate belonging to the user of roamer 503, and the encryption method used to encrypt the message. It will use evaluator 2036 to determine the following from the MMF files 2301:

the user groups that the user represented by the certificate belongs to;

the information sets that the Web page belongs to;

whether there is an access policy that permits at least one of the user groups to access at least one of the information sets; and whether the trust level of the message is at least equal to the sensitivity level of the Web page.

Beginning with the first of these tasks, evaluator 2036 receives the NSID and MKID for the certificate and uses the certificate matching criteria from the certificate with the DBCertificatesByUserGroupFile to obtain the identifiers for the user groups the user sending the message belongs to.

Evaluator 2036 determines the information sets by taking the IP address of the server, the port number of the service, and the URL for the Web page and using the IP address with the DBServerIDByIPFile to determine the server that contains the Web page, the port number with the DBServiceIDByPortFile to determine the service on the server that provides it, and the URL with the DBResourceIDbyNameFile to get the identifier for the resource in database 301, and then uses the DBResourcesByResourceIDFile to get the identifiers for the information sets that the Web page belongs to.

With the identifiers in database 301 for the user groups and information sets in hand, evaluator 2036 uses the DBResourcesFile to determine whether there is an access policy which permits any of the user groups that the user belongs to access any of the information sets that the Web page belongs to. In so doing, it may only consider user groups whose membership is determined using modes of identification whose trust levels are sufficient for the resource's sensitivity level. The DBResourcesFile maps each information set identifier to a list of the user groups for which there are access policies involving that resource set. For each user group, the DBResourcesFile further indicates whether the policy allows or denies access. Evaluator 2036 uses the DBResourcesFile to determine for each information set in turn that the Web page belongs to whether the list of user groups for which there are access policies with regard to the information set includes one of the user groups to which the user belongs. If there is an access policy for any of the user groups that denies access, the evaluator indicates to the HTTP proxy that access is denied; if there is no access policy for any of the user groups that denies access and at least one that allows access, the evaluator indicates to the proxy that access is allowed; if there is no access policy of any kind for any of the user groups, the evaluator determines if there is at least one certificate or token based user group that has an allow policy for the resource. If so, and the requesting client has a UIC running, then the UIC is contacted to ask the user for additional identity information; if additional identity information comes back, the process described above is repeated. Otherwise, the evaluator indicates to the HTTP proxy that access is denied.

Of course, evaluator 2036 will also deny access if the access request does not have a trust level equal to the sensitivity level of the Web page. Evaluator 2036 obtains the sensitivity level of the Web page from the DBResourcesByResourceIDFile, the trust level of the user identification from DBTrustAuthenticationsFile, and the trust level of the encryption method from the DBTrustEncryptionsFile. Since SKIP has encrypted the message with a method that has the "secret" trust level, the trust level of the path through the network is not of concern in this example. To determine whether the trust levels for the user identification and the encryption method are sufficient for the sensitivity level of the Web page, Evaluator 2023 uses the DBTrustTableFile, which effectively implements SEND table 601. If the trust levels are sufficient, Evaluator 2036 indicates to the proxy that the access is allowed.

Once the proxy has confirmed that access is to be allowed to the information resource specified in the message, the proxy originates a new session to the actual service, the HTTP service on server 407. Proxy 2031 sends a special message to IP filter 2019 telling it to allow the specific session through, since otherwise this session would probably be blocked by rules or sent again to a proxy. The message to IP filter 2019 also includes information about the encryption needed for the new session, which in this example is that the session should be encrypted to the final access filter 403(5) and should use encryption suitable for the data sensitivity level, which is secret. When IP filter 2019 encounters the new session, it finds that it matches the criteria specified by proxy 2031, so it passes the session to SKIP. Since encryption is needed for this session, the message will be reencrypted. SKIP 2021 creates a SKIP message 2201 in the same fashion as described above, except that:

- Outer IP header 2203 for the message specifies access filter 403(3) as the source of the message and access filter 403(5) as the destination;
- SKIP header 2205 has SNSID 2219 and SMKID 2217 for access filter 403(3) and DNSID 2215 and DMKID 2213 for access filter 403(5), and the other values in header 2205 are also those required by the fact that the source and destination for the message are now access filter 403(3) and access filter 403(5);
- Encrypted payload 227 is the same as before (except that it has been encrypted using a different key) and MAC 2221 is produced as required for entire new message 2201.

As the proxy is relaying the message it is also watching for file transfer types that might contain viruses. When it encounters one, it applies anti-virus software 2033 to these files. If a file contains a virus, the proxy fails to deliver the complete file, thereby rendering the virus harmless. If access control database 301 so indicates, the proxy sends an alert when anti-virus software 2033 detects a virus.

As new SKIP message 2201 is received at access filter 403(5), it is passed to SKIP 2021, where it is authenticated and decrypted as described previously. By the same mechanism as described above with regard to access filter 403(3), IP filter 2019 on access filter 403(5) recognizes that the message is destined for the HTTP application protocol, so it directs it to HTTP proxy 2031. That proxy accepts the message, then sends information it can obtain about the message's originator (access filter 403(3) from outer IP header 2203 and SKIP header 2205 to evaluator 2036 to determine whether the session being instigated by this message should be allowed to proceed. Evaluator 2036 examines the source IP address of the message as well as the other identity information, and by looking up the source IP address in the MMF file DBServerIDByIPFile, determines the identifier in data base 301 for access filter 403(3), uses that identifier to locate access filter 403(3)'s certificate, and finds that certificate information matches the retrieved certificate associated with access filter 403(3)'s message being processed. The source of the message, access filter 403(3), is thereby recognized as an access filter 403 within VPN 201, so evaluator 2036 responds that the session should be allowed, for the reason that it is a message already permitted by another access filter 403 within the same VPN 201. This decision to allow the message is returned to the http proxy 2031. The evaluator 2036 will instruct http proxy 2031 on access filter 403(5) to allow any request that comes over the same session, for the same reason. As the http request is processed, the proxy will establish an outgoing connection to the http service on server 407, in the same manner as the outgoing session was established on access filter 403(3).

When the connection is initiated to server 407, evaluator 2036 looks up the IP address of server 407 in the MMF file DBServerIDByIPFile to determine the identifier in database 301 for server 407, uses the identifier to locate the table for the server, and uses the certificate identifier from that table and the DBCertificatesFile to find the certificate for server 407. Then it uses the keys for access filter 403(3) and the public key for server 407 (obtained from the certificate) to construct a SKIP session as described previously. The actual message is encrypted and authenticated, a SKIP header 2205 is added, and an outer IP header 2203 is added, directing the message to server 407.

When the message reaches server 407, SKIP in server 407 checks the authentication on the message, decrypts it, and forwards the decrypted message to the HTTP service, which performs the access to the Web page requested by the message contained in the payload. Having obtained the Web page, the HTTP service makes a return message with an IP header specifying roamer 503 as the destination. This return message is then encapsulated in a SKIP message 2201 as previously described. This SKIP message is directed to access filter 403(5) and contains the information in outer header 2203 and SKIP header 2205 that is required for a message between those entities.

When the reply message reaches access filter 403(5), it is authenticated and decrypted by SKIP 2021 there, and forwarded to IP filter 2019. The message is found to match an existing session so evaluation is not needed; it is forwarded directly to HTTP proxy 2031. There it is checked for validity as an HTTP protocol reply message and retransmitted back to the originator of the HTTP session, which is access filter 403(3). Checking by the anti-virus module 2033 is not done since the originator of this session is known to be another access filter 403 in the VPN 201, as it is known that access filter will do the checking if needed. The retransmission of the reply is again processed through SKIP 2021 and encrypted as above, using the SKIP parameters required for an exchange between access filter 403(3) and access filter 403(5). When this reply message reaches access filter 403(3), precisely the same thing occurs, that is, the message passes through SKIP 2021 and IP Filter 2019, to the http proxy 2031. There it is checked for validity as an HTTP protocol reply message, possibly passed through the anti-virus module 2033 (if the message content type warrants it), and retransmitted back to the originator of the HTTP session, which is roamer 503. The transmission of the reply is again processed through SKIP 2021 and encrypted as above, using SKIP parameters as set forth above for a message being sent from access filter 403(3) to roamer 503. The reply message is then received at roamer 503, where it is authenticated and decrypted by SKIP, provided to the user's browser, and displayed for the user.

Generalization of the Techniques Employed in Access Filter 203

The techniques employed in access filter 203 have been generalized in two ways:
  Separation of policy evaluation from policy enforcement, which permits entities other than access filters to enforce policies; and
  the policy database now not only permits definitions of users, groups of users, resources, and groups, but also of new types of user identification, new types of actions for which policies may be defined, and new types of resources.

The following discussion will first describe how policy evaluation may be separated from policy enforcement and then describe how the types used to define policies may be extended.

Figure 26:
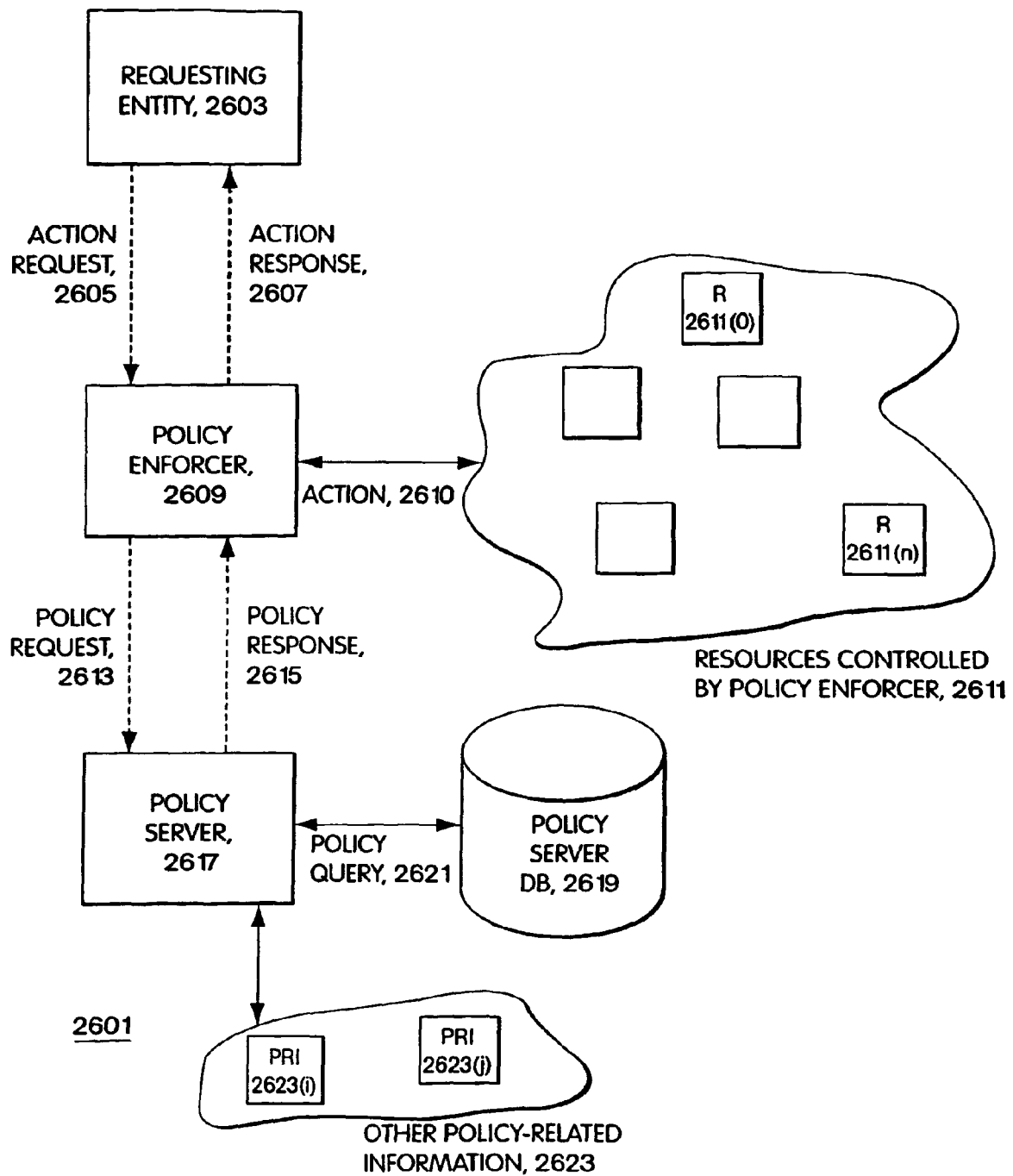
FIG. 26 is a block diagram of an action control system where policy checking has been separated from policy enforcement.
Figure 27:
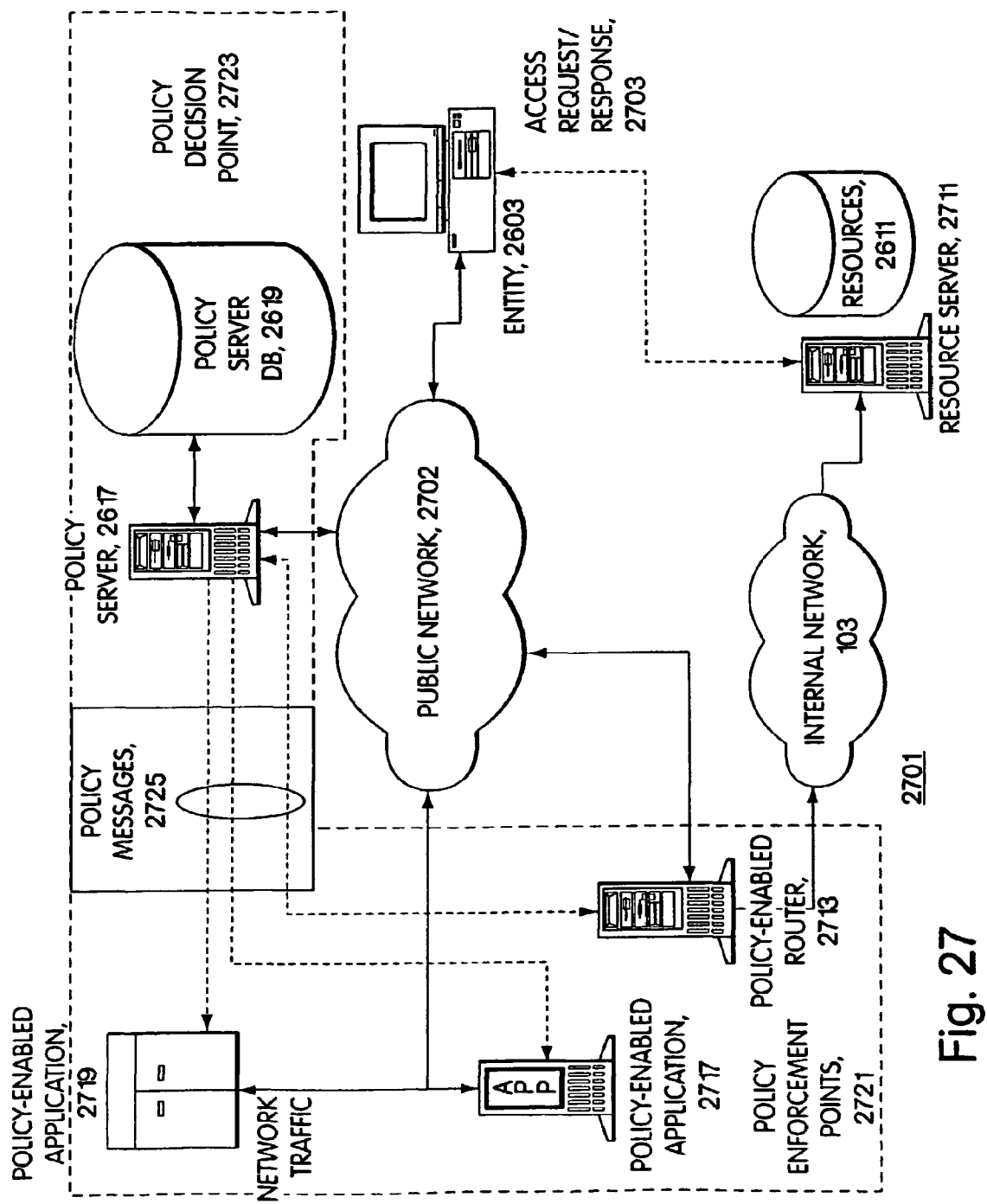
FIG. 27 is a block diagram of an action control system with a variety of policy-enabled devices.

Separation of Policy Evaluation from Policy Enforcement: FIGS. 20, 26, and 27

FIG. 26 is a block diagram of a policy enforcement system 2601 in which policy evaluation has been separated from policy enforcement. In system 2601, the notion of policy has been generalized to include not only access policy, administrative policy, and policy making policy, but any action which a user may perform on an information resource. For example, a policy may state that a particular user group may print documents belonging to a particular information set.

System 2601 has five main components:
  requesting entity 2603, which requests that the action be performed on the information resource, and which may be any entity that can belong to a user group;
  policy enforcer 2609, which can control performance of the requested action;
  resources 2611(0 . . . n), which may be any information accessible to or device controlled by policy enforcer 2609;
  policy server 2617, which determines whether the action is permitted; and
  policy database 2619, which contains the policies from which policy server 2617 determines whether the action is permitted.

Requesting entity 2603, policy enforcer 2609, and policy server 2609 can each be located anywhere. The only requirement is that there be message transmission media between requesting entity 2603 and policy enforcer 2609 and between policy enforcer 2609 and policy server 2617. The medium between requesting entity 2603 and policy enforcer 2609 permits requesting entity 2603 to send a message 2605 requesting that an action be performed on a resource 2611(*i*) to policy enforcer 2609 and receive an action response message 2607 from enforcer 2609 indicating whether the action was taken and if so the result. The medium between policy enforcer 2609 and policy server 2617 permits policy enforcer 2609 to send a policy request 2613 to policy server 2617 requesting policy server 2617 to indicate whether the policies in policy database 2619 permit a given requesting entity to take a given action with respect to a given resource and policy server 2617 to respond to policy request 2613 with a policy response 2615 which indicates whether the policies do permit the action specified in the policy request. It should further be noted that the action controlled by policy enforcer 2609 need not even be performed by a component of the computer system. For instance, policies in the policy database might control access by library patrons to books and the action specified in a policy might be having a library page fetch a book from the stacks.

The forms of the policy request messages 2613 and the policy response messages 2615 are defined by a policy protocol Examples of standard policy protocols that are presently being developed are COPS (Common Open Policy System), which is available at http://www.ietf.org/internet-drafts/draft-ietf-rap-cops-06.txt as of Jun. 21, 1999) and RADIUS (Remote Authentication Dial In User Service, Internet standard RFC2138).

Policy server 2617 obtains the information necessary to make policy response 2615 and then provides the response to enforcer 2609. Policy server 2617 includes a policy server database 2619 which contains policies including one or more policies for the action which requesting entity 2603 has requested policy enforcer 2609 to perform on a resource R 2611(*i*). Policy server 2617 queries policy server database 2619 to locate the relevant policies and then applies them to policy request 2613. Doing this may require policy server 2617 to obtain other policy-related information 2623 from any location accessible to policy server 2617. One example of this process is the technique described in the discussion of access filter 203 by means of which access filter 203 obtains additional identification information about a user. If the information which policy server 2617 obtains from policy server database 2619 and other sources indicates that the action is permitted, policy server 2617 sends a policy response 2615 that so indicates and policy enforcer 2609 performs the action as indicated at 2610 and returns the result via action response 2607 to requesting entity 2603; if policy response 2615 indicates that the action is not permitted, policy enforcer 2609 sends an action response 2607 indicating that the action is not permitted.

An important advantage of separating policy enforcer 2609 from policy server 2617 is that policy enforcer 2609 may be implemented at many different levels within a system, where system is to be understood to include systems made up of devices connected by networks. Policy server 2617 may contain policies for any policy enforcer, and consequently, the actions which may be governed by policies are no longer restricted to actions taken at one or two levels of a system.

FIG. 27 shows a system 2701 with components that are connected by means of networks including a public network 2702 and an internal network 103. At the highest level, system 2701 has one or more policy decision points 2723, which determine whether a policy permits an action, and one or more policy enforcement points 2721, in which the decisions of the policy decision points are enforced. A policy decision point will include a policy server 2617 and a policy enforcement point will include a policy-enabled device, that is, a device which can function as a policy enforcer 2609. Communication between policy decision points and policy enforcement points is by means of policy messages 2725, which include policy requests 2613 and policy responses 2615. When an entity 2603 requests that an action be performed using a resource 2611, the action will be performed by a device controlled by a policy enforcement point 2721, policy enforcement point 2721 will exchange policy messages 2725 with a policy decision point 2723 to determine whether the action is permitted, and if it is, policy enforcement point 2721 will cause the action to be performed.

Included among the policy enabled devices in system 2701 are:
- a policy-enabled router 2713, which enforces policy at the level of routing traffic in a physical network;
- policy enabled attached device 2719, which enforces policy at the level of a device attached to the network of system 2701. An example is a printer which is able to consult policy server 617 to determine whether to accept a print request from a certain entity 2603.
- policy enabled application program 2717, which enforces policy at the level of the application program.

Each of the policy enabled devices deals with policy in the same fashion as described for policy enforcer 2609: when the policy enabled device receives an action request 2703 for which it must determine whether it conforms to the access policies established in policy database 2619, it sends a policy message 2725 to policy server 2617 and when it receives a policy message in response, permits or denies the action as indicated by the policy message.

Continuing in more detail about the levels at which the policy-enabled devices of FIG. 27 work, policy-enabled router 2713 may maintain tables of permitted sources and destinations for the packets it routes; when router 2713 is initialized, these tables are set up from information provided by policy server 2617; from then on, when router 2713 receives a packet with a source or destination that is not in its tables, it sends a policy message 2725 to policy server 2617 indicating the source or destination, and policy server 2617 responds to the message by indicating whether the source or destination is to be included in the tables. Of course, router 2713's tables may also be kept updated by messages sent by policy server 2617 to router 2713 when policy data base 2619 changes. As can be seen from the foregoing, router 2713 does policy checking at the level of IP filter 2019 in implementation 2001 of access filter 203.

Policy-enabled attached device 2719 is a device such as a printer which is attached to the network. The device is able to respond to a request by an entity to use it with a policy message to policy server 2617 and to proceed according to the information it receives from policy server 2617. Such policy-enabled devices 2719 permit a much finer granularity of control over such devices than is possible with access checking at the level of access filter 203.

Policy-enabled application 2717, finally, permits policy enforcement at a higher level than was possible with access filter 203. As long as policy data base 2619 contains policy information relevant to the resources being accessed by an application program, policy-enabled application 2717 can exchange policy messages 2725 with policy server 2617 and can thereby determine whether to permit or deny the action which the user of policy-enabled application 2717 is requesting. One example of a policy-enabled application 2717 is one which implements an Internet service such as FTP, HTTP, or SMTP. This is the level which is handled by proxies 2031 in FIG. 20. Because the services may now be policy-enabled, proxies are no longer necessary; instead, the higher-level Internet protocol can simply be passed on to the system on which the service resides that will provide the access requested by the protocol. As shown in FIG. 27, the service can then itself exchange policy messages 2725 with policy server 2617 to determine whether the requested access should be permitted.

Another example of a policy-enable application 2717 is a document processing program. In this case, policy database 2619 may contain policies specifying sets of users that have the right to modify sets of documents. When the user employs the program to select a document for editing, the document processing program can exchange policy messages 2725 with policy server 2617, and if the policy response from policy server 2617 indicates that the user may not modify the document, the document processing program may so indicate to the user and refuse to permit the user to modify the document.

As may be seen from the foregoing, the separation of policy evaluation from policy enforcement and the extensibility of policy definitions together permit virtually any operation that a program can perform on a resource to be the subject of a policy, and thus makes access control systems like those shown in FIG. 27 not only scalable and easy to manage, but easily adaptable to any present or future devices or programs.

It should be pointed out here that policy evaluation and policy enforcement were logically separate in access filter 203, even though both were contained in the same device. When FIG. 20 is looked at in terms of FIG. 26, it is apparent that GUI 1915, launch, log, alert reports 2027, databases shared directory 2028, ISDB manager 2027, PCS 2025, and MMFs 2301 implement a policy server 2617, while the remaining components implement a policy enforcer 2609 that operates at the IP filter and Internet protocol levels.

Generalization of Policy: FIG. 28

In access filter 203, an administrator with the proper access could define new users and user groups, could define new resources and information sets, and could add services and servers. An administrator could not define actions other than access to information. Further, the ways in which one could define new user groups were fixed and resources were limited to sources of information. In the generalized policy server of the preferred embodiment, these limitations have been removed. It is now possible for administrators define new actions, new ways of defining user groups, and resources that are not information sets. Of course, the right to make such definitions is itself determined by policies in policy database 2619, as explained with regard to administrative policies and policy maker policies in access filter 203. In most systems, definitions of types of entities, types of resources, and types of actions would be restricted to those people who belonged to the user group Security Officer.

These new possibilities are illustrated in generalized policy syntax 2801 for policy statements shown in FIG. 28. Generalized policy syntax 2801 describes how policies will appear to administrators in the windows from which the policies may be manipulated. In FIG. 28, the items in italics are the components of the policy statements that may be defined by an administrator of policy server 2617 who has the necessary access to policy database 2619. The items in square braces are the words which relate the items in italics to define a policy. For example, Employees are allowed to Access the HR Web Site where Employees is a user group, Access is an action, and HR Web Site is an information set and the policy statement permits any user who belongs to the user group Employees to access any resource that belongs to the information set HR Web Site.

Continuing in more detail with generalized policy syntax 2801, Entity represents a user group whose members are defined by one of the techniques employed in access filter 203 or by a technique defined by an administrator of policy server 2617; The only requirement for the entity is that it be recognizable by policy enforcer 2609. Action represents an action which may simply be access as in access filter 203 or an action defined by an administrator of policy server 2617; the only requirement for the action is that policy enforcer 2609 be able to cause the action to be performed on a resource. Resource represents an information set. In the generalized policy server, however, an information set may be a set of devices such as a printers or file servers. The only requirement for a resource is that policy enforcer 2609 be able to cause the action to be performed on the resource.

TimeIntervals 2809 permits the administrator to define a temporal restriction on the policy that is being specified using generalized policy syntax 2801. When policies are being evaluated to determine whether a given user has access to a given resource, a policy that has a time interval is considered only if the time of evaluation is within the time interval. For example:

Employees are allowed to Access the HR Web Site from 9:00 am-5:00 pm weekdays which limits access by employees to the HR Web Site to normal business hours. In a preferred embodiment, a TimeInterval may be defined as follows:
ranges of starting to ending times of day,
ranges of starting and ending dates,
restriction on days of the week and holidays: options to include or exclude specific days of week, and/or dates that are listed as holidays,
restriction on weeks of month, allowing specification of every week, every X weeks (where X is a number from 2 to 12) with a starting reference date, or a list of week numbers within each applicable month,
list of applicable months of the year ActionAttribute(s) 2811 are administrator-defined definitions of the manner in which the action permitted by the policy statement may be carried out. Again, the only requirement is that policy enforcer 2609 be able to carry out the action as specified by the action attribute. For example:

Marketing is allowed to print to the Marketing Printer with type=color

This policy contains the action attribute type=color, and the policy permits users belonging to the user group Marketing to do color printing using the resource Marketing Printer.
Additional examples of action attributes are:
class of service required for the network connection;
route or media type to be used; billing rate to be applied;
maximum quantity for this transaction;
maximum time allowed to complete the transaction.

As indicated by the syntax [with|when], time intervals can be used with action attributes as well as with entire policy statements. For instance, a policy that places a time limitation on a class of service looks like this:

Everyone is allowed to access the World Wide Web with bandwidth=90% when weekends This permits entities in the user group everyone to access the Web with bandwidth=90% weekends. When a time interval has been applied to an action attribute, the action specified in the policy is performed as specified in the action attribute only if the request to perform the action is made within the time interval that is applied to the action attribute.

Figure 29:
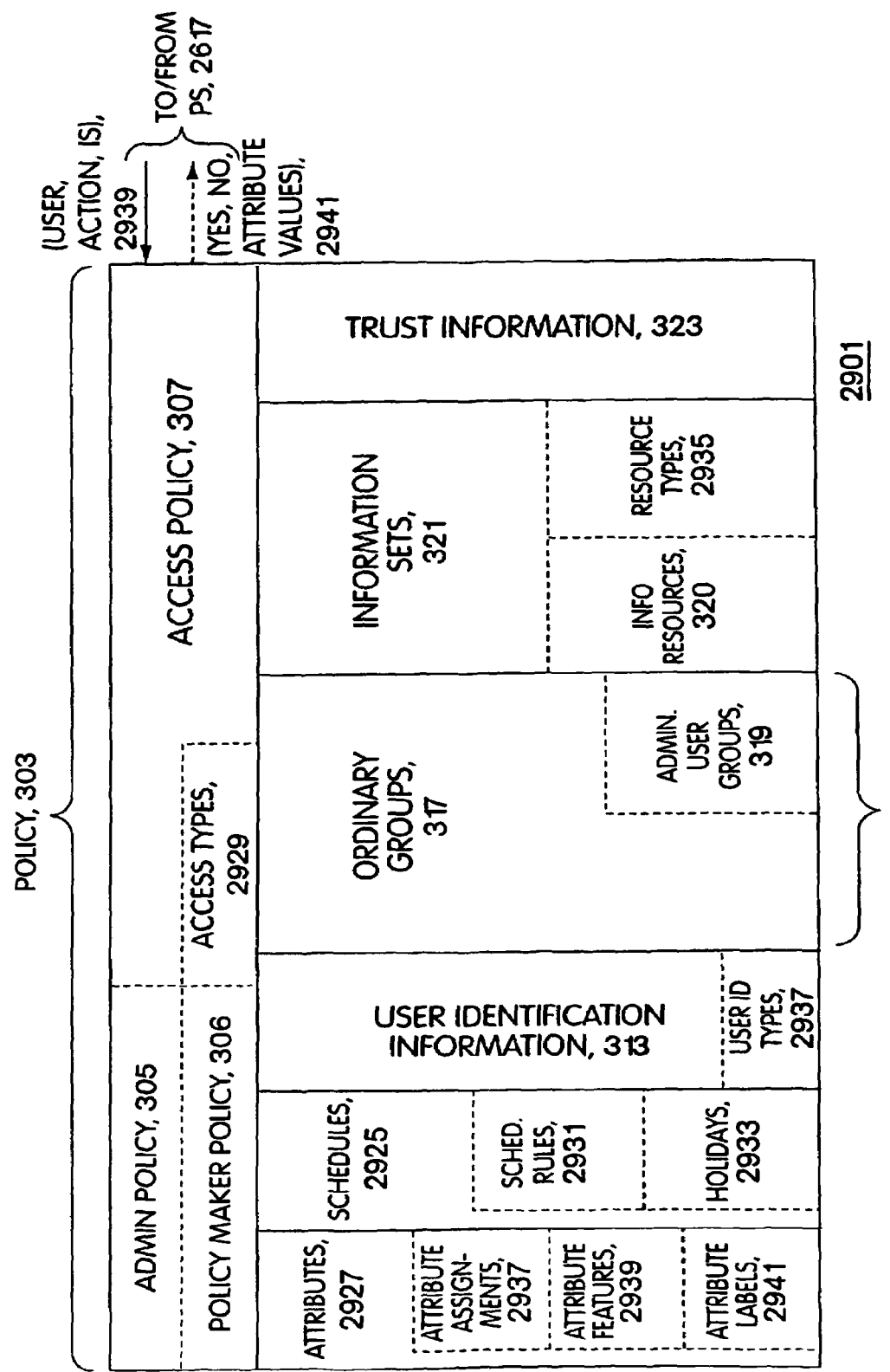
FIG. 29 shows an overview of policy database 2901 in a preferred embodiment.
Figure 30:
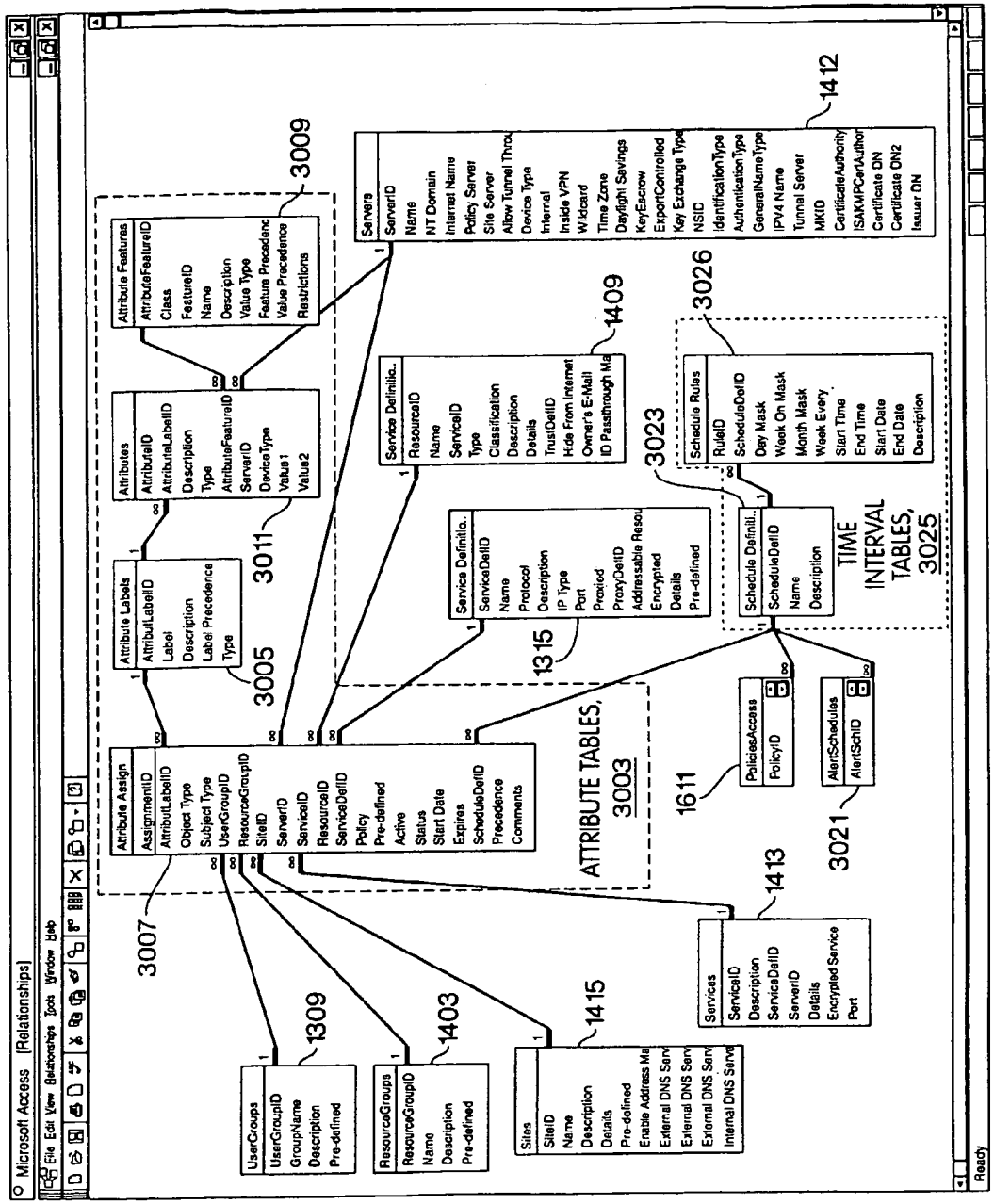
FIG. 30 shows an implementation of attributes and time intervals in policy database 2901.

Implementation of Generalized Policies: FIGS. 29 and 30

FIG. 29 shows policy database 2901. Policy database 2901 is a modification of policy database 301 to accommodate the generalized policies defined by syntax 2801 and to work in an environment where policy evaluation and policy enforcement have been separated. Thus, in FIG. 29, policy query 2939 comes from policy server 2617 instead of access filter 203 and includes a specifier of the action to be performed as well as a specification of the information source or other resource upon which the action is to be performed. The results 2941 of the query are returned to policy server 2617. In addition to an indication of whether the policies permit the action, the results now include the values of attributes relevant to the action. The elements of FIG. 3 whose functions remain unchanged in FIG. 29 have the reference numbers that they had in FIG. 3. Beginning with access policy 307, the first additional item of information is access types definitions 2929, which define additional classes of actions for which policies may be defined in access policy 307. Next, there is attribute information 2927, which defines attributes that may be attached to entities involved in carrying out a policy. Included within attribute information 2937 are the following kinds of information:

attribute assignments 2937, which specifies what user groups, information sets, sites, or services an attribute is to be employed with.
attribute labels 2941, which define the names the attributes are known by in the user interface; and
attribute features 2939, which actually define how the attribute affects the user groups, etc. that it is assigned to.

Schedules information 2925 defines time intervals that may be attached to policies or to attributes. Within schedules information 2925, schedule rules 2931 actually define the time intervals; holidays 2933 is a table of holidays used in schedule rules. Resource types 2935 defines the types of resources for which policies may be defined, and User ID types 2937 defines the types of identification required for entities for which policies may be defined.

In a preferred embodiment, database 2901 is implemented using Microsoft Corporation's well-known Microsoft® Access database software. Access is a relational database, that is, the information in the database is stored in tables. A utility in the Access software provides images of the tables and their relationships to each other. FIGS. 13-17 and FIG. 30 of the present application are derived from those images. In FIG. 30, tables which appear in FIGS. 13-17 have the reference numbers which they bear in those figures; new tables have reference numbers beginning with "30". Tables 3001 in FIG. 30 show how the tables used to define time intervals and attributes are integrated into policy database 2901. More generally, they show how a policy may be modified by the addition of further elements and how new types of elements may be defined for policies.

Detailed Implementation of Time Intervals

Beginning with the time intervals, these are defined in time interval tables 3025. The tables include a schedule definition table 3023 which defines the names that may appear in TimeInterval(s) 2809 in generalized policy syntax 2801 and a schedule rules table 3025 which defines scheduling rules that can be associated with the names defined in ScheduleDefinition table 3023. More than one scheduling rule may be associated with a given name. ScheduleDefID relates each scheduling rule defined in table 3025 to the schedules that use the rule in table 3023; the fields Day Mask through End Date define the scheduling rule. The field Description gives a description of the rule and its purpose.

As mentioned above, time intervals may be defined for entire policies and for attributes in policies. Thus, each policy defined in PoliciesAccess table 1611 now includes a SchedulDefID field. Each such field contains an identifier ScheduleDefID for a definition in table 3023 of a time interval that is to be applied to the policy. Thus, when policy server 2617 is determining whether a policy is applicable to an action request, it can locate the time interval applying to a policy via the ScheduleDefID field for the time interval in the entry in table 1611 for the policy. Similarly, AttributeAssignment table 3007, which relates attributes to user groups, resource sets, sites, or services, includes a ScheduleDefID field for any time interval applicable to that particular assignment of the attribute. The mechanism for defining time intervals, finally, is also used in a preferred embodiment for scheduling alerts, and thus entries in table 3023 are also locatable from AlertSchedules table 3021.

Detailed Implementation of Attributes

The tables used to define attributes and relate them to the user groups, resource groups, sites, and services that they may be applied to are shown in attribute tables 3003 in FIG. 30. A given attribute is defined by entries in the tables AttributeLabels 3005, Attributes 3011, and AttributeFeatures 3009. AttributeLabels table 3005 defines the labels used for the attributes in ActionAttribute(s) in policy definition syntax 2801. There is an entry for each such label, the entry including the label itself, a description of the attribute, the precedence of the label, and the type of the attribute. The precedence of the label defines which attributes will apply when more than one is connected with the policy evaluation. When one assignment has a higher precedence than the other, the one with the lower precedence is ignored. Each attribute label entry is identified by an AttributeLabelID.

Each entry in the table Attributes 3011 gives a current definition of an attribute. The definition may have one or more AttributeLabelID fields identifying entries in AttributeLabels table 3005. The label defined by that entry in AtrributeLabels represents the attribute defined by the entry in Attributes 3011. The current meaning of the attribute is defined by the fields in table 3011. Included are a description of the attribute, its type, the ID of the server it applies to, and the device type on the server. The fields AttributeFeatureID and Value1 and Value2 are of particular interest. There must be at least one AttributeFeatureID field. The field identifies an entry in AttributeFeatures table 3009 which defines kinds and ranges of values used in the attribute. Value1 and Value2 define either a current single value (Value1) or a current range of values (both Value1 and Value2) selected from the kinds and ranges of values defined for the attribute in AttributeFeatures table 3009.

As will be apparent from the foregoing, AttributeFeatures table 3009 can be used to define new kinds of attributes. Each entry in table 3009 includes the identifier AttributeFeatureID used to locate the entry and fields as follows:

Class, the name of the class to which the attribute belongs (for example, quality of service, billing rates, or maximum quantity for a transaction);

FeatureID, a number that uniquely defines the feature within its class;

Name, the name by which users know the feature;

Description, a description of the feature

Value Type, a definition of the type(s) of values that define the attribute (for example, whether a single value or a pair is necessary, and data type information;

Feature Precedence, an indication of the order in which features will be applied in evaluating an attribute;

Value Precedence, an indication of whether the highest or lowest value of a range is to be selected; and Restrictions, an indication of restrictions on the values.

To define a new class of attributes, an administrator who is permitted by the policies of policy server 2617 to do so simply defines features for the new class in AttributeFeatures table 3009 and then begins defining attributes that use those features. A feature may be anything that is meaningful for the policy enforcer 2609 which will be enforcing the policy. It should be noted here that the general techniques described above for defining new kinds of attributes may be employed elsewhere in policy database 2901 to define new actions, new ways of identifying users, and new types of resources.

Once an attribute has been defined by information in tables 3005, 3011, and 3009, it is related to an entity to which the attribute may apply. This entity is termed the attribute's subject. AssignrmentID table 3007 specifies these relationships. Each entry in table 3007 relates the attribute specified in its AttributeLabelID to a single subject; additionally, it may relate the attribute to a user group whose members may perform an action involving the subject. If the entry does not specify a user group, the attribute applies to any use of the subject; otherwise it applies only when the specified user group uses the subject. The subjects may be user groups, sets of resources, sites, or services as specified by the values of the fields UserGroupID, ResourceGroupID, SiteID, and ServerID. Further fields in table 3007 indicate whether the attributes are active (i.e., to be currently applied), when application should start, when it expires, and if the attribute involves a time interval, a ScheduleDefID value for the time interval. The Precedence field indicates the precedence that the attribute will have among the attributes assigned to a given entity.

In deciding which attributes to apply in making a policy decision, policy server 2617 proceeds as follows: When policy evaluation is complete, the attribute assignments in table 3007 are searched for links to any of the user groups, resource groups, sites, or services connected with the policy evaluation. If the entity performing the action belongs to a user group for which the attribute applies, the links from the attribute assignments 3007 are followed to the attribute labels in table 3005 and in turn to the attributes in table 3011 and finally to the attribute features in table 3009. Each of these linked tables (except for 3011) contains precedence information, which is used to determine which attributes in table 3011 of those discovered by following all the links will actually apply to the evaluation.

These precedences are considered separately for attributes of each class as defined by the attribute features in table 3009. Within each class, first the precedences in the attribute assignments in table 3007 are considered. Only those assignments with the highest precedence value are considered further, though all assignments sharing the same precedence are considered. Next, the label precedences in the attribute labels in table 3005 of the remaining linked attributes are considered. Only those labels with the highest precedence value are considered further, though all labels sharing the same label precedence are considered. Next, the feature precedences in the entries in AttributeFeatures table 3009 of the remaining linked attributes are considered. Only those attributes sharing the highest feature precedence are retained. Finally, for each attribute in table 3011 that is linked to the same entry in AttributeFeatures table 3009, the value precedence in AttributeFeatures table 3009 is used to determine which attribute from table 3011 to use, by indicating whether the highest or lowest value is to be selected.

At this point, at most one attribute defined in table 3011 for each of the relevant attribute feature entries in table 3009 will remain, and the values and features in these entries will be returned for use in evaluating the policy. In some cases, the request may indicate what attribute values are desired and the request may be refused if they do not match those specified in the policy; in others, the attribute values will be provided to policy enforcer 2609 for use in performing the action.

Optimizing Attribute Tables 3003 and Time Interval Tables 3025

As described in the discussion of access filter 203 above and illustrated in FIGS. 21 and 23, policy server 2617 in a preferred embodiment optimizes policy database 2901 by generating MMF files 2303 from it. In the preferred embodiment, two new MMF files have been added to optimize the information in tables 3003 and 3025. The two new MMF files are the following:

DBPropertiesFile: Contains all "properties"—attributes and schedules—that can apply to other objects. This index is indexed by PropertyID in those other objects.

DBPropertiesMetaDataFile: All properties have a name. This file is indexed by property type name (with one entry in the index for each property name contained in DBProperties File) and maps the names to a list of PropertyID's to enable them to be quickly looked up in DBPropertiesFile.

Figure 31:
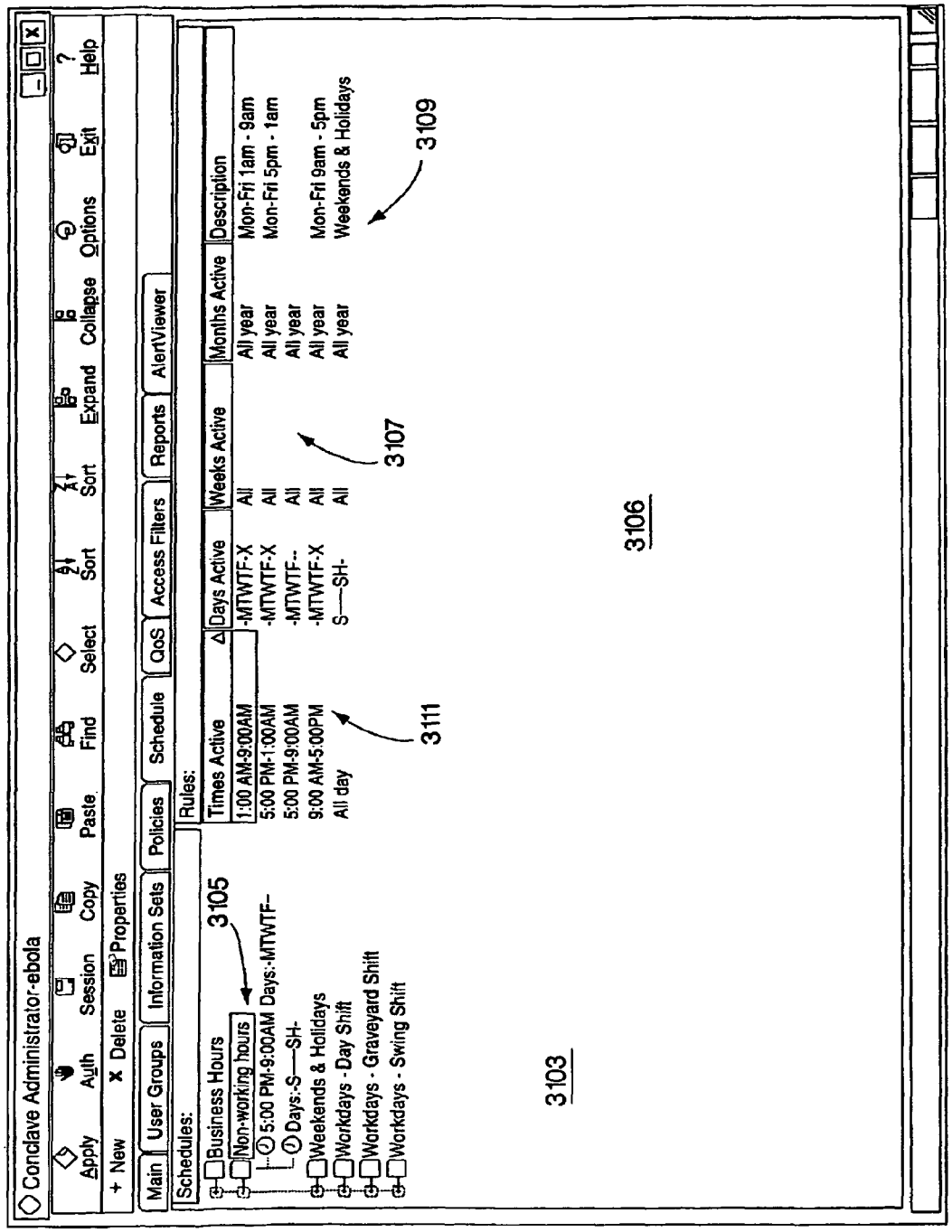
FIG. 31 shows a window that lists all defined schedules.
Figure 33:
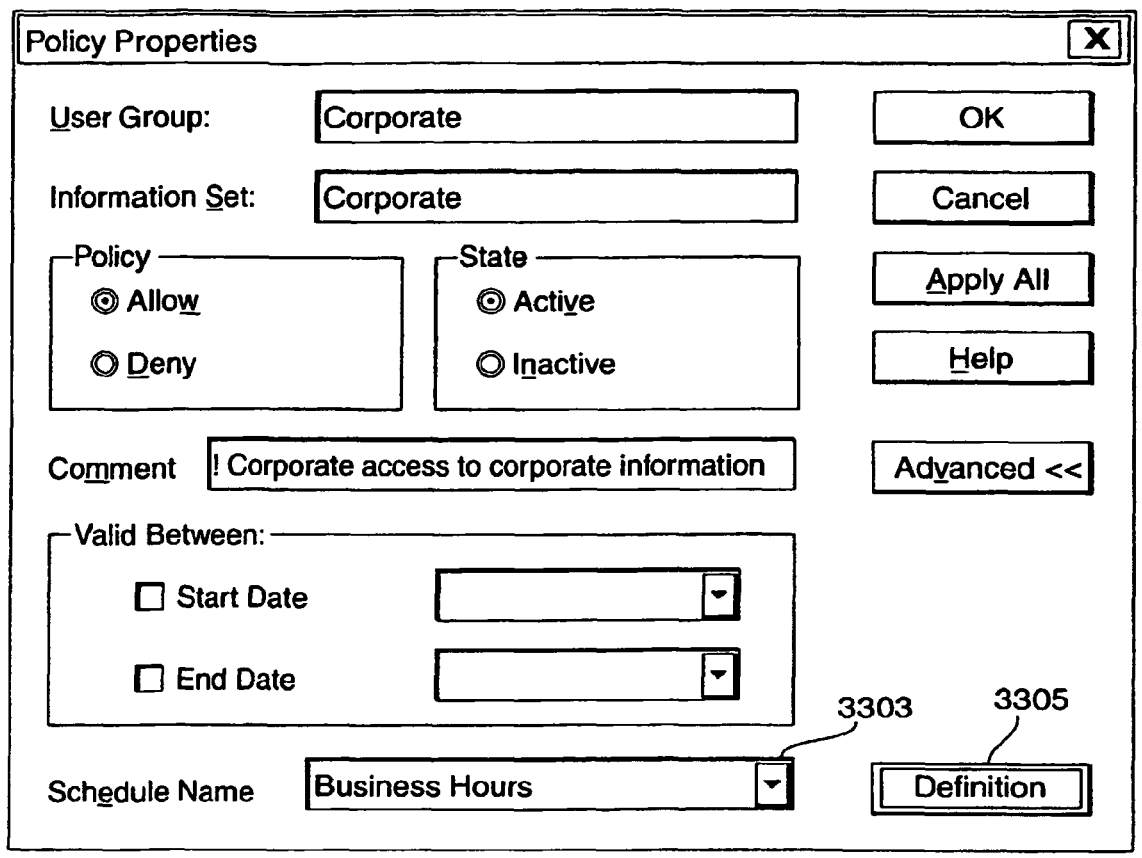
FIG. 33 shows a window used in a preferred embodiment to apply an interval of time to a policy.

User Interface for Time Intervals: FIGS. 31-33

FIGS. 31-33 show the window employed in the graphical user interface used in a preferred embodiment to see what time intervals (or schedules) have already been defined, to define a rule for a time interval, and to associate a time interval with a policy. Beginning with FIG. 31, that figure shows a window 3102 used to display the defined schedules. Subwindow 3103 lists all of the defined schedules by name; subwindow 3106 lists all of the defined rules by name. The displayed information comes from ScheduleDefinition table 3023 and ScheduleRules table 3025.

To see what rules a schedule name represents, the user selects the name in subwindow 3103, as shown at 3105, where Non-working Hours has been selected. This schedule has two component rules, one for days of the week, shown at 3107, and one for Saturdays, Sundays, and holidays, shown at 3109. When the schedule name is selected, the rule(s) belonging to it are highlighted in window 3106. Conversely, when a rule is selected, the schedule names for the schedules that use the rule are highlighted. Shown at 3111 in subwindow 3106 is the rule for business hours, another of the schedule names in subwindow 3103.

To make a new schedule, one clicks on New while subwindow 3103 is active and enters the new schedule name and then selects the new schedule name and highlights the rules belonging to it in subwindow 3102. To change the rules assigned to a schedule, one selects the schedule name and then selects different rules for the name in subwindow 3106. To make a new rule for an existing schedule, one selects the schedule's name and clicks on New, at which point the new rule can be made as described below. One can also click on New while in subwindow 3106, create the new rule, and then relate the new rule to a schedule name as described above. A rule can also be related to a schedule name by dragging the rule to the schedule name and dropping it on the schedule name.

The window used to make a new rule is shown at 3201 in FIG. 32. This is the window for modifying an existing rule or making a new rule. To modify an existing rule, one double clicks on it. Inputs in the window permit the user to define the interval of time which is being applied to the policy or attribute in terms of times of schedule validity (3203), days of the week for which the selected times are valid (3205), weeks for which it is valid (3207), and parts of the year for which it is valid (3209). As shown, window 3201 defines the schedule shown in FIG. 31 at 3111. That schedule is represented by Business Hours. The information shown in window 3201 is from ScheduleRules table 3025, and modifications made using window 3201 are applied to that table.

FIG. 33 shows the window used to add a time interval to the definition of a policy. Window 3301 restricts access by users belonging to the user group Corporate to the information set Corporate to the schedule indicated at 3303 to be Business Hours. When the user clicks on box 3303, the entire list of defined schedules is shown, and the user may select one or add a new name. When the user clicks on Definition button 3305, window 3201 for the selected policy is displayed. If a new name is being added, the user fills in window 3201 as required for the new schedule. In terms of FIG. 30, selection of a schedule in FIG. 33 causes a field ScheduleDefID in PoliciesAccess table 1611 to be filled in with the identifier for the entry in ScheduleDefinition table 3023 which contains the schedule's name in its Name field. If the schedule name is new, a new entry is added to table 3023 for the new name. If a rule is added or modified, then ScheduleRules table 3025 is modified as well.

User Interface for Attributes: FIGS. 34-37

Figure 34:
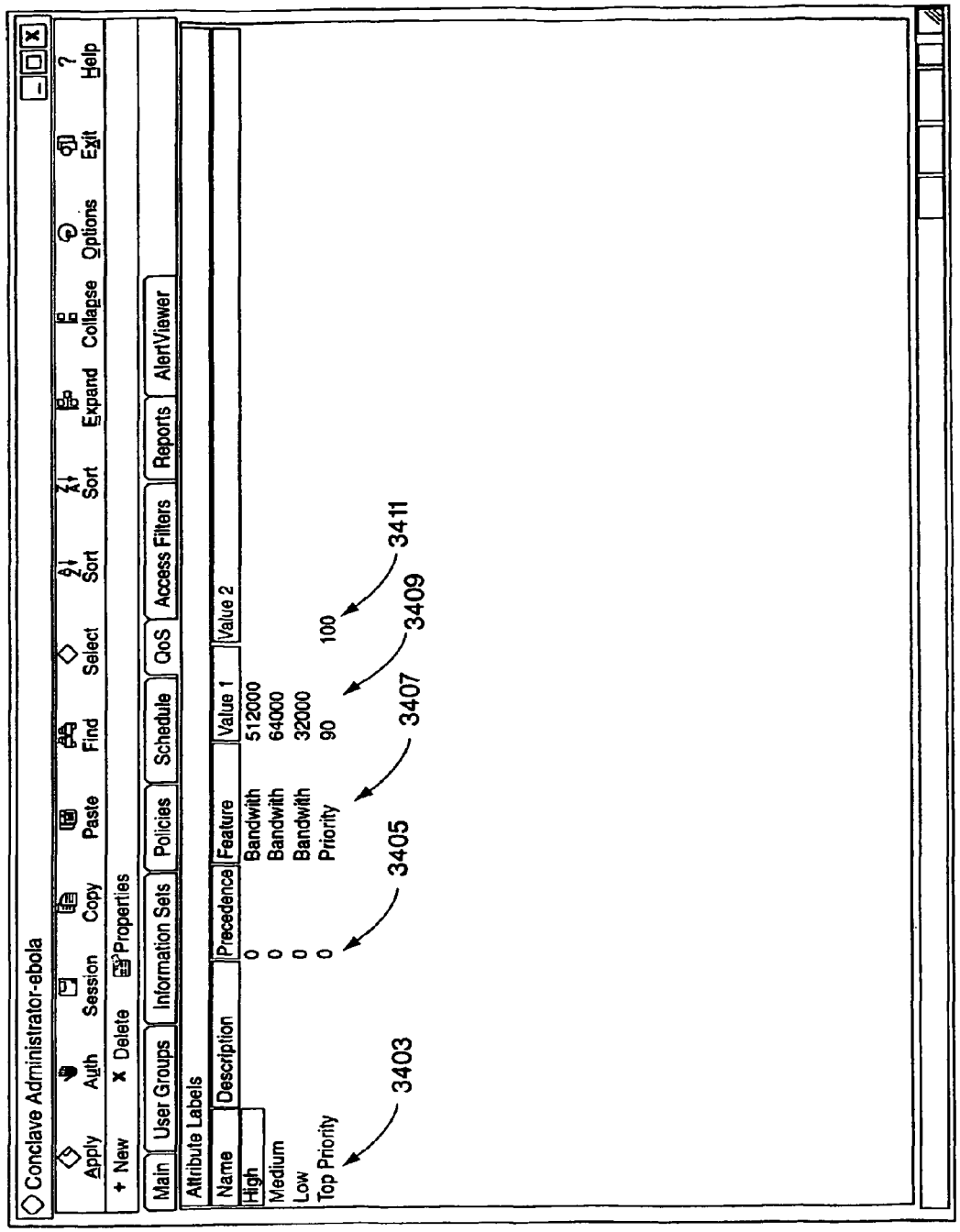
FIG. 34 shows a window used in a preferred embodiment to display attributes.

The user interface for attribute definition and assignment is similar. FIG. 34 shows a window 3401 which lists the presently-defined attributes of the quality of service (QoS) type. These attributes determine how much bandwidth will be available to an access being made according to a given policy. At 3401 are listed the attribute labels or names. here, four QoS attributes are defined, three for bandwidth amounts (High, Medium, Low), and one (Top Priority) for priority in case of conflicts. All of these attributes have a precedence of 0, as shown at 3405. The bandwidth attributes are all defined by the Bandwidth feature, as shown at 3407. Value1 for each attribute is defined at 3409. Only Top Priority has a Value2. As specified in window 3401, the QoS attribute High receives a maximum bandwidth of 512000, Medium a maximum bandwidth of 64000, and Low a maximum bandwidth of 32000. With Top Priority, the priority specified for the attribute must lie between the values specified for Value1 and Value2. The information in window 3401 comes of course from tables 3005, 3011, and 3009.

Figure 35:
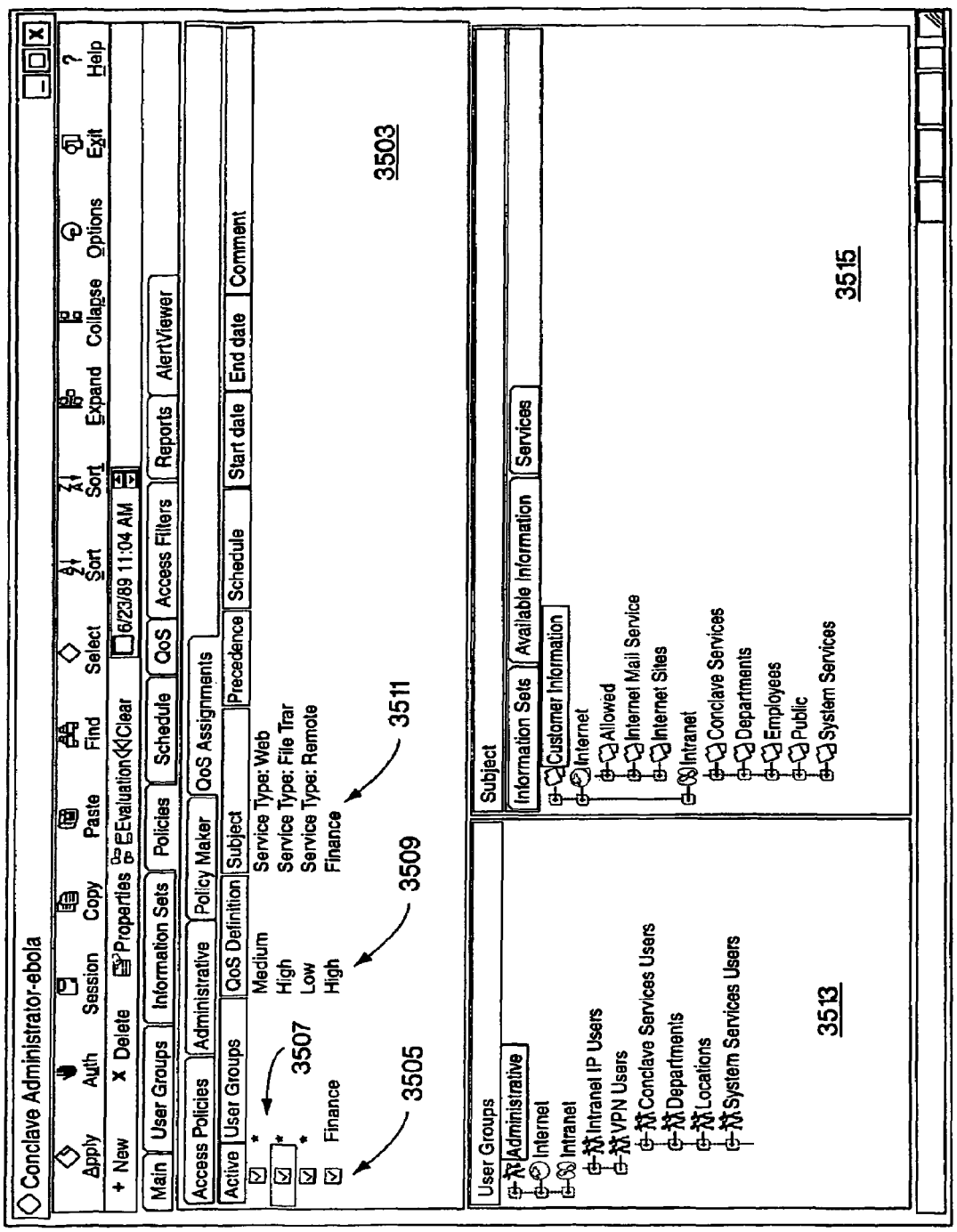
FIG. 35 shows a window used in a preferred embodiment to assign attributes to subjects.

FIG. 35 shows window 3501 used to assign a QoS attribute to a user group, information set, site, or service. In subwindow 3503 is shown how the QoS bandwidth attributes Medium, High, and Low (3509) have been assigned to the subjects World Wide Web service, file transfer service, and remote access service respectively (3511) for all user groups (3507) and how the QoS priority attribute High has been assigned to the subject Finance user group. The different assignments reflect the fact that bandwidth is an attribute of a communications service, while priority is an attribute of a user of the communications service. Thus, within the bandwidth available for the Web service, members of the Finance user group will have high priorities. As shown by this example, more than one action attribute may apply to a policy. Further assignments if attributes to subjects can be made by selecting user groups and subjects from subwindows 3513 and 3515 respectively. The selections made in this window are of course applied to table AttributeAssignments 3007. Window 3503 can further be used in the same general fashion as window 3102 to reach the windows used to define attribute labels and features.

Figure 36:
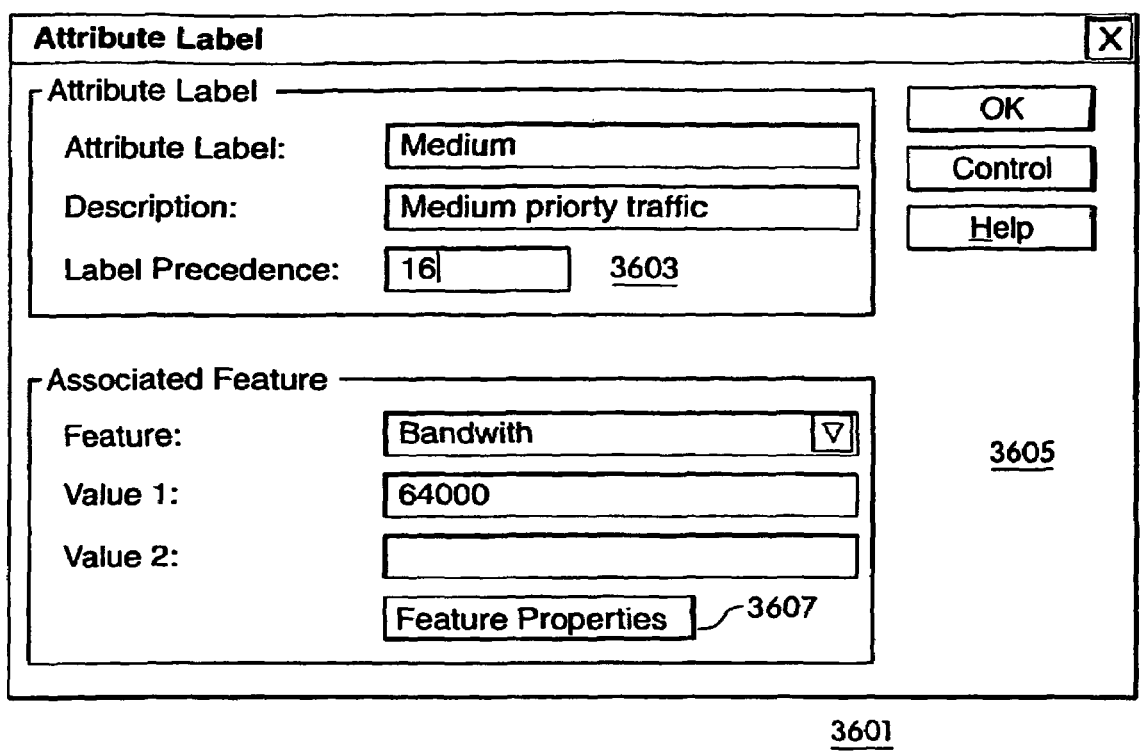
FIG. 36 shows a window that is used to display and modify the definition of an attribute in a preferred embodiment.

FIG. 36 shows the window 3601 used to read, modify, or make an entry in Attribute labels table 3011. Here, the entry being read is for the Medium QoS bandwidth attribute. At 3603 are shown the values of the entry's Label, Description, and Label Precedence fields. An administrator with the proper access rights can of course change the values of these fields via window 3601. At 3605 is shown information from the entry in Attributes table 3011 for the attribute associated with the label. There is shown the current value of Value1 in the entry and the name of the feature. The feature name of course comes from AttributeFeatures table 3009 for the attribute. Again, these values may be edited via window 3601. Button 3607 is used to view a window that shows the complete contents of the feature's entry in AttributeFeatures table 3009.

Figure 37:
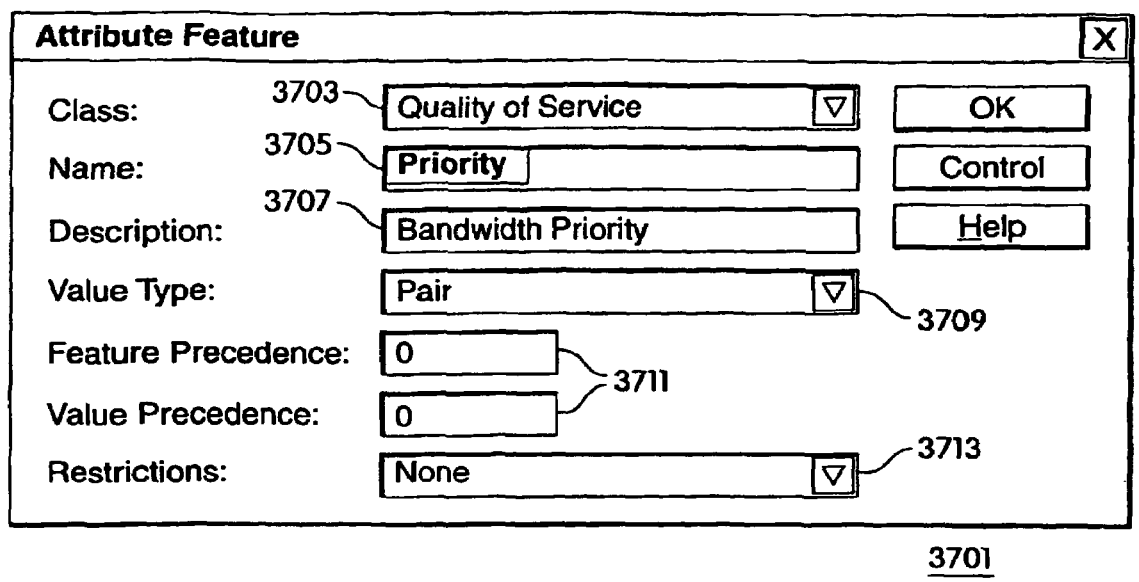
FIG. 37 shows a window that is used to display and modify the definition of a feature in a preferred embodiment.

FIG. 37 shows that window. Window 3701 is the window used to define new features for a given class of attributes and new classes of attributes. The window of course works on the values of an entry in AttributeFeature table 3009. Box 3703 is a list of the classes of attributes; new classes may be defined by adding to the list. Box 3705 is the name of the current feature; between them, the class and the name, corresponding to the fields Class and Name in the entries in table 3009, uniquely identify an entry. In this case, the entry is for the QoS Priority attribute. Description box 3707 contains the value of Description in the entry being examined. 3709 indicates which value type the feature has, here a pair of values, as indicated in FIG. 34. At 3711 are shown the current settings of the fields Feature Precedence and Value Precedence, and at 3713, any restrictions will appear.

Improvements to the Generalized Policy Server

The following discussion will begin with the protocol employed in a preferred embodiment to transfer information between a policy-enabled component and the generalized policy server and will then deal with the techniques used in a preferred embodiment of the access control system to permit administrators of the access control system to define their own methods for gathering information about a user and simply providing the information to the policy-enabled component or using the information to authenticate the user or to determine membership of the user in a user group.

Treating Access Requests as Database Queries: FIGS. 38-40, 54

Figure 38:
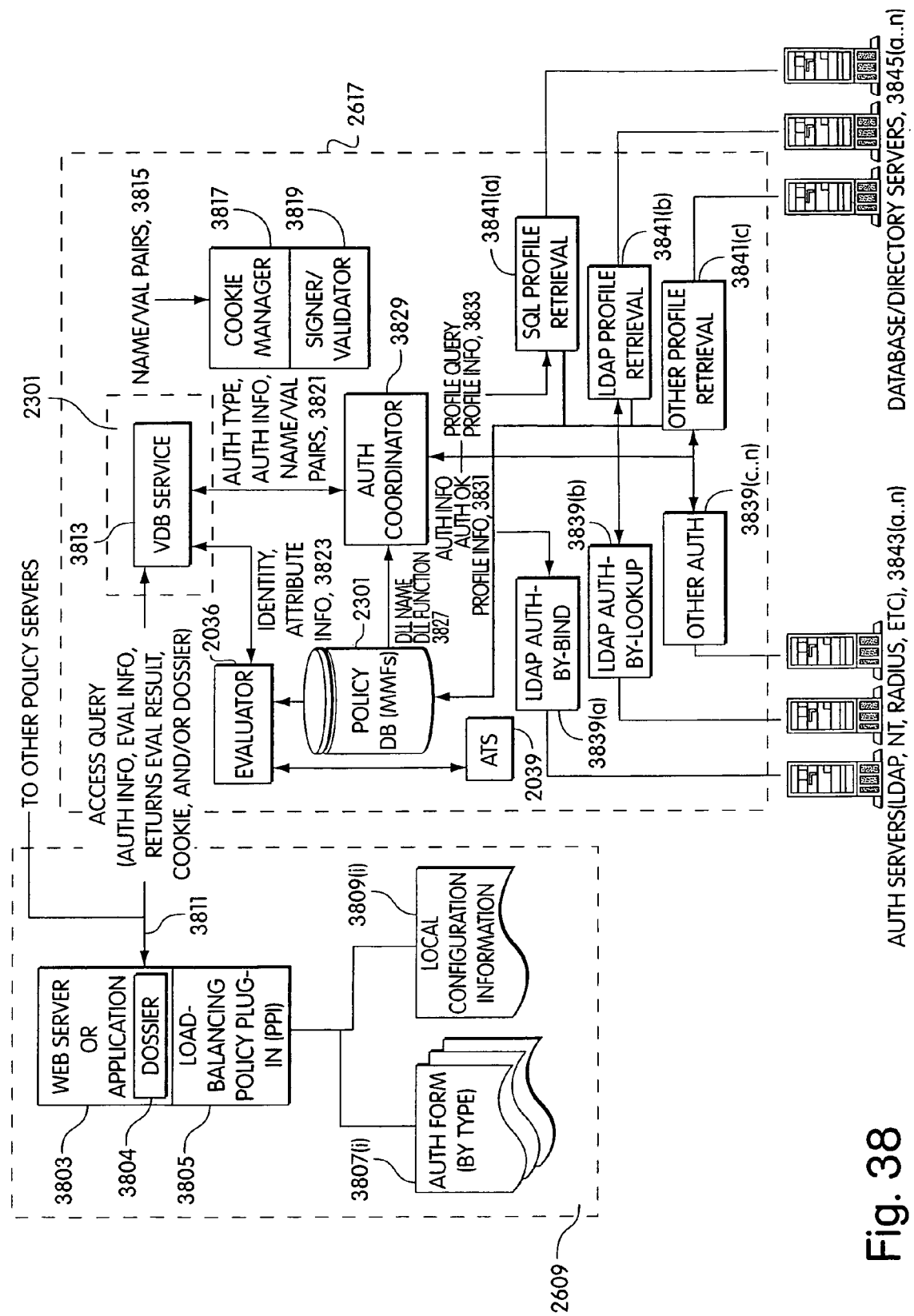
FIG. 38 is a block diagram of a general policy server that incorporates the improved message protocol and the technique for obtaining information from sources other than the UIC and the access control database.

FIG. 38 is a block diagram of a system that incorporates the improvements to the generalized policy server disclosed herein. In FIG. 38, components of the access control system that were disclosed in the parent or grandparent of the present application have the reference numbers they had in the figures for the parent and grandparent. The improved protocol 3811 transfers information between a policy-enabled component 2609 and a generalized policy server 2617. In most cases, the protocol will be carried on a network that connects component 2609 and server 2617.

In the improved protocol, the access request from policy enabled component 2609 takes the form of a standard SQL query. The response to the query from generalized policy server 2617 depends of course on the contents of the query; at a minimum, the query result indicates whether the access request is allowed or denied. Within generalized policy server 2617, the queries are interpreted by a new proxy in proxies 2031, namely virtual database (VDB) service 3813. VDB service 3813 emulates an SQL database server; in the preferred embodiment, it emulates either an SQL server that uses the well-known TDS protocol or an Oracle® database server that uses the well-known TNS protocol. Of course, in other embodiments, VDB service 3813 could emulate any mechanism that receives an input and selects a rowset in response to the input.

As previously explained, a proxy is software in general policy server 2617 that intercepts traffic for a particular protocol. The proxy 'understands' the protocol that it is intercepting and can obtain the information required to identify the resources being accessed and/or to authenticate the user from the messages that are being exchanged during the session. The proxy provides the information it has obtained from the session to evaluator 2036 to decide whether the user has access to the information resource. Evaluator 2036 uses the compiled MMF version 2301 of the policy DB to make the determination. In the case of VDB service 3813, VDB service 3813 does not intercept traffic, but simply receives messages in the protocols used by the database systems which VDB service 3813 emulates, interprets a query contained in a message to obtain the information required to obtain a result, and then returns a message containing at least the result to policy-enabled component 2609.

Figure 54:
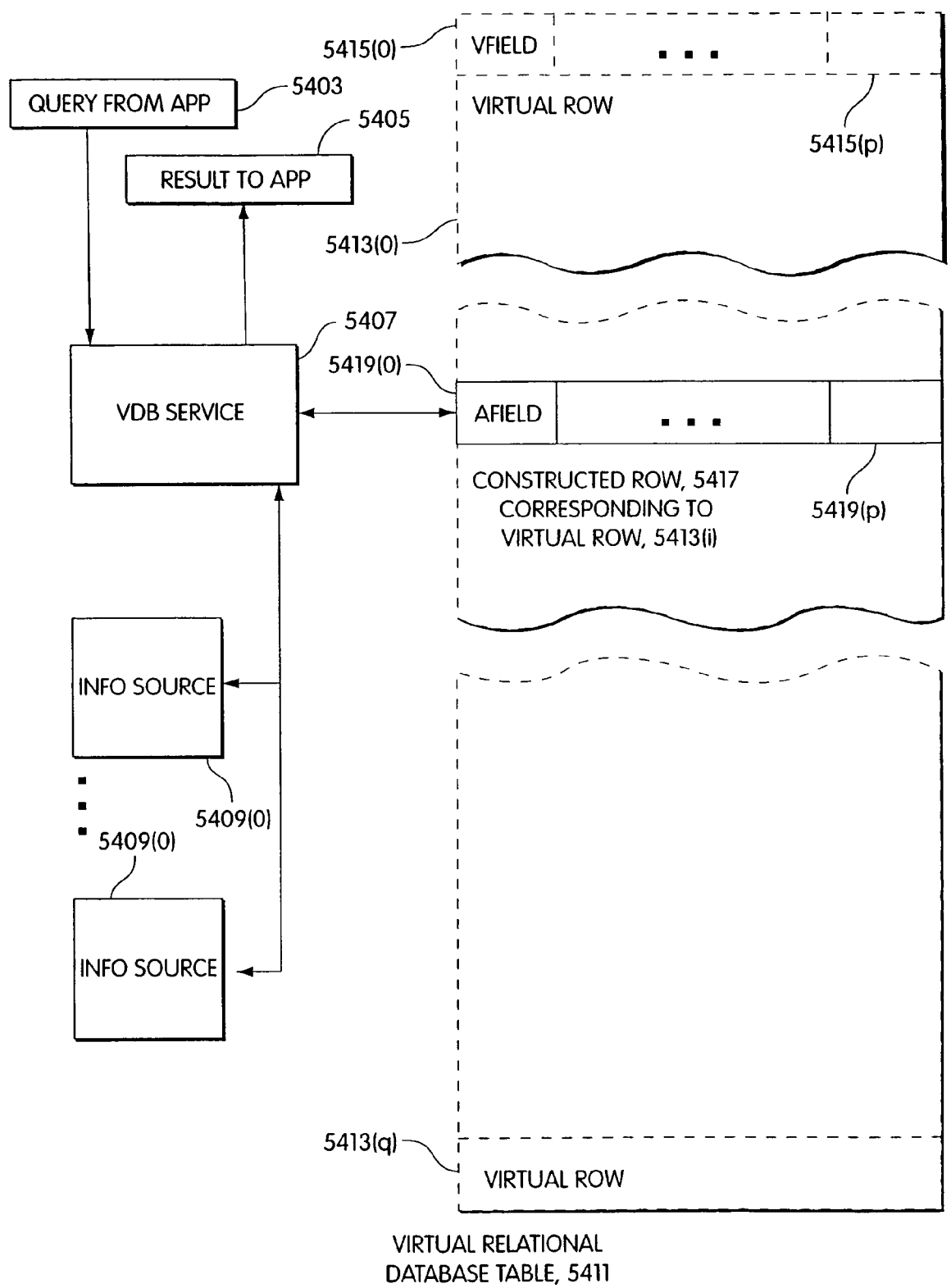
FIG. 54 is a conceptual overview of the virtual database table created in the generalized policy server.

The Virtual Database—FIG. 54

Because VDB service 3813 emulates a relational database protocol, the information which is being queried appears to be organized into a table which has a row for each potential user/potential resource combination for the resources controlled by policy-enabled component 2609 and columns that define fields in the rows. Each field in a row contains the row's value for the column to which the field belongs. Queries on relational databases are often written using the SQL language. An SQL query on a relational database table has the general form:

SELECT <field name list>from <relation database table name>
WHERE <<<fieldname,value pair>,operator>list>

To take a simple example, if each row of a table AccountBalances has three fields, DepositorName, AccountID, and Balance, each of which contains what its name indicates, a query that obtains the account balance for the depositor "R. Date" and the account id "549362" looks like this:

SELECT Balance from AccountBalances
WHERE DepositorName='R.Date' AND
AccountID='549362'

The WHERE clause indicates the fields whose values will be used to select the records of interest in the table and how those values will be combined; the SELECT clause indicates which fields of the selected records will have their values returned by the query. Thus, in the above example, if there is a record in the table AccountBalances which has a DepositorName field with the value "R.Date" and an AccountID field with the value "549362", the query will return the value of the field AccountBalances.

VDB service 3813 is termed a virtual database service because the queries are made on a virtual relational table instead of a real one. The reason for this is that the queries dealt with by VDB service 3813 are made to find out whether the access policies in policy database 3825 will permit a user who is requesting access to an information resource to have access to the information resource. A real relational database table for such queries would have to have a row in the table for each <potential user, information resource> pair, since any of the potential users may request access. In most applications the real relational database table would not only be unacceptably large, it would be undefinable, since there would be no way of knowing who all the potential users were.

FIG. 54 shows virtual relational database system 5401 with VDB service 3813 and virtual relational database table 5411. Virtual relational database table 5411 does not really exist, but appears to exist to the applications that make queries on it. From the application's point of view application, virtual relational database table 5411 works exactly like a real relational database table 5411. Virtual relational database table 5411 appears to include some number of virtual rows 5413(0 . . . q), each of which has a number of fields 5415(0 . . . p). When a user makes a query on virtual table 5411, the query's WHERE clause determines which of the rows 5413 is selected and the SELECT clause determines which fields 5415 of the selected rows are returned.

Of course, the rows specified by the query and the returned fields are as virtual as table 5411. VDB service 3813 is able to respond to query 5403 even though table 5411 does not exist because it is able to use the information in the query's WHERE clause to locate and retrieve is the results specified in the SELECT clause in one or more information sources 5409. Having retrieved the results, VDB service 3813 builds a constructed row 5417 corresponding to virtual row 5413(*i*) selected by the query. Constructed row 5417 includes at least actual fields 5419 for the results that are to be returned for the query. Constructed rows 5417 are built for each query, and only as many are built for each query as are needed for the rows of the virtual table specified by the query. Information sources 5409 may include information sources local to VDB service 3813 or non-local information sources, and may even include other databases.

In the embodiment of virtual relational database system 5401 employed in generalized policy server 2617, policy-enabled component 2609 responds to a request by a user to access a resource by making a query to the virtual relational database table PolicyEval. The SELECT clause specifies at least a field which indicates whether the user has access to the resource. The WERE clause specifies information which permits generalized policy server 2617 to determine whether the user indeed has access. In a presently-preferred embodiment of policy server 2617, the information specified in the WHERE clause may come from policy-enabled component 2609, from evaluator 2036, and/or Authentication coordinator 3829. Authentication coordinator 3829 will be explained in more detail later. Depending on the query, various fields of the user's constructed row 5417 are returned to policy-enabled component 2609. Other embodiments of VDB service 3813 can of course use any mechanism which obtains and returns the information necessary to answer the query.

An interesting consequence of the fact that the information in the WHERE clause in virtual relational database system 5401 is applied to information sources 5409 instead of to values of fields in a relational database table is that a value in a WHERE clause may be compared with values obtained from an information source 5409(*i*) in ways that are not available in standard relational database systems. For example, a user may belong to a user group that has access to an information resource if the user's IP address is within a range of IP addresses; the information source may define the range of IP addresses directly, and when the WHERE clause is evaluated, VDB server 5407 simply determines whether the IP address in the WHERE clause is included in the range. The same technique can be used with pattern matching. For instance, a user may belong to a user group if the user's email address is a company email address. If the company's email addresses all have the form <any_string>@company.com, then VDB server need only determine when it evaluates the WHERE clause whether the user's email address matches the pattern *@company.com.

Queries in Policy-Enabled Component 2609

Continuing in more detail, there are two ways in a preferred embodiment in which the capability of making queries to VDB service 3813 can be included in a policy enabled component. One way is to add the necessary queries to VDB service 3813 to code executed by the policy-enabled component, for example Web application or server 3803. This works with any policy-enabled application and permits control of access of any entity that is manipulated by the policy-enabled component, as described in the parent of the present patent application. For example, the entity for which access is controlled may be a field in a document.

The other way is to make the queries from a policy plug-in. A policy plug-in is an addition to an application program which permits the application program to perform policy evaluations. For example, many Web applications have provisions for the use of policy plug-ins 3805. If a policy plug-in has been provided for the Web application, the server providing the Web pages to the browser invokes the plug-in when it receives the URL of the next Web page to be fetched from the browser. When the plug-in is executed, it determines whether the browser may access the Web page and the server provides the Web page to the browser only if the policy plug-in so indicates. Where access control is being done by generalized policy server 2617, the plug-in makes the queries to VDB service 3813 that are required to determine whether the browser may have access. As indicated in FIG. 38, policy plug-ins 3805 in a preferred embodiment of system 3801 may be load-balancing, i.e., they may have access to a number of different generalized policy servers 2617 and will address a given query 3811 to the one which is currently least-loaded. This is of course possible in generalized policy server 2617 because each of the generalized policy servers in the access control system has an identical policy database 3825 and because the generalized policy servers in the access control system are authenticated to each other, making it possible for one generalized policy server to trust information obtained from another generalized policy server.

A policy-enabled component needs no special software to make queries of VDB service 3813. All that is required is access to a utility program which turns a query into a message that is directed to VDB Service 3813 and that belongs to a protocol which can be interpreted by one of the database systems that VDB service 3813 emulates. Such utility programs are widely available. FIGS. 39 and 40 provide examples of how queries made to VDB service 3813 appear in programs executed by policy-enabled component such as a Web server or application 3803 or policy plug-in 3805. FIG. 39 shows high-level interface 3901. ConclavePolicyAllowed ( ) 3903 is a function that constructs the SQL query that is used to perform the access check, sends the query to VDB service 3813, and receives and returns the result. If the result is "Yes", indicating that access was allowed, high-level interface 3901 executes branch 3905; otherwise, it executes branch 3907. The contents of these branches depend of course on how the program for application 3803 or policy plug-in 3805 is to respond to allowance or denial of access.

FIG. 40 shows a preferred embodiment of ConclavePolicyAllowed( ) 3903. At 4003, variables are set which will give the policy-enabled entity 2609 access to a generalized policy server 2617. At 4005, the access is set to the default value "No", so that no access will be granted if VDB Service 3813 fails to respond. At 4007, the source and destination IP addresses for the access request, the destination port, and the URL of the resource being accessed are assigned to variables. At 4009, the SQL query is constructed. It uses the standard SQL form. The query selects the value of the field IsAllowed in a row of the relational table PolicyEval. PolicyEval appears to have a row for each potential user of the resource controlled by policy-enabled component 2609, with a row being selected by the values specified in the WHERE clauses and the IsAllowed field for the selected row indicating whether that user is permitted access. In fact, however, as pointed out above, PolicyEval is virtual, that is, the user's "row" is assembled in response to the access request. Here, the WHERE clauses are made using the variables set at 4007 and thus specify the user by means of a source IP address and the resource by means of a destination IP address, a destination port, and a resource name. As explained in the grandparent of the present application, evaluator 2036 can use this information to determine which user groups the user belongs to and which information sets the resource belongs to. Given this information, evaluator 2036 further determines from the access policies that apply to those user groups and information sets whether the user specified by the source IP address is to be permitted access to the resource specified by the destination IP address, destination port, and resource name.

If the user identification information isn't sufficient to specify a user group which gives the user access to the resource, the AskClientForIdentities WHERE clause indicates that evaluator 2036 may use ATS 2039 to obtain more user identification information from the user's UIC, as described in the parent of the present application.

At 4011, the object needed to make the connection to VDB service 3813 and the object needed to hold the query results are set up and the connection to VDB service 3813 is established using the variables set at 4003. At 4013, the query specified at 4009 is performed by VDB Service 3813 in the policy server specified at 4003. At 4015, if no errors occurred in making the query and the query had a non-empty result, then the result of the query (i.e., the value of IsAllowed) is in the first element of the record set. This value is returned by ConclavePolicyllowed. If the query failed, the value returned is the value assigned at 4005. At 4017, the connections to the record set and the policy server are closed and the objects involved in the connections set to null values.

Details of the PolicyEval Virtual Relational Database Table: FIGS. 41-43

FIG. 41 shows the schema of the PolicyEval table. The schema of a real database table is the definition of the table that is used by the database system. For PolicyEval, it is the definition used in policy-enabled component 2609 and VDB service 3813 to indicate how the values needed to do the policy evaluation are arranged in query 3811. FIG. 41 shows the fields that are available in a preferred embodiment for use in the SELECT and WHERE clauses of the queries provided to VDB server 3813. Some of the fields are used primarily in custom authentication and will be explained in more detail there. When a field is used in a SELECT clause, VDB Service 3813 sets the field's value, either using information received from evaluator 2036 or information received in the query. When a field is used in a WHERE clause, policy-enabled component 2609 sets the field's value. As will be seen from the following tables, some of the fields are SELECT only, while others are WHERE or SELECT. The query must provide values for some of the WHERE fields in order for a policy evaluation to occur; with others of the fields, default values are used when none are provided by the WHERE field.

SELECT ONLY

| Column | Data Type | Description |
|---|---|---|
| IsAllowed 4103 | VARCHAR(1) | Contains 'Y' or 'N' to show whether the user may access the requested resource, where Y: Yes and N: No. |
| PolicySet 4105 | INTEGER | The identifier of the current version of the policies used by the Policy Server to perform the evaluation. This is incremented each time an "Apply Changes" is performed and the MMF files are recompiled. This can be useful if the policy-enabled application is caching decisions and needs to refresh/reset the cache when the database changes. |
| HasExpireTime 4107 | VARCHAR(1) | Contains 'Y' or 'N', where Y: Yes and N: No, depending on whether ExpireTime has a valid value. Always ignore the ExpireTime value if this column contains 'N'. |
| ExpireTime 4109 | DATE | The date and time after which another evaluation should be done to verify that access is still permitted to the requested resource. |
| ExpireSeconds 4111 | LONG INTEGER | The number of seconds until the policy decision expires (per schedule constraints). Can be used instead of ExpireTime for more efficient implementations. |
| ReasonCode 4113 | INTEGER | Code for evaluation decision reason |
| Reason 4115 | VARCHAR(254) | Descriptive text for evaluation decision reason (for max performance, use ReasonCode only unless debugging) |
| EvalTimeStamp 4133 | DATE | The date and time at which the policy evaluator made the decision |
| AuthCode 4149 | VARCHAR(254) | Digital signature for use in verifying that the response was provided by a trusted Policy Server |
| MaybeList 4151 | VARCHAR(254) | Comma delimited list of authentication types that may be used to access the requested resource. Generally indicates to PPI or application what information needs to be collected from the user for authentication. |
| AttributeName 4153 | VARCHAR( ) | Can be used to get any number of attribute name/value pairs (one per row) instead of using cookie |
| Attribute Value 4157 | VARCHAR( ) | Can be used to get any number of attribute name/value pairs (one per row) instead of using cookie |
| IdentityNumber 4159 | INTEGER | When multiple identities exist, this is a sequence number |

-continued

SELECT ONLY

| Column | Data Type | Description |
| --- | --- | --- |
| IdentityType 4161 | VARCHAR( ) | The type of identity used to authorize the access |
| IdentityIsValid 4163 | VARCHAR(1) | Simple 'Y' or 'N' to determine whether the authentication succeeded (note that you can be denied access even if the authentication succeeds) |
| IdentityAuthStatus 4165 | INTEGER | Response code returned by authentication module |
| IdentityAuthStatusDesc 4167 | VARCHAR(254) | Descriptive text associated with code above |

WHERE OR SELECT

| Column | Data Type | Description |
| --- | --- | --- |
| Application 4137 | VARCHAR(254) | Name of application making query. Note that multiple servers/services can identify themselves as the same application. |
| SourceIP 4119 | VARCHAR(25) | IP Address in dotted notation. Used if policy is by IP address (network or application queries) |
| DestinationIP 4121 | VARCHAR(25) | IP Address in dotted notation. Only used for network resource queries (instead of Application). |
| Cookie | VARCHAR(254) | HTTP standard cookie including identity and attribute information. PS will verify signature and expiration. In SELECT, this is a request for a new cookie to be issued by the PS. In WHERE, this is a previously set cookie passed in by the application for use in the evaluation. |
| SourcePort 4123 | INTEGER | Defaults to zero if no port number is provided in the where clause. Only used for network queries |
| DestinationPort 4125 | INTEGER | Used in network queries where Application is not present. Defaults to 80 (HTTP) if no port number is provided in the where clause. |
| EncryptionAlg 4127 | INTEGER | Used in VPN queries. Defaults to 64 (3DES) if no algorithm is provided in the where clause. |
| AuthenticationAlg 4129 | INTEGER | Used in VPN queries. Defaults to 2 (DSS signatures) if no algorithm is provided in the where clause. |
| IPProtocol 4131 | INTEGER | Used in network queries. Defaults to 6 (TCP) if no protocol is provided in the where clause. |
| Resource 4135 | VARCHAR(254) | A string that identifies which resource being requested. |
| Identity 4117 | VARCHAR(255) | Actual string encoded value of the Identity (Select) or identity information collected from the user (WHERE) |
| IncludeQoS 4139 | VARCHAR(1) | Used by network/VPN devices. Is a QoS decision included in the evaluation? 'Y'es or 'N'o Defaults to 'N' (improves performance) |
| IncludeSchedules 4141 | VARCHAR(1) | Are schedules included in the evaluation? 'Y'es or 'N'o Defaults to 'N' (improves performance) |
| IncludeIdentityStore 4143 | VARCHAR(1) | Are identities cached in the users' identity store (generally provided by UIC) to be used in the evaluation? 'Y' or 'N' Defaults to 'Y' |
| AskClientForIdentities 4145 | VARCHAR(1) | Is the identity client (UIC) asked for identities? 'Y'es or 'N'o Defaults to 'N' |

Figure 44:
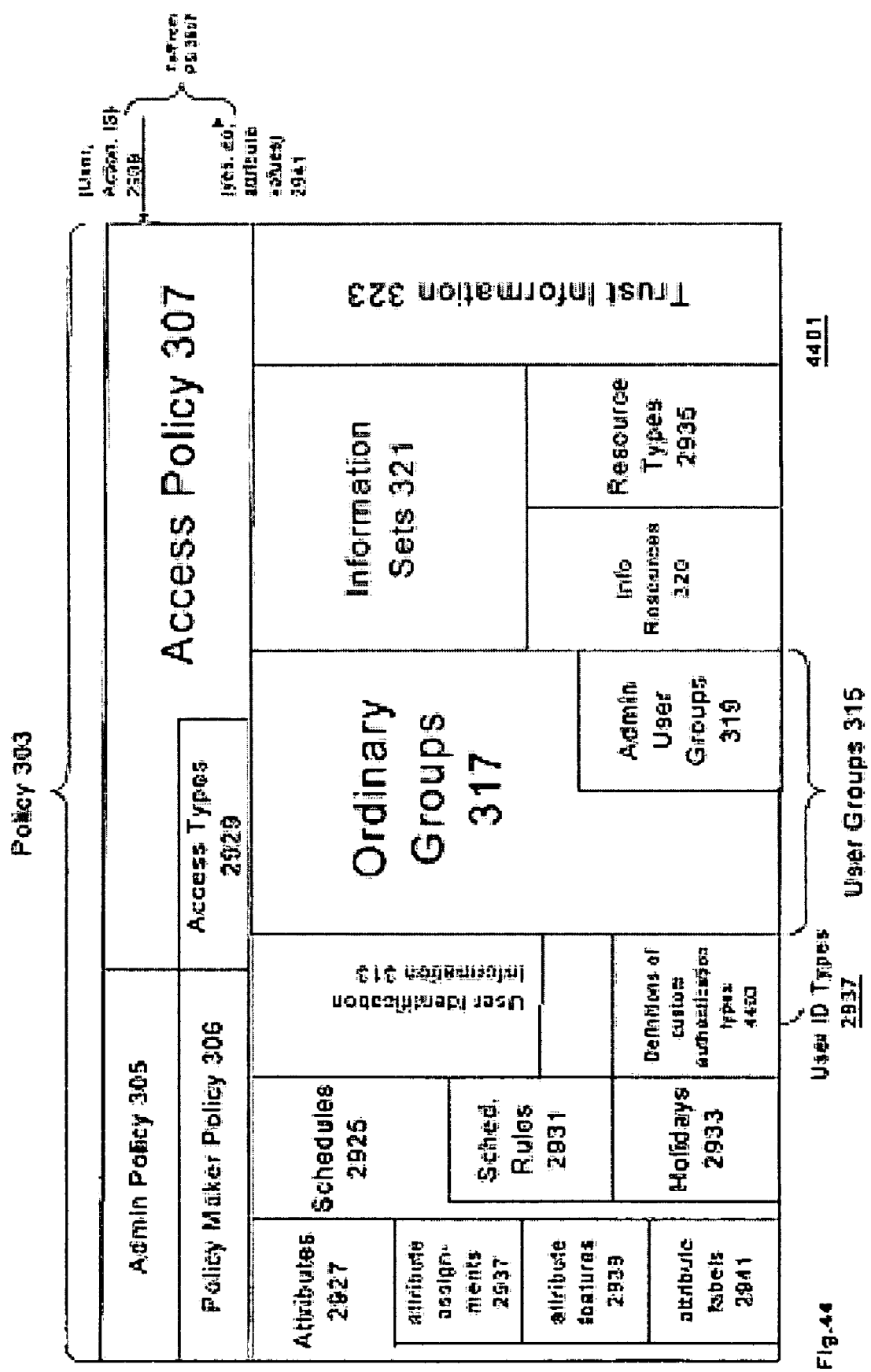
FIG. 44 is a detail of the contents of policy database 4401 from which policy DB 3825 is compiled.

FIGS. 42-44 show some examples of queries and their results. In FIG. 42, at 4201, query 4203 returns detailed information about the results of the policy evaluation by specifying the PolicySet, HasExpireTime, ExpireTime, and Reason fields in the SELECT statement in addition to IsAllowed. The results, at 4205, show that the policy is allowed, that the policy under which it was allowed belong to policy set 56, and that that policy has no expire time, which makes the value in ExpireTime meaningless. Since the access is allowed, there is no value in Reason.

At 4207 is seen a query 4209 that only returns the result of the policy evaluation and the reason, as shown at 4211. At 4213 is shown a query that selects all fields of the row, and thus the return value contains the values of all of those fields, with default values being supplied where the field has a default value and no value is supplied in the WHERE clause. Thus, the field IncludeQoS will have the default value "N". At 4215, finally, is shown a minimum query. The WHERE clauses contain only the minimum information needed to specify a user group and a resource set. All other field values take their default values. For example, the encryption algorithm used will be the default 3 DES algorithm.

FIG. 43 shows how queries can be used to obtain identification information about the user who is being allowed access. At 4301, a minimal set of WHERE clauses is used in query 4303, but the SELECT clauses include IdentType, IdentGroup, and IdentValue. As shown at 4305, access is allowed by three different identification values for the user. At 4307, query 4309 provides values in its WHERE clause for the IdentType and IdentValue fields, and the policy evaluation is done using those values, as shown by result 4311. At 4313, query 4315 specifies that the values to be used for user identification are to be obtained from a cache of user identities which is maintained in policy database 3825.

To see what the identity store contains for IdentType and IdentValue, the query includes those fields in the SELECT clause. Result 4317 shows the values for those fields that are contained in the identity store. 4319, finally, shows how a query 4321 can be used to specify that certain information in the identity store be excluded when the identification of the user is determined during the policy evaluation.

Overview of Custom User Information Retrieval: FIGS. 38 and 44

Before the access control system in which the present invention is implemented can grant a user access to an information resource, it must do two things:

authenticate the user, that is, determine that the user is the entity it claims to be; and make a user group membership determination, that is, determine whether the user's user group memberships are such that the access policies for the information resource permit the user to access to the information resource.

Both of these operations require information about the user. In the access control system described in the grandparent of the present patent application, both the kinds of information that could be used for authentication and user group membership determination and the sources of that information were predefined; in the access control system described in the parent of the present patent application, system administrators could define information to be used to determine user group membership, but the sources of that information were still predefined.

In the access control system of the present patent application, these limitations have been overcome by means of techniques for custom user information retrieval. These techniques permit administrators of the access control system in which the present invention is implemented to define how and from what sources information about the user is collected when an access request is made and how the information is used in connection with the access request. In a preferred embodiment, generalized policy server 2617 can use the collected information in any of three ways:

to authenticate a user;

to make user group membership determinations;

as part of a dossier, that is a list of information which generalized policy server 2617 provides to policy-enabled component 2609 from which the access request came when the access request is granted.

A given item of information that is obtained by custom user information retrieval may be used for one or more of the above purposes.

Some examples of how custom user information retrieval may be used are the following In many cases, users who make requests to access information resources have usernames and passwords on systems that are accessible to generalized policy server 2617; generalized policy server 2617 can authenticate a user by requesting a user's user name and password from the user, applying the user name and password to the system, and seeing whether the system responds as it should when the user name and password are known to the system.

A user who requests access may have information on a database external to but accessible by generalized policy server 2617 which is accessible to the access control system; generalized policy server 2617 can retrieve the information from the database and use it to determine user group membership.

Generalized policy server 2617 can provide any material retrieved from such a database system to policy-enabled component 2609 as part of a dossier.

How custom user information retrieval is done in a preferred embodiment is shown in overview in FIGS. 38 and 44. Beginning with FIG. 44, FIG. 44 shows policy database 4401 from which the MMFs of policy database 3825 are compiled. Components of policy database 4401 which were included in the policy databases used in the parent and grandparent of the present application have the reference numbers they were given in those applications. The new component of policy database 4401 is definitions 4403 of custom user information retrieval methods. Each custom user information retrieval method specifies a method used when a user requests access to an information resource of retrieving information about the user and using the information to authenticate the user, determine the user's membership in a user group, or as part of a dossier for the user. The specified method may include queries of databases or other sources external to policy server 2617. In the following, a definition of a custom user information retrieval method is termed a custom authentication type. This terminology is historical and should not be taken to suggest that the information retrieved by a method defined by a custom authentication type can be used only for authentication. User groups for which members are determined in whole or in part by using a method defined in a custom authentication type will be termed hereinafter custom-authenticated user groups.

Policy server 2617 gathers the attribute values needed to determine whether a user belongs to a custom-authenticated user group in a fashion which resembles the description in the grandparent of the present application of how user authentication information is gathered via the User Identification Client. When a policy-enabled component 2609 makes an access request for a user and resource to server 2617, server 2617 proceeds conceptually as follows: it determines from access policy 307 in database 4401 what access policies apply to the resource and what user groups are given or denied access to the resource by these policies. If the session information provided by component 2609 is sufficient to authenticate the user and determine whether the policies that apply to the information resource and the user's user group memberships give or deny access to the user, server 2617 returns one of those results to policy-enabled component 2609.

If the user groups for which there are policies regarding the resource include custom-authenticated user groups and it is necessary to apply a custom authentication method in order to authenticate the user or to determine whether the user seeking access is a member of one or more of the custom-authenticated user groups, server 2617 returns a maybe result to policy-enabled component 2609. The maybe result indicates that server 2617 needs more information about the user to determine whether the user has access to the resource. Along with the maybe result, server 26127 returns an indication of what information is needed from the user in order to apply the custom authentication method. Policy-enabled component 2609 obtains the information from the user and provides it to policy server component 2617, which then uses the information to carry out the authentication method. The method may involve authenticating the user, querying external databases to obtain the attribute values necessary to determine whether the user belongs to the custom-authenticated user group, and or querying the external databases to obtain information for a dossier for the user. Policy server 2617 then uses the result of the custom authentication as described in the grandparent of the present application to determine whether the user has access to the resource. If access is permitted and there is a dossier, policy server 2617 returns the dossier to policy-enabled component 2609.

As will be explained in more detail later, portion 4403 of policy database 4401 contains the definitions of the queries which policy server 2617 performs on the external databases to determine at least in part whether a user belongs to a custom-authenticated user group. Types of custom authentication are defined in database 4401 in the same fashion as user ID types generally, namely by any user who belongs to an administrative user group 319 for which a policy maker policy 306 indicates that members of the administrative user group may define types of custom authentication.

Figure 45:
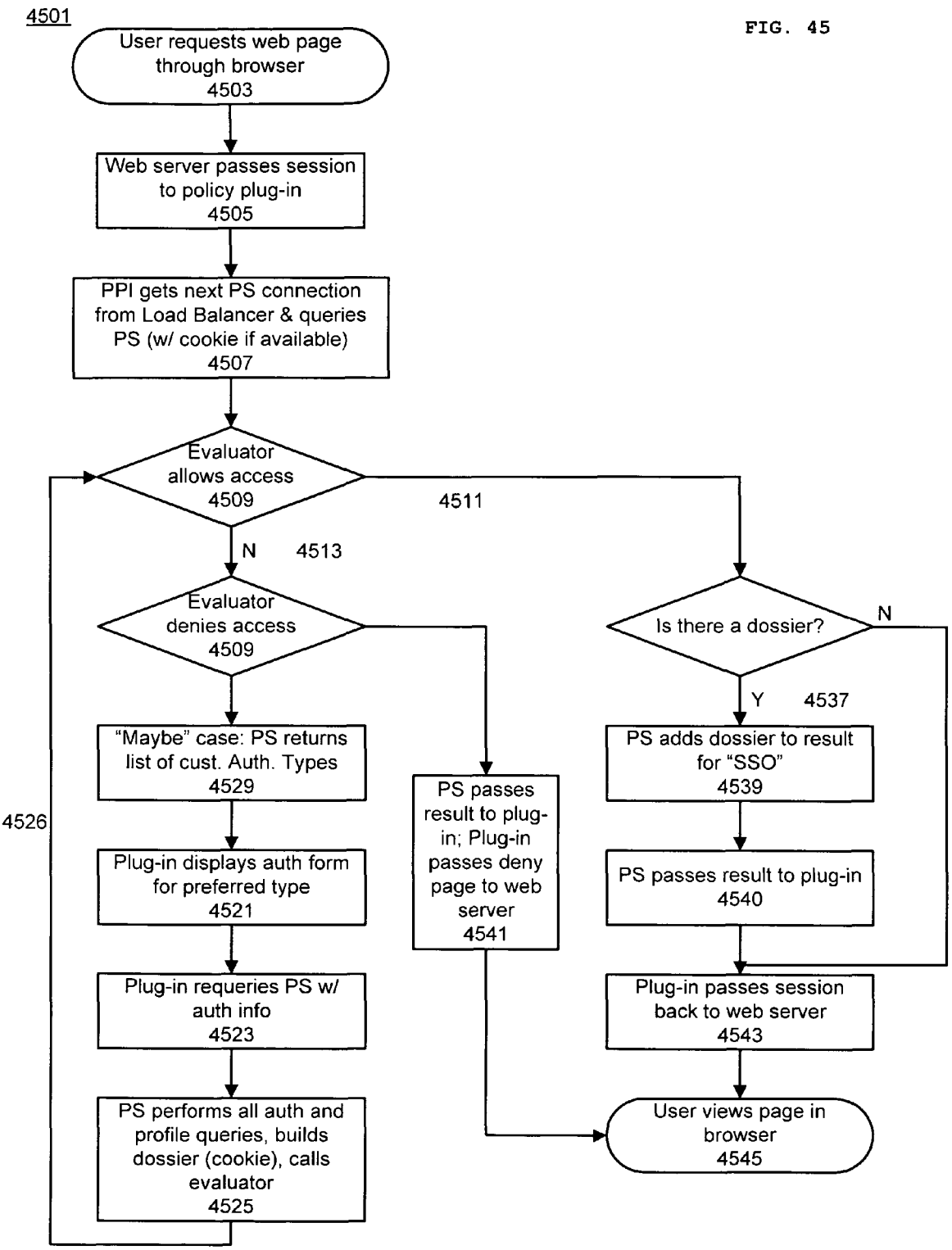
FIG. 45 is a flowchart of custom user information retrieval.

Custom Authentication in a Preferred Embodiment: FIGS. 38 and 45

FIG. 38 shows a preferred embodiment of an access control system in which custom-authenticated user groups can be defined and used to control access. The components of FIG. 38 which implement the query interface to policy server 2617 have already been discussed; the following components implement custom-authenticated user groups:

in policy-enabled component 2609:
    authentication form 3807 and
    local configuration information 3809; these are used to obtain attribute values from the user.
in generalized policy server 2617:
    Policy database 3825, which includes compiled definitions 4403 for types of custom authentication;
    authentication coordinator 3829, which receives an indication of a custom authentication type and the information provided by the user from VDB service 3813, uses the information to authenticate the user as specified by the custom authentication type, and returns the result of the authentication to VDB Service 3813.
    authentication modules 3839(*a* . . . *n*), of which there is at least one for each external source of authorization information. An authentication module 3839(*i*) receives a query specification from authentication coordinator 3829, puts the query specification into the proper form for a query to the authorization information source, and returns the results of the query to authentication coordinator 3829.
    authorization servers 3843(*a*. . . *n*): these are the sources of authentication information.
    cookie manager 3817 and signer-validator 3819: these make a cookie from the information returned by authentication coordinator 3829 and append a digital signature to it. The cookie is returned to policy-enabled component 2609, and is used by policy-enabled component 2609 to indicate to policy server 2617 that an access check has already been made for a user/resource combination.

In FIG. 45, flowchart 4501 provides an overview of how policy-enabled component 2609 and its components interact with generalized policy server 2617 and its components to collect the information about the user needed to authenticate the user or to determine a user's membership in a custom-authenticated user group or to provide a dossier to policy-enabled component 2609. Flowchart 4501 presumes that the user is requesting a Web page; however, techniques described in the following may be used with any resource to which access is controlled by generalized policy server 2617.

At 4503, the user requests access to the resource from a Web server 3803, in this case, the Web page, using his or her Web browser to do so. Of course, any other means of getting the access request to policy-enabled component 2609 may be used as well. Flowchart 4501 presumes that the access checking is being done by a policy plug-in 3805, but the access checking may be done by any program executing on policy-enabled component 2609. Thus, at 4505, server 3803 passes the information from the session with the user making the request to policy plug-in 3805.

Policy plug-in 3805 establishes a connection to an available generalized policy server (4507). When the connection is established, plug-in 3805 sends a query 3811 to VDB service 3813. The query will include information indicating the user seeking access and the information resource to which access is sought. If the user has previously made the request, the query may also be accompanied by a cookie. The cookie is an indication of the result of the previous access request which has been authenticated by the generalized policy server 2617 or another generalized policy server 2617 which is trusted by the first generalized policy server 2617.

If there is a cookie, VDB service 3813 reads it and compares it with the session information for the current session; if they are the same, VDB service 3813 provides the information in the cookie to evaluator 2036. If there is no cookie, VDB service 3813 handles the query as previously described. If evaluator 2036 determines that the information identifying the user is enough to make an access determination and allows access (4509), branch 4511 is taken; if evaluator 2036 determines that access should be denied (4515), branch 4517 is taken. Otherwise, VDB service 3813 returns a maybe result and a list of the types of custom authentication that are relevant to the access determination to policy enabled component 2609 (4520). The code in policy plug-in 4507 responds to the list by selecting one of the custom authentication types on it and then selecting the authentication form 3807(*i*) corresponding to the selected custom authentication type, configuring it as specified in local configuration information 3809, and outputting it to the user's browser (4521).

The authentication form requests the information from the user that is required for the user to authenticate him- or herself using the method specified in the selected custom authentication type. The user fills in the form (4521), and the plug-in takes the information provided by the user and adds it to the query 3811. The added information is termed herein authentication information and includes an identification for the selected custom authentication type and a list of the values received from the user in the form of <attribute name.attribute value> pairs. The query then goes back to VDB service 3813 (4523).

AT 4525, VDB service 3813 provides the authentication information to authentication coordinator 3829, which retrieves the definition for the selected custom authentication type from policy DB 3805 and provides it to the authentication module 3839(*i*) that is used to perform the queries needed for the authentication. Module 3839(*i*) puts the query into the proper form for the server 3943(*i*) which is to perform it and sends it to server 3843(*i*). When server 3843(*i*) returns the result, module 3839(*i*) makes the result, including whether the query succeeded, into a list of <attribute name, attribute value> pairs and returns the list to authentication coordinator 3829. Authentication coordinator 3829 uses the custom authentication type definition to determine whether the authentication succeeded and returns the result of the authentication to VDB Service 3813. A list of <attribute name, attribute value> pairs containing information retrieved by the query may accompany the authentication result and may be used to make a dossier 3804. If the authentication result indicates success, VDB Service 3813 adds the identification of the custom authenticated type and the information returned by module 3839(*i*) to the other information about the user and information resource and resubmits it to evaluator 2036 for evaluation at 4509, with branching on the results of the evaluation as before. With a maybe result, VDB Service 3813 returns that result to plug-in 3805; the list of custom authenticated types of course does not include the one that was just used. The above process, indicated by loop 4526, continues until evaluator 2036 either denies or grants access, access being denied unless evaluator 2036 finds no access policies which deny access by a user group that the user is a member of to the resource and at least one access policy which permits access by a user group that the user is a member of to the resource.

If access is denied (branch 4517), plug-in 3805 provides an access denied screen to Web server 38 (4541) which in turn provides the screen to the user's browser (4545). If access is allowed (branch 4511), VDB service 3813 determines whether there is a dossier (4537); if there is, VDB service 3813 adds the dossier to the query result (4539) and passes the result and any dossier to plug-in 3805 (4540), which passes the session, including the dossier, back to Web server 3803 (4543), which in turn permits the user to view the requested Web page.

A Detailed Example of Custom Authentication

The following detailed example will first show the administrator's interface for defining a custom authentication type and the resulting custom authentication type definition, will then show how the custom authentication type definition is used to define a custom-authenticated user group, and will finally show how a user who may belong to the custom-authenticated user group is authenticated and how the attribute values necessary to determine the user's membership in the custom-authenticated user group are obtained.

Figure 46:
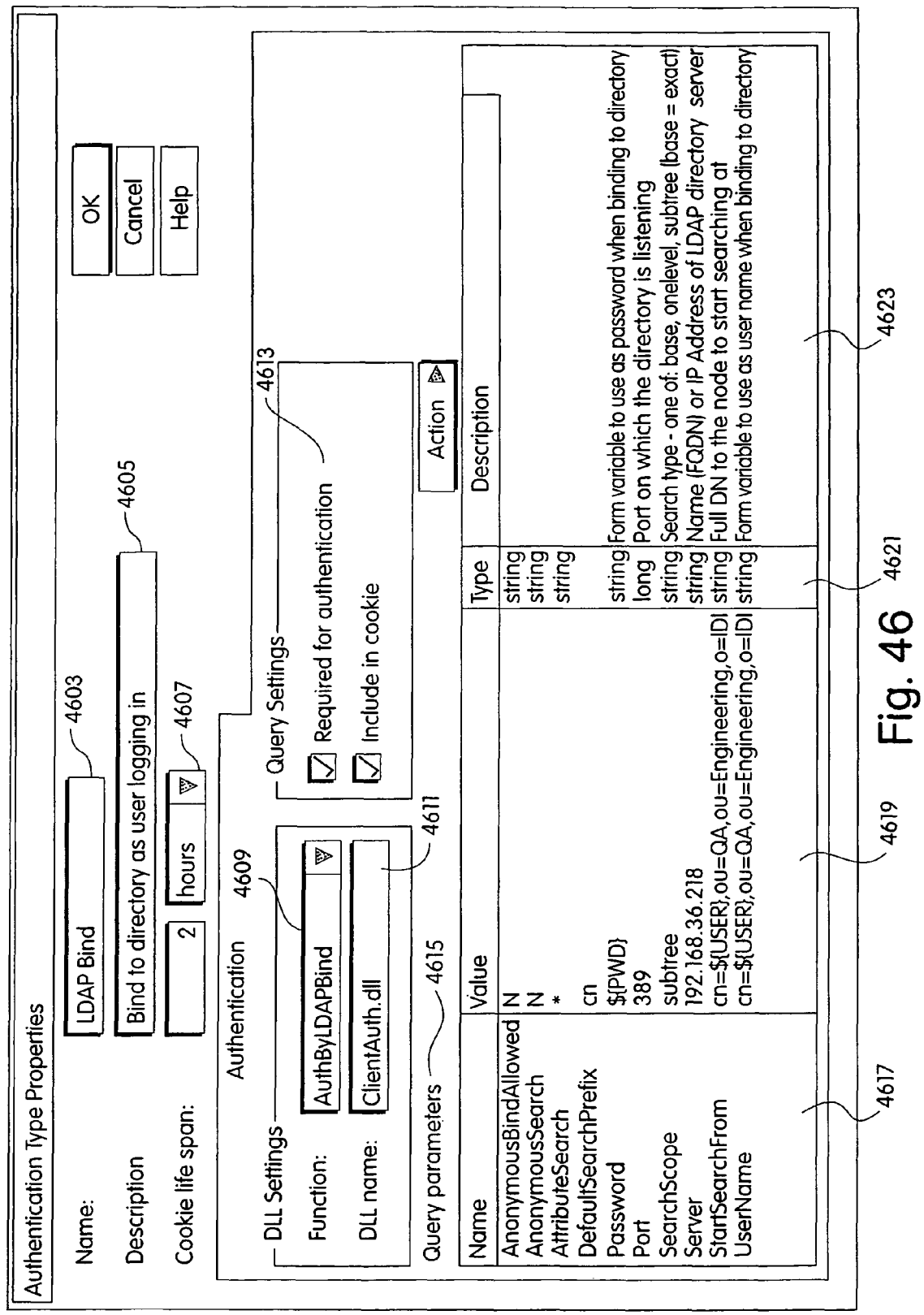
FIG. 46 is a window showing definition of a custom authentication type.
Figure 47:
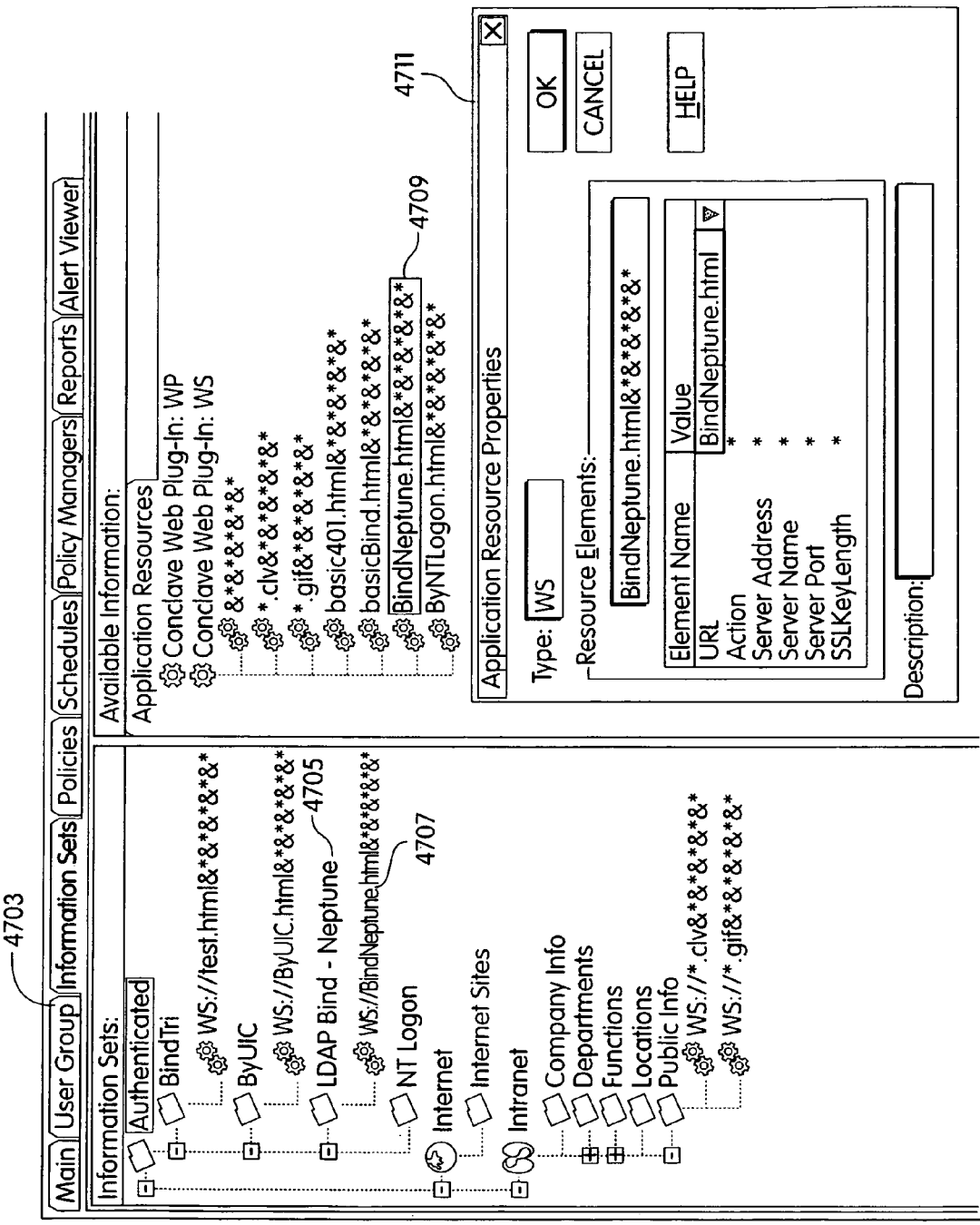
FIG. 47 is a window showing definition of an information resource that is accessed using a custom authentication type.
Figure 48:
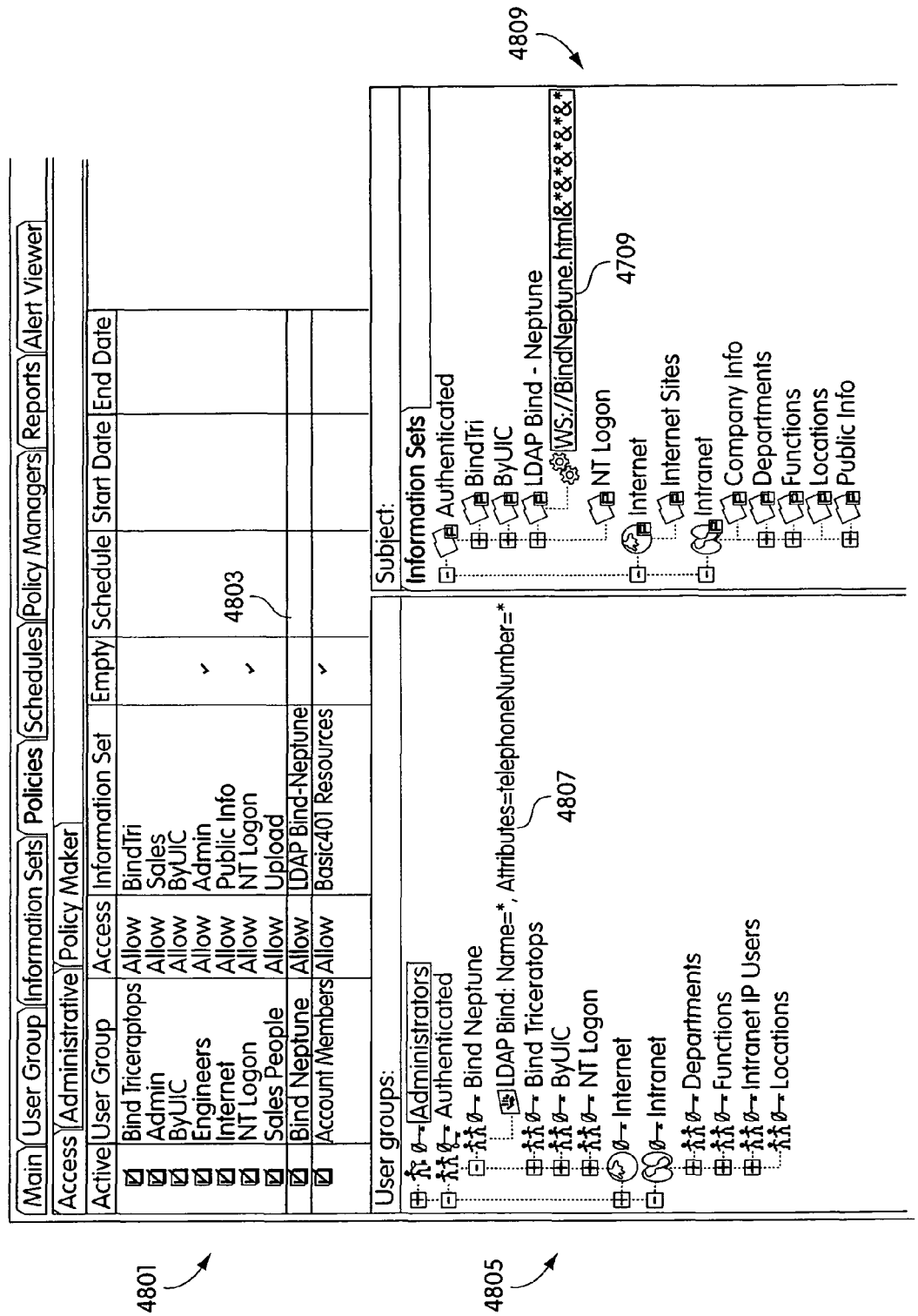
FIG. 48 is windows showing an access policy involving a custom authentication type and a user group and information resource involving a custom authentication type.

Defining Custom Authentication Types: FIGS. 46-48

FIG. 46 shows window 4601 that is used in a preferred embodiment to define a custom authentication type. At 4603 is a field which receives the custom authentication type's name, here LDAP Bind. LDAP is a well-known protocol running over TCP/IP for accessing directories of people or other entities. LDAP Bind defines a custom authentication method which authenticates a user based on an entry for the user in a directory accessible via LDAP. At 4605 is a description of the custom authentication type. Cooke life span 4607 determines how long a cookie indicating authentication by the custom protocol should last, in this case 2 hours. After expiration of the period, the authentication using LDAP Bind must be redone.

In the preferred embodiment, the authentication method is implemented as one or more functions. The first function in the method is invoked by authentication coordinator 3829. Other functions in the method are invoked in the course of that function's execution. The code for the functions, i.e., the implementation of the functions' authentication module 3839, is contained in a run-time loadable module such as the .dll files used with operating systems manufactured by Microsoft Corporation. At 4609, the administrator defining the authentication method indicates which of the functions he or she is working with; at 4611, the administrator indicates the name of the .dll file containing the functions. The settings at 4613 and query parameters 4615 are for the function currently specified at 4609. At 4613, the administrator indicates whether the results of the function are required for authentication and whether VDB services 3813 is to include the results in the cookie it makes to represent the policy evaluation.

The list of parameters 4615 specifies information that must be provided to the function if it is to authenticate the user and find the information necessary to determine whether the user is a member of a custom-authenticated user group in a directory accessible via the LDAP protocol. Each parameter on the list has a name (4617), a value, (4619) a data type (4621), and a description (4623). The parameter values can be specified in three ways:

as constants, for example the port number "389"
as values to be provided by the user for use in authenticating the user, specified by the notation ${<variable name>}, for example $ {PWD}, which is a password provided by the user;
as patterns to be matched, with wild cards indicated by *. Thus, the parameter AtributeSearch may be matched by any attributes returned by the directory entry accessed via LDAP.

FIG. 47 shows at 4701 how a custom authentication type is associated with an information set and how an authentication form 3807 is associated with a custom authentication type. Screen 4703 shows a hierarchy of information sets named Authenticated that require special types of authentication; one of the types is LDAP Bind for a service named Neptune, at 4705. Entry 4705 represents authentication module 3839 for Neptune and LDAP Bind. At the next level down (4707) is an information set specified by WS//BindNeptune.html. WS indicates the application by means of which the information set may be accessed and BindNeptune.html the information set itself. A user wishing to access this information set must be authenticated and must be a member of a user group that may access the information set determined by the LDAP Bind custom authentication method. Of course, if this is to work, plug-in 3805 for the application 3803 being used by the user who is attempting to access BindNeptune.html must have an authentication form 3807 for the information required to authenticate the user, in this case, to determine whether the user's user identification and password permit the user to access BindNeptune.html. That is specified at 4709. Screen 4711, finally, specifies the manner in which information may be retrieved from the application WS; again, pattern matching is used; as indicated by the asterisks in all fields but the URL field, the only requirement for the application WS is that the user access the Web page BindNeptune.html.

Other features of the access control system that are seen in FIG. 47 are that WS//BindNeptune.html defines a virtual Web server, i.e., any number of such applications that give access to information sets may run on the same physical machine, as long as the applications have different IP addresses, port numbers, and/or Internet names. Further, as can be seen from the Action field in screen 4711, a resource definition may include an HTTP verb, and access to the resource may be limited to what is provided by the verb. Finally, the length of the key used in the SSL protocol may be specified.

FIG. 48 shows how a user group may be associated with a custom authentication type access method and how an access policy may be made giving the user group associated with the custom authentication type access to the information set associated with the custom authentication type. The window showing the user groups is at 4805; user groups are defined hierarchically, and here there are authenticated user groups, i.e., user groups that use special authentication methods. Under that user group is the user group that has access to BindNeptune, and under that user group is the user group 4807 whose members are determined using information retrieved by the LDAP Bind custom authentication type. Patterns specifying the parameter values which users who have access to the directory queried by LDAP Bind must have are indicated in the entry; here, the asterisks indicate that any person who has a name and a telephone number in the directory is a member of the user group LDAP Bind. Window 4809 shows the information sets; at 4709 is the entry for the BindNeptune.html information set, which requires the use of LDAP Bind for access. The window showing the access policies is at 4801; access policy 4803 indicates that information sets belonging to LDAP Bind-Neptune (which includes the information set provided by the application WS) may be accessed by the user group Bind Neptune, which uses the custom authentication type LDAP Bind.

Implementation of Custom Authentication Type Definitions 4403: FIGS. 49-50

In order to assure compatibility with existing versions of the access control system in which custom authentication is implemented, custom authentication type definitions in a preferred embodiment are made using preexisting tables in the policy database. The tables are the smart card type and smart card definition tables, shown at 1323 in FIG. 13A, and the proxy definitions and proxy parameter tables, shown at 1709 in FIGS. 17B and 17C.

Each custom authentication type has a row in the SmartCard Types table as shown at 4901. The row specifies a type ID 4903 for the custom authentication type, its name 4905, and a comment 4907 indicating its purpose. The authentication method for the authentication type is defined using a row in the Proxy Definitions table, as shown at 4909, and rows in the Proxy Parameter Definitions table, as shown at 5001. The relationship between the row in the SmartCard Types table and the definition of the type's method is established by the use of LDAPBind in field 4913 of row 4909 and LDAPBind in field 4805 of row 4901. The other fields of row 4909 include field 4911, which is an ID number for the method, field 4915, which is a description of the method, and field 4917, which specifies the number of rows in Proxy Parameter Definitions Table 5001 that are used to define the authentication method. Continuing with Proxy Parameter Definitions Table 5001, the rows shown define the method for the LDAPBind custom authentication type. The rows 5001 specify a set of parameters 5002 which are used in authentication coordinator 3829 and the relevant authentication modules 3839 and/or profile retrieval interfaces 3841. Each row has its own identification number in field 5003, the identification number of row 4909 in field 5005, which relates the row to its proxy definition, a name field 5007, which indicates the use of the parameter in the method, a description field which describes the parameter, and a value field which contains the parameter's value. It should be noted here that the significance of the parameters in parameters 5002 depends completely on the modules that use them.

A set of parameters may include a number of subsets of parameters. In most cases, a subset of parameters describes a query on an external data source which is cried out by an authentication module 3830 or a profile retrieval interface 3841. Values returned in parameters of one parameter subset may be used as parameters of following parameter subsets. Parameter set 5002 has two such subsets, named Step1, shown at 5017, and Step 2, shown at 5025. Only Step1 will be explained in detail. Beginning at the top of parameter set 5002, row 5013 indicates that the cookie that represents the access request for which parameter set 5002 is being provided to an authentication module or profile retrieval module is to be valid for 2580 seconds; row 5015 indicates that there are two parameter subsets, named Step1 and Step2. All of the rows in Step1 have names of the form Step1/<step name> in field 5007.

Continuing with Step1 in detail, Step1's parameters define a query on the LDAP directory which, given the userID and password provided by the user who is making the access request, will return the employee's room number, work telephone, and email address. The user provides the userID and password by means of authentication form 3807 for LDAP Bind, and if the userID and password give the user access to the directory, the user has been authenticated. Beginning with the rows at 5016, these rows specify the name of the function that will execute the step and its dll. The row at 5019 indicates that the results of the query executed by Step1 should be included in the cookie that represents the access request. The next row indicates the maximum time that execution of the query should take before the subprogram returns a result indicating failure. The rows with the names Step1\Port, Server, UserDN, and UserPWD contain the parameter values needed to locate and access the LDAP directory. It should be noted that the values for the last two rows are the ones provided by the user via authentication form 3807. The rows at 5021 indicate the parameter values that are to be returned by the query on the LDAP directory; it is these returned values which will be used to determine whether the user making the request is part of a user group that has access.

Row 5025 in the Smartcard Definitions table, finally, serves to define a user who belongs to a user group whose membership is determined at least in part by the LDAP Bind custom authentication type. At 5027 is seen the row's ID number; at 5029 is found the name of the user; field 5031 contains the ID for row 4091 and thus indicates that the user is authenticated by LDAP Bind. At 5033 is a list of <attribute, value> pairs indicating patterns that must be matched by attribute values obtained by the LDAP Bind method from the directory if a user is to be authenticated as the user Tony M.

Custom User Information Retrieval and the Query Interface to the Generalized Policy Server: FIG. 41

Fields 4117 and 4151 through 4167 of row 4101 of the virtual POLICYEVAL table provide a query interface in the preferred embodiment for custom user information retrieval. Contents of the fields are explained in detail in the discussion of FIG. 41 above. All of the fields but Identity 4117 and Cookie 4157 are Select Only; Cookie is either Where or Select. Here, only the following will be pointed out about the fields:

Identity 4117, when used in a SELECT clause, returns the actual value of the user's identity to policy enabled component 2609; when used in a WHERE clause, it provides the user identification information collected by policy enabled component 2609 for a given custom authentication type together with a specifier for the type itself to VDB service 3813, which in turn passes it to authentication coordinator 3829.

MaybeList 4151 is the list of custom authentication types which evaluator 2036 returns when it finds that determining whether a user has access to a resource requires that the user's membership in one or more custom-authenticated groups be determined.

AttributeName 4153 and AttributeValue 4155 are a single one of the <attribute name,value> pairs returned by execution of a custom authentication type's method. If the method returns more than one such pair, there will be a row 4101 returned for each such pair. If the method so specifies, the pair will be included in the dossier.

Cookie 4157 is the cookie made by VDB Service 3813 and returned to policy-enabled component 2609 on a first access by a user to a resource and provided by policy-enabled component 2609 to VDB Service 3813 on subsequent accesses; a custom authentication type's method may specify information to be included in the cookie.

IdentityNumber 4159 is a sequence number that enables authentication coordinator 3829 to keep track of a user's identities when more than one is required for authentication.

IdentityIsValid 4163 indicates whether the authentication of the user required for a given custom authentication type succeeded. If it did, the values specified in the custom authentication type's method for inclusion in the cookie and/or dossier will go into the user's cookie and/or dossier.

Figure 51:
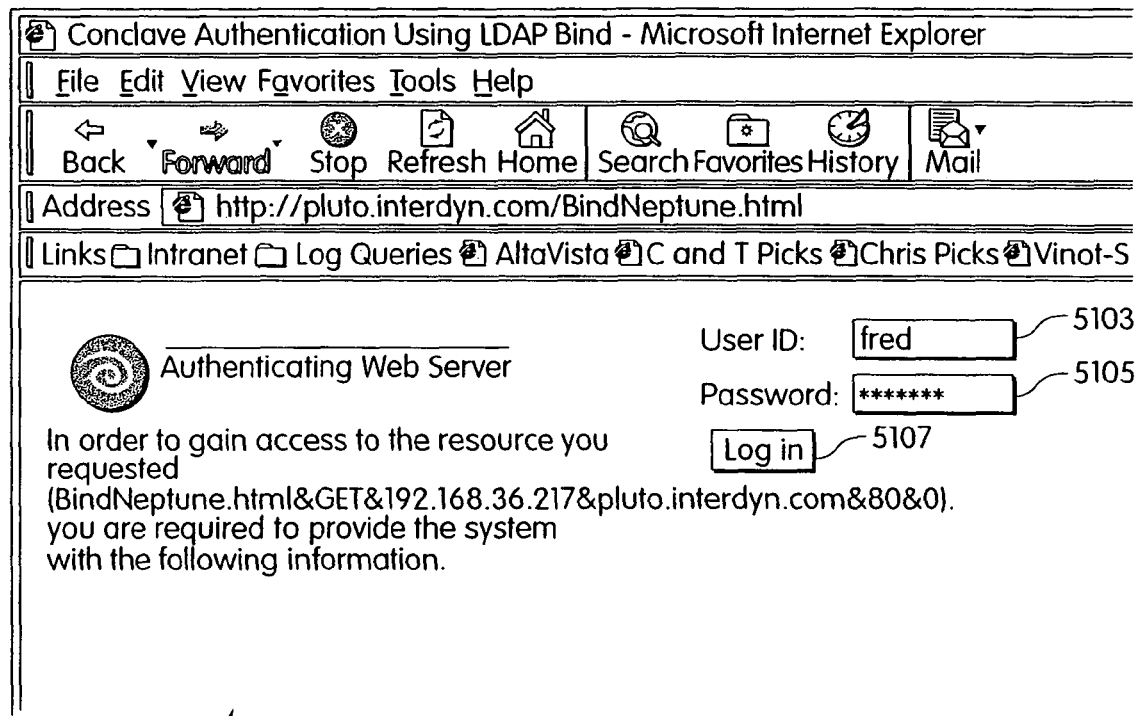
FIG. 51 shows a browser window that is produced by an authentication form 3807 and local configuration information 3809.

Example of Custom User Information Retrieval: FIGS. 51-53

In the following example, a user requests access to the information resource WS://BindNeptune.html. Access to this information resource is permitted to members of the Bind Neptune user group, as shown in policy 4803. Membership in Bind Neptune is determined by means of the method defined for the LDAP Bind custom authentication type. As shown in proxy parameter definitions table 5001 in FIG. 50, that method performs a query which takes the user ID and password of the user wishing to make the access. If the user ID and password give access to the LDAP directory database, the query returns the user's room number, work phone, and email address. Any or all of these values can be used to define membership in a user group; as shown at 4807, only the work phone is used to define membership in Bind Neptune, with any user who has a phone number in the LDAP directory database being a member of the user group. A user who has access to WS://BindNeptune.html may thus be defined as follows:

UG: Bind Neptune

UG Membership: telephoneNumber=* (any telephoneNumber attribute defined within one of the queried databases/directories)

Giving a user who is a member of the Bind Neptune user group access to WS://BindNeptune.html involves the following steps:

1. User enters URL for the resource in the user's Web browser (http://pluto.interdyn.com/BindNeptune.html);
2. Web server 3803 receives request and calls PPI 3805;
3. PPI 3805 makes query to PS 2617, providing resource specification, etc;
4. VDB service 3813 receives the query and calls evaluator 2036. Evaluator 2036 responds with MAYBE response and the custom authentication type(s) that might allow the user access to the requested resource;
5. VDB service 3813 sends back MAYBE and auth type(s) to PPI 3805;
6. PPI 3805 loads configured HTML form 3807(*i*) for this custom authentication type and displays the form in the user's browser;
7. User fills in requested information and posts fomm;
8. Server 3803 receives posting with the requested information and calls PPI 3805 for processing;
9. PPI 3805 queries VDB Service 3813 with the requested information;
10. VDB Service 3813 provides the custom authentication type and the information to authentication coordinator 3829, which calls authentication module 3839(*a*) for the LDAP Bind custom authentication type and provides the module with configured/passed-in information;
11. Authentication module 3839(*a*) binds to LDAP directory 3843(*a*) with username/password supplied and queries directory for attributes of that user. Authentication success code and list of attributes are sent back to authentication coordinator 2839, which in turn returns them to VDB service 3813;
12. VDB service 3813 calls evaluator 2036 with user name and attributes. Evaluator 2036 returns ALLOW based on telephoneNumber attribute and cookie for "setting" on browser;
13. VDBservice 3813 returns allow to PPI 3805, which displays the originally requested page.

In the above example, the method defined by the custom authentication type uses the attributes returned by the query on the LDAP data base only to determine user group membership; the methods specified in other custom authentication types may place some or all of these attributes and other attributes returned by other queries in a dossier 3803 for return to application 3803. It should further be pointed out here that a preferred embodiment of the invention is implemented on an NT server costing $3000 and can perform the steps described above for 50-100 users a second. The chief reason for the speed with which the steps can be performed is the use of compiled MMFs 2301 in policy database 3825, as described in the grandparent of the present patent application.

Continuing in more detail, when PPI 3805 receives the URL and makes the query in step 3 above, the query looks like this:

select Cookie, IdentityIsValid, IsAllowed, reasoncode, maybelist, cookiemodified
from policyeval
where sourceip='192.168.36.215'
and application='WS'
and resource='BindNeptune.html&GET& 192.168.36.217& pluto.interdyn.com&80&0'
and includeeval='Y'
and includeidentitystore='Y'
and askclientforidentities='N'

The information from which the user may be authenticated and his or her user group membership may be determined in the above query is simply the user's IP address in sourceip. The resource to which the user is requesting access is defined by the application program from which access is being requested, WS, the URL provided by the user, and the specification from WS that the operation being requested on the Web page specified by the URL is the HTTP GET operation. Policy plug-in 3805 is configured with a list of generalized policy servers 2617 which it may query; policy plug-in 3805 selects a generalized policy server 2617 in a manner that balances the loads on the policy servers on the list and sends the query to that policy server.

The response to the query will contain a cookie if access is allowed, will indicate whether the user's identity is valid, give a reason for the valid identity, and will include a maybe list if it turns out that a custom authentication type is involved in gaining access. A custom authentication type is in fact involved, so the response looks like this:

Cookie=;IdentityIsValid=;
IsAllowed=N; ReasonCode=118;
MaybeList=LDAP Bind; CookieModified=N The null value for IdentityIsValid indicates that the authentication of the user did not succeed; consequently, no cookie is returned and no access is allowed. The reason the authentication did not succeed is that a custom authentication type, LDAP Bind, is involved, and the custom authentication type's name is returned in the maybe list.

Policy plug-in 3805 responds to the result of the first query by sending authentication form 3807(*i*) for the type LDAP Bind to the user. Form 3807(*i*) is formatted as specified in local configuration information 3809. The resulting screen 5101 that is used in a preferred embodiment is shown in FIG. 51. A request for information about a user from a directory that obeys the LDAP protocol must include the user's user name and password; the form collects that information at 5103 and 5105; the information is sent to PPI 3805 when the user presses log-in button 5107.

To deal with the case where the maybe list has more than one custom authentication type name on it, PPI 3805 is configured with an ordered list of custom authentication types; the custom authentication types from the maybe list are handled one at a time by PPI 3805 in the order in which they appear on the ordered list.

PPI 3805 uses the information from the user to make a new query 5201 to VDB service 3813; that query is shown in FIG. 52 and its result in FIG. 53. Query 5201 differs from the first query to VDB Service 3813 in that a new field has added, namely identity field 5203. The contents of this field contain the information which VDB service needs to have authentication coordinator 3829 cause an authentication module 3839 collect the user information needed to authenticate the user and to permit evaluator 2036 to determine whether the user belongs to a user group whose members may access the information resource. In particular, identity field 5203 contains the URL for the resource to which access is being sought at 5204, the name of the custom authentication type whose method will be used at 5205, the user name 5207 provided by the user at 5103 in authentication window 5101, the password 5209 provided at 5105 in window 5101, and an indication at 5211 of the action that caused the user name and password to be sent, namely, that the user pushed button 5107 on the screen.

VDB Service 3813 responds to query 5201 by processing the WHERE clause fields sourceip through askclientforidenties and then passing the contents of identity field 5203 to authentication coordinator 3829, which in turn fetches proxy parameter definition 5001 for the LDAP Bind custom authentication type from policy database 3825 and invokes the authentication module 3839(*i*) specified therein using the user id and password specified in fields 5207 and 5209. As specified in parameter definition 5001, authentication module 3839(*i*) performs a query on the LDAP server which returns the user's room number, work telephone number, and email address. As specified at 5023 in parameter set 5002, the query must succeed if the user is to be authenticated. Authentication module 3839(*i*) indicates to authentication coordinator 3829 that the query has succeeded and returns the data returned by the query to authentication coordinator 3829. Authentication module 3839 passes both the result and the returned data to VDB Service 3813, which provides the returned data to evaluator 2036 for use in determining whether the user belongs to the Bind Neptune user group. Here, the returned data includes the user's telephone number, which is all that is required to establish membership in Bind Neptune, so evaluator 2036 indicates to VDB Service 3813 that the access is allowed.

VDB Service 3813 now has all the information it needs to make and return a result for query 5201. Result 5301 is shown in FIG. 53. Most of the result consists of Cookie 5303, which is returned only if the access request succeeds. Cookie 5303 contains a description of the access request including user information provided by the user and retrieved by the custom authentication method. Cookie 5303 further contains a digest at 5305 and the digital signature of generalized policy server 2617. These components make alterations of the contents of Cookie 5303 detectable and make it possible for one policy server 2617 to accept a cookie from another policy server whose signature it recognizes. At 5309, the results indicate that the user has been authenticated, at 5311 that the access has been allowed, and since access has been allowed, MaybeList is empty, as indicated at 5313. When policy plug-in 3805 receives the above result, it permits application 3803 to display the page http://pluto.interdyn.com/BindNeptune.html.

Dossiers

As will be immediately apparent from the foregoing detailed example, custom authentication methods may be defined for collecting any information which a user can provide via an input device or which can be obtained from an information source accessible to generalized policy server 2617. In the example, the information collected from the user was used for authentication and the information obtained from the LDAP directory was used to determine the user's membership in a user group, but there is no requirement that this be the case. A custom authentication method can be used as well simply to collect information about a user at the time that the user requests access to a resource and provide the information to policy-enabled component 2609. The information can come from any information source for which an authentication module 3839 or a profile retrieval module 3841 can make queries.

The mechanism by which VDB service 3813 provides the information retrieved by a custom authentication module to policy-enabled component 2609 is dossier 3804. A dossier is simply the list of attribute-value pairs returned in fields 4153 and 4157 of the query. When the values returned by custom authentication method are to be included in the dossier returned to policy-enabled component 2609, that fact is indicated in the proxy parameter definitions 5001 for the method in a matter analogous to the indication at 5019 that the values returned by the query defined in Step 1 5017 are to be made part of the cookie returned by the query.

Positive Access Control

Access control heretofore has generally had a negative purpose—to make sure that a user of a system accesses only those information sources which he or she is permitted to see. However, when custom user information retrieval is combined with generalized policy servers, the result is a broadening of the definition of access control to include access control with a positive purpose—that is, not only to make sure that the user accesses only those information sources which he or she is permitted to see, but also to make sure that the user accesses those information sources which are most likely to be useful or pleasurable to him or her.

A few examples will suffice to illustrate the principle:

An employee database in a multinational corporation can include for each employee the language the employee is most comfortable in; this information can be retrieved when the employee requests access to an information source and returned as part of the employee's dossier 3804 to policy-enabled component 2609, which can then use that information to provide a browser interface in the proper language and where possible, to provide a version of the information source that is in the preferred language.

A Web merchant can use the techniques described herein to make the Internet equivalent of the lounges and upgrades that airlines provide for frequent fliers. When a customer accesses the merchant's Web site, the merchant can check the merchant's database to determine how much business the customer has done over the last six months and return that amount to the merchant's Web server. The Web server can user the amount to determine the appearance of the Web page, to determine price discounts and other specials, and also to move the session to a server that will guarantee the user fast response even during congested time periods.

A final example will show the full extent to which custom user information retrieval and generalized policy servers broaden the concept of authentication and access control. With a generalized policy server and custom user information retrieval, one could implement a lottery like this: an access policy is defined in the generalized policy server which gives users belonging to the user group lottery winner access to the resource lottery winnings, which is a bank account containing the lottery winnings. A user is a member of the user group lottery winner if an attribute won lottery associated with the user has the value "Y". The value of the attribute for a given user is determined by a method defined by the lottery winner type custom authentication type.

A user plays the lottery by inputting the URL of the resource lottery winnings to his or her Web browser; the lottery application which receives the URL makes a query as described above to VDB service 3813; evaluator 2036 determines that someone who is a member of the user group lottery winner may have access and returns the lottery winner type name to the lottery application, which outputs a window to the user which asks the user to input a number. The lottery application then makes a second query as described above which includes the lottery winner type name and the number received from the user. VDB service 3813 passes the lottery winner type name and the number to authentication coordinator 3829, which provides the number to the type's authentication module 3839. The authentication module uses a random number generator to generate a number; if it is the same as that input by the user, authentication module 3839 returns the value "Yes" for the attribute won lottery; otherwise it returns the value "No". VDB service 3813 provides the value of the attribute won lottery to evaluator 2036, which uses it to determine whether the user is a member of the user group lottery winner. If the user is, VDB service 3813 returns a result indicating that the user has access to lottery winnings, and the user can transfer the amount in lottery winnings to his or her personal bank account.

CONCLUSION

The foregoing Detailed Description discloses to those skilled in the arts to which the Detailed Description pertains how to construct an access control system in which access is checked by an SQL query on a virtual relational database table which contains a row for each potential user/information resource combination and how to provide administrators of the access control system with techniques for defining how and where the access control system collects information and how the access control system uses the information. The information may be collected from the user seeking access and from internal or external sources and may be used to validate the user's identity, to determine membership of the user in a user group, or to provide the policy enabled component with arbitrary additional information about the user. The inventors have further disclosed the best mode presently known to them of constructing the access control system.

While the techniques disclosed herein for presenting an application with a virtual database table are particularly advantageous in access control, where the set of possible user/information source combinations may be very large and is often undefinable, they may be used elsewhere to provide simple and easily-understood interfaces to servers. In particular, they may be used to advantage in access control systems which do not employ access policies which define access in terms of user groups and information sets. Moreover, while the techniques for defining how and where the access control system collects and uses information work well with the SQL query interface used in the preferred embodiment, the techniques can be applied in other kinds of access control systems as well. All that is required is a way of relating the user to the method definition.

The actual embodiment of the inventions disclosed herein is further greatly influenced by the fact that the inventions are implemented in an improvement of an existing system that must be compatible with older versions of the system. Other implementations of the invention will similarly be influenced by the constraints or lack thereof imposed upon the designers. Moreover, the choice of SQL as the query language is advantageous because of its wide distribution, but is not necessary. Other embodiments may use other query languages and may emulate other protocols for accessing remote databases.

Thus, an unlimited number of other embodiments of the principles disclosed herein are possible and for that reason, the Detailed Description is to be regarded as being in all respects exemplary and not restrictive and the breadth of the invention disclosed herein is to be determined not from the Detailed Description, but rather from the claims as interpreted with the full breadth permitted by the patent laws.

What is claimed is:

1. An adaptive encryption apparatus, the apparatus comprising:
    memory that stores a sensitivity level in association with a data resource, wherein the sensitivity level is further associated with an encryption technique; and
    an access filter executable by a processor to:
        determine a trust level of a user based on at least an identification technique used to identify the user and a network path used by the user to request the data resource,
        authorize the user to access a requested data resource based on at least the determined trust level and the sensitivity level associated with the requested data resource stored in memory, and
        encrypt a session for providing the requested data resource, the session being encrypted based on an encryption technique associated with the sensitivity level of the requested data resource.

2. The apparatus of claim 1, further comprising encryption hardware that determines the physical security of the network path, and wherein the trust level of the user is further based on the physical security of the network path.

3. The apparatus of claim 1, wherein the processor further executes instructions stored in memory to determine the trust level of the user further based on an access policy, the access policy based on group membership of the user and an information set including the requested data resource.

4. The apparatus of claim 1, further comprising a database in memory, the database storing information concerning the identification technique in association with a minimum trust level.

5. The apparatus of claim 1, further comprising a database in memory, the database storing information concerning an order of trust levels ranging from a minimum level to a maximum level as designated by an administrator.

6. A method for adaptive encryption in sessions providing data resources, the method comprising:
    assigning a sensitivity level to a data resource in a database in memory, wherein the sensitivity level is further associated with an encryption technique; and
    executing instructions stored in memory, wherein execution of the instructions by a processor:

determines a trust level of a user based at least on an identification technique used to identify the user and a network path used by the user to request the data resource, the determination of the trust level taking place at an access filter;

determines authorization of a user to access a requested data resource based on at least the determined trust level and the sensitivity level associated with the requested data resource, the determination of the authorization taking place at the access filter; and encrypts a session for providing the requested data resource to the authorized user, the session being encrypted based on an encryption technique associated with the sensitivity level of the requested data resource, the encryption taking place at the access filter.

7. The method of claim 6, wherein determining the trust level of the user is further based on physical security of the network path.

8. The method of claim 6, wherein determining the trust level of the user is further based on an access policy, the access policy based on group membership of the user and an information set including the requested data resource.

9. The method of claim 6, further comprising establishing an order of trust levels ranging from a minimum level to a maximum level.

10. The method of claim 9, further comprising associating the sensitivity level of the requested data resource with a range of trust levels, and wherein determining authorization to access the requested data resource includes determining whether the trust level of the user is within the range of trust levels associated with the sensitivity level of the requested data resource.

11. The method of claim 6, further comprising establishing an order of encryption levels ranging from a minimum level to a maximum level.

12. The method of claim 11, further comprising associating the sensitivity level of the requested data resource with a range of encryption levels and wherein permitting the encrypted session for providing the requested data resource includes determining that the encryption technique is within the range of encryption levels associated with the sensitivity level of the requested data resource.

13. The method of claim 6, further comprising establishing an order of sensitivity levels ranging from a minimum level to a maximum level.

14. The method of claim 12, further comprising associating the trust level of the user with a range of sensitivity levels and wherein determining authorization to access the requested data resource includes determining whether the sensitivity level of the requested data resource is within the range of sensitivity levels associated with the trust level of the user.

15. A non-transitory computer-readable storage medium, having embodied thereon a program, the program being executable by a processor to perform a method for adaptive encryption in sessions providing data resources, the method comprising:

assigning a sensitivity level to a data resource in a database, wherein the sensitivity level is further associated with an encryption technique;

determining a trust level of a user based at least on an identification technique used to identify the user and a network path used by the user to request the data resource;

determining authorization of a user to access a requested data resource based on at least the determined trust level and the sensitivity level associated with the requested data resource; and encrypting a session for providing the requested data resource to the authorized user, the session being encrypted based on an encryption technique associated with the sensitivity level of the requested data resource.

16. The non-transitory computer-readable storage medium of claim 15, wherein the trust level is further based on physical security of the network path.

17. The non-transitory computer-readable storage medium of claim 15, wherein the program is further executable to determine the trust level of the user further based on an access policy, the access policy based on group membership of the user and an information set including the requested data resource.

* * * * *